US012673304B2

(12) United States Patent
Hatherell

(10) Patent No.: US 12,673,304 B2
(45) Date of Patent: Jul. 7, 2026

(54) BEVERAGE CARBONATION SYSTEM, METHOD OF CARBONATING A BEVERAGE, AND CARBONATION POD

(71) Applicant: BONNE O INC., Toronto (CA)

(72) Inventor: Darren Hatherell, Toronto (CA)

(73) Assignee: BONNE O INC., Toronto (CA)

( * ) Notice: Subject to any disclaimer, the term of this patent is extended or adjusted under 35 U.S.C. 154(b) by 707 days.

(21) Appl. No.: 18/119,320

(22) Filed: Mar. 9, 2023

(65) Prior Publication Data

US 2023/0234005 A1    Jul. 27, 2023

Related U.S. Application Data

(63) Continuation of application No. PCT/CA2021/051230, filed on Sep. 7, 2021.
(Continued)

(51) Int. Cl.
*B01F 23/2361*    (2022.01)
*A23L 2/54*    (2006.01)
(Continued)

(52) U.S. Cl.
CPC ............ *B01F 23/2361* (2022.01); *A23L 2/54* (2013.01); *B01F 23/237621* (2022.01); *B01F 2101/14* (2022.01)

(58) Field of Classification Search
CPC .......... B01F 23/2361; B01F 23/237621; B01F 2101/14; A23L 2/54
(Continued)

(56) References Cited

U.S. PATENT DOCUMENTS

| | | | |
|---|---|---|---|
| 2,800,509 | A | 7/1957 | Doss et al. |
| 4,785,973 | A | 11/1988 | Kobe |

(Continued)

FOREIGN PATENT DOCUMENTS

| | | |
|---|---|---|
| CN | 201890460 U | 7/2011 |
| CN | 202067824 U | 12/2011 |

(Continued)

OTHER PUBLICATIONS

"Written Opinion of the International Search Authority" and "International Search Report", mailed Aug. 1, 2023, issued in PCT/CA2023/050515, 13 pages.
(Continued)

*Primary Examiner* — Steven W Crabb
*Assistant Examiner* — Alba T Rosario-Aponte

(57)    ABSTRACT

Systems and methods are disclosed for carbonating a beverage. One of the methods includes: connecting a beverage container to a beverage carbonator, the beverage container containing the beverage; receiving a carbonation signal associated with a user request to carbonate the beverage in the beverage container; detecting a temperature of the beverage; determining a customized carbonation duration, based at least in part on the detected temperature, to obtain a targeted carbonation level in the beverage; and directing carbon dioxide gas into contact with the beverage until expiry of the customized carbonation duration. In some cases, the received carbonation signal is associated with a beverage composition of the beverage (e.g. orange juice, wine, water, etc.). In these cases, determining the customized carbonation duration includes determining the customized carbonation duration based at least in part on the detected temperature and the beverage composition, to obtain the targeted carbonation level in the beverage.

17 Claims, 27 Drawing Sheets

Related U.S. Application Data

(60) Provisional application No. 63/076,958, filed on Sep. 11, 2020.

(51) Int. Cl.
   B01F 23/237 (2022.01)
   B01F 101/14 (2022.01)

(58) Field of Classification Search
   USPC ........................................................ 99/323.1
   See application file for complete search history.

(56) References Cited

U.S. PATENT DOCUMENTS

| | | | |
|---|---|---|---|
| 4,927,569 A | 5/1990 | Robinson | |
| 4,999,140 A | 3/1991 | Sutherland et al. | |
| 5,112,539 A | 5/1992 | Parnet | |
| 5,260,081 A | 11/1993 | Stumphauzer et al. | |
| 6,102,212 A | 8/2000 | Strid | |
| 6,814,990 B2 | 11/2004 | Zeng | |
| 8,808,775 B2 | 8/2014 | Novak et al. | |
| 9,790,076 B2 | 10/2017 | Novak et al. | |
| 9,867,493 B2 | 1/2018 | Covey et al. | |
| 9,936,834 B2 | 4/2018 | Covey et al. | |
| 10,343,885 B2 | 7/2019 | Novak et al. | |
| 12,492,114 B2 * | 12/2025 | Tessicini | B67D 1/0888 |
| 2004/0185150 A1 | 9/2004 | Francis et al. | |
| 2006/0068064 A1 | 3/2006 | Richards | |
| 2006/0151529 A1 * | 7/2006 | Crisp, III | B67D 1/0057 |
| | | | 222/23 |
| 2007/0071808 A1 | 3/2007 | Janik et al. | |
| 2008/0073239 A1 | 3/2008 | Duffield et al. | |
| 2009/0223895 A1 | 9/2009 | Zha et al. | |
| 2011/0226343 A1 | 9/2011 | Novak et al. | |
| 2014/0079856 A1 | 3/2014 | Hatherell | |
| 2014/0113045 A1 | 4/2014 | Njaastad et al. | |
| 2014/0288495 A1 | 9/2014 | Olmos | |
| 2014/0331867 A1 | 11/2014 | Covey et al. | |
| 2014/0335239 A1 | 11/2014 | Covey et al. | |
| 2015/0342212 A1 | 12/2015 | Yang | |
| 2016/0318703 A1 | 11/2016 | Macias | |
| 2018/0057230 A1 | 3/2018 | Johnson | |
| 2018/0125098 A1 * | 5/2018 | Takahashi | A23L 2/00 |
| 2018/0153331 A1 | 6/2018 | Covey et al. | |
| 2018/0289205 A1 | 10/2018 | Covey et al. | |
| 2018/0362906 A1 * | 12/2018 | Osborn | B01F 25/53 |
| 2019/0029291 A1 | 1/2019 | Singer | |
| 2019/0193928 A1 | 6/2019 | Broen et al. | |
| 2019/0275478 A1 * | 9/2019 | Jersey | B01F 35/2115 |
| 2020/0009515 A1 * | 1/2020 | Thangamuthu | B01F 35/2211 |
| 2020/0156019 A1 | 5/2020 | Sawyer et al. | |

FOREIGN PATENT DOCUMENTS

| | | |
|---|---|---|
| CN | 102491398 A | 6/2012 |
| CN | 203634009 U | 6/2014 |
| DE | 202005009312 U1 | 11/2005 |
| EP | 40030 A2 | 11/1981 |
| EP | 1346760 A1 | 9/2003 |
| EP | 2531080 B1 | 11/2014 |
| EP | 2754376 B1 | 3/2015 |
| EP | 2786682 B1 | 12/2015 |
| EP | 2921087 B1 | 10/2016 |
| EP | 2739559 B1 | 3/2017 |
| GB | 413220 A | 7/1934 |
| GB | 2059791 A | 4/1981 |
| GB | 2117657 A | 10/1983 |
| WO | 9405407 A1 | 3/1994 |
| WO | 9405409 A1 | 3/1994 |
| WO | 9825485 A2 | 6/1998 |
| WO | 02092453 A1 | 11/2002 |
| WO | 2005058700 A1 | 6/2005 |
| WO | 2007103635 A1 | 9/2007 |
| WO | 2012162762 A1 | 12/2012 |
| WO | 2014131101 A1 | 9/2014 |
| WO | 2020084615 A1 | 4/2020 |
| WO | 2020097728 A1 | 5/2020 |

OTHER PUBLICATIONS

Watson, Elaine "STIRZ seeks to disrupt instant coffee market with dissolvable pods,", Mar. 1, 2020. https://www.foodnavigator-usa.com/Article/2020/02/02/STIRZ-seeks-to-disrupt-instant-coffee-market-with-dissolvable-pods, 4 pages.

"Written Opinion of the International Search Authority" and "International Search Report", mailed Nov. 10, 2021, Issued in PCT/CA2021/051230, 17 pages.

* cited by examiner

BEVERAGE CARBONATION SYSTEM, METHOD OF CARBONATING A BEVERAGE, AND CARBONATION POD

FIELD

This application relates to the field of beverage carbonation systems, beverage carbonators, and methods of carbonating a beverage.

INTRODUCTION

Carbonated beverages such as, for example, sodas and sparkling water are popular with consumers. Many carbonated beverages are prepared at a factory and shipped to stores, where consumers travel to purchase them. Each of the preparation, shipping, and travel may contribute to a higher cost per beverage for the consumer. Further, the selection of carbonated beverages at retail is limited. Accordingly, it may be desirable to have a beverage carbonation system usable by a consumer in his/her home, for example. This may also be more convenient for a consumer.

DRAWINGS

Figure 2:
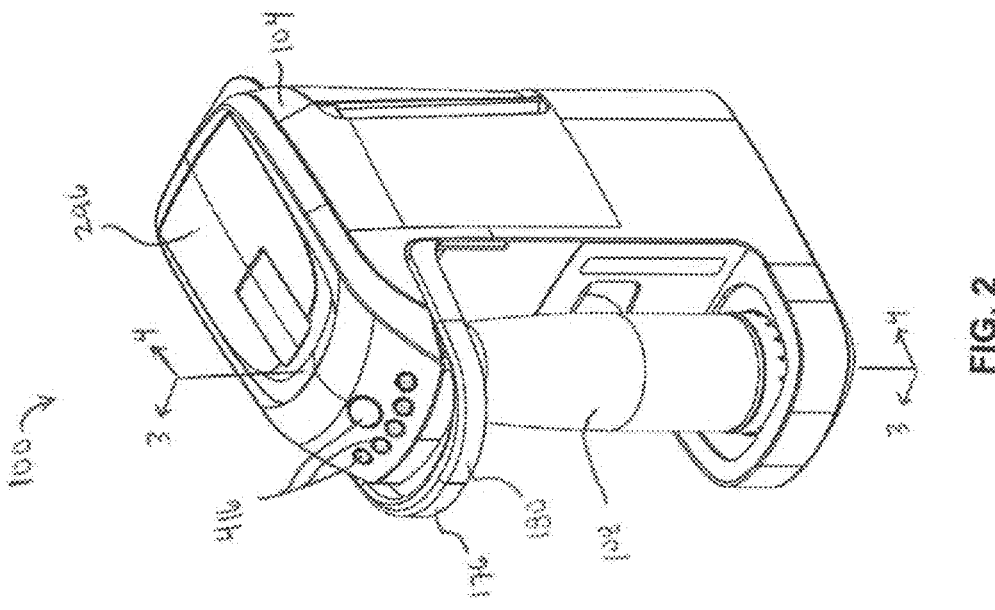
FIG. 2 is a perspective view of an example beverage carbonation system, including the beverage carbonator of FIG. 1 and a beverage container.
Figure 29A:
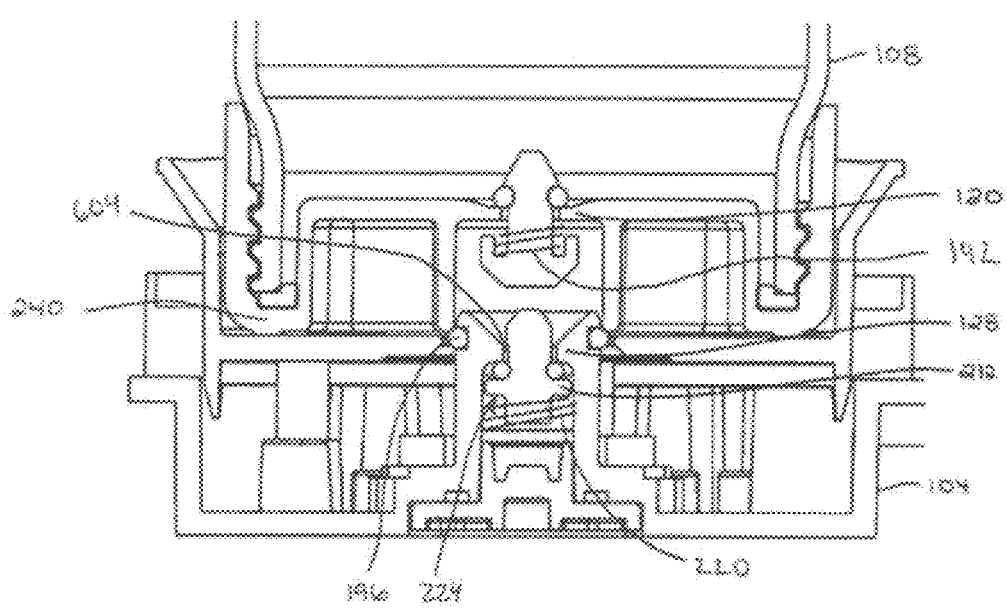
Figure 29B:
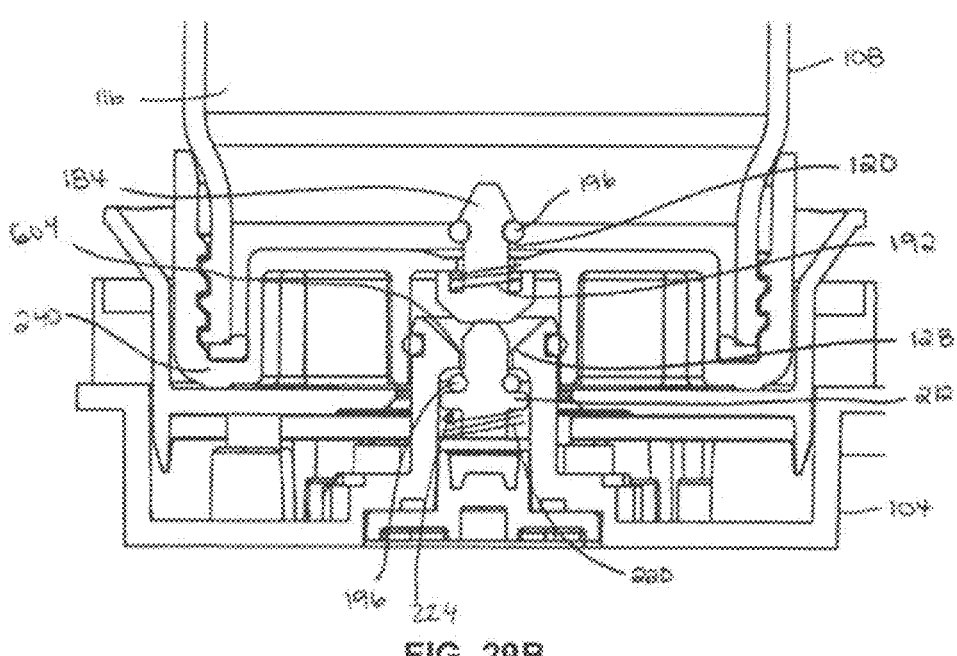
Figure 30A:
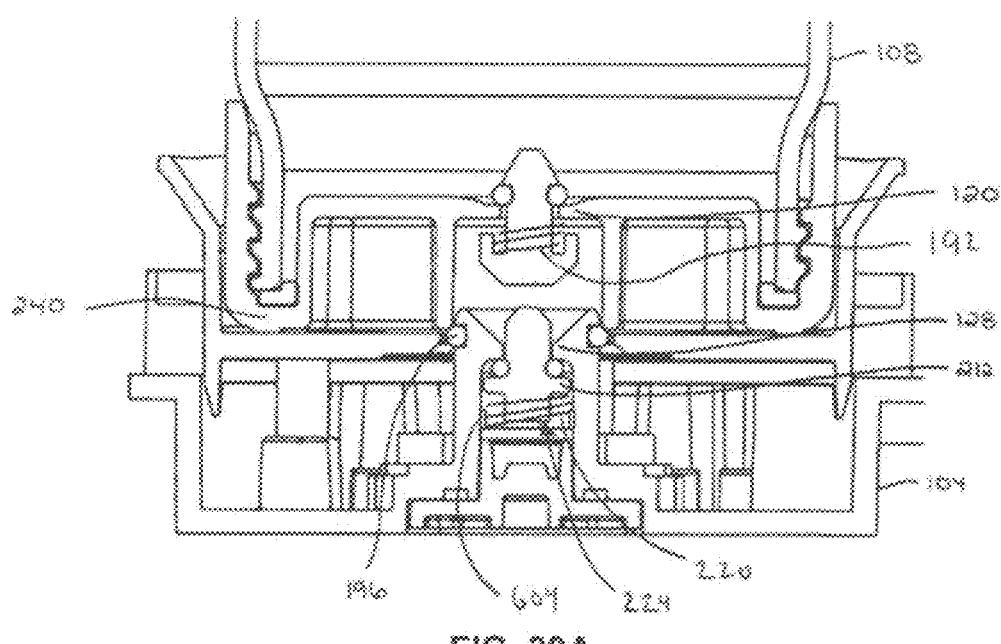
Figure 30B:
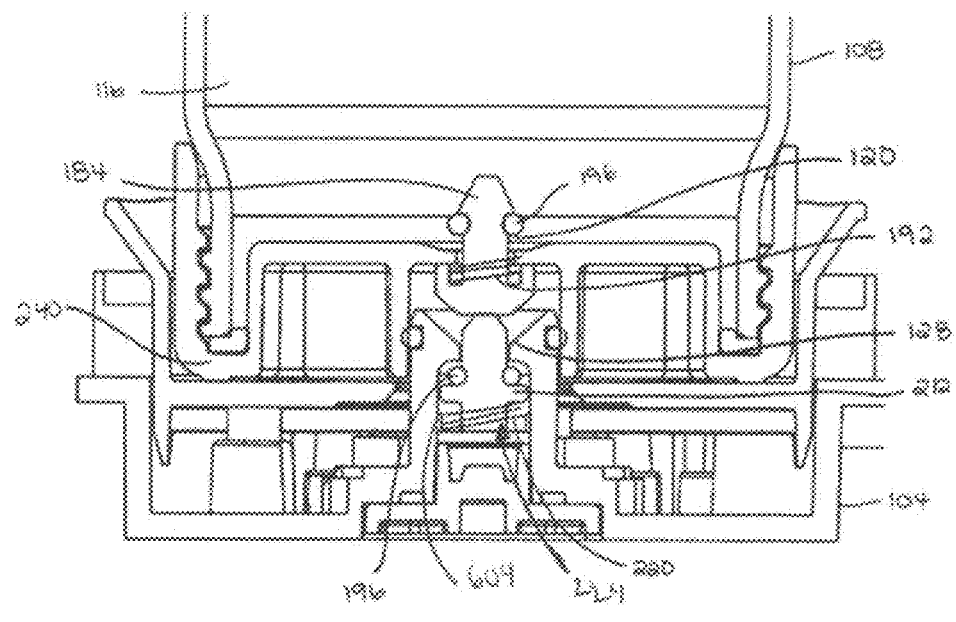

FIGS. 29A and 29B are partial cross-sectional views taken along line 3-3 in FIG. 2, with the beverage carbonation system in a container disengaged position and container engaged position, respectively; and FIGS. 30A and 30B are partial cross-sectional views taken along line 3-3 in FIG. 2, with the beverage carbonation system in a container disengaged position and container engaged position, respectively.

SUMMARY

In one aspect, a carbonation pod for depositing carbon dioxide generating material into a carbonation chamber of a beverage carbonator is disclosed. The carbonation pod may include a dissolvable pod shell that is flexible and rapidly water-dissolvable, a granular carbonate material and a granular acid material. The dissolvable pod shell may define separate first and second compartments. The first compartment may be sealed from the second compartment. The granular carbonate material may be sealed within the first compartment. The granular carbonate material may be water-dissolvable. The granular acid material may be sealed within the second compartment. The granular acid material may be water-dissolvable. The granular carbonate material may react with the granular acid material at least when mixed together in water to generate carbon dioxide gas.

In another aspect, a beverage carbonation system is disclosed. The beverage carbonation system may include a carbonation pod and a beverage carbonator. The carbonation pod may include a dissolvable pod shell that is flexible and rapidly water-dissolvable, a granular carbonate material and a granular acid material. The dissolvable pod shell may define separate first and second compartments. The first compartment may be sealed from the second compartment. The granular carbonate material may be sealed within the first compartment. The granular carbonate material may be water-dissolvable. The granular acid material may be sealed within the second compartment. The granular acid material may be water-dissolvable. The granular carbonate material may react with the granular acid material at least when mixed together in water to generate carbon dioxide gas. The beverage carbonator may include a carbonation chamber having a carbonation pod insertion inlet, a fluid inlet, a carbon dioxide outlet, and a carbonation pod seat. The carbonation pod seat may be positioned to receive the carbonation pod deposited into the carbonation chamber through the carbonation pod insertion inlet. The carbonation pod seat and the fluid inlet may be arranged to expose the carbonation pod seated on the carbonation pod seat to water introduced into the carbonation chamber through the fluid inlet.

In another aspect, a method of generating carbon dioxide gas for a beverage is disclosed. The method may include: depositing a carbonation pod through a carbonation pod insertion inlet of a carbonation chamber onto a carbonation pod seat within the carbonation chamber, the carbonation pod having a dissolvable pod shell that is flexible and rapidly water-dissolvable, the dissolvable pod shell defining separate first and second compartments, the first compartment sealing a granular carbonate material, the second compartment sealing a granular acid material; delivering a volume of water through a carbonation chamber fluid inlet into the carbonation chamber, at least partially dissolving the dissolvable shell with the water that was delivered into the carbonation chamber, mixing the granular carbonate material and granular acid material that have been released from their respective compartments in the at least partially dissolved dissolvable shell; and generating carbon dioxide gas from the mixed granular carbonate material and granular acid material.

In another aspect, a method of carbonating a beverage is disclosed. The method may include: connecting a beverage container to a beverage carbonator, the beverage container containing the beverage; receiving a carbonation signal associated with a user request to carbonate the beverage in the beverage container; detecting a temperature of the beverage; determining a customized carbonation duration, based at least in part on the detected temperature, to obtain a targeted carbonation level in the beverage; and directing carbon dioxide gas into contact with the beverage until expiry of the customized carbonation duration.

In another aspect, a beverage carbonation system for carbonating a beverage is disclosed. The beverage carbonation system may include a beverage carbonator, a beverage container connectable to the beverage carbonator, a server computer communicatively coupled to the beverage carbonator, and a beverage temperature sensor. The beverage container may contain the beverage. Each of the beverage carbonator and the server computer may have one or more processors. The beverage temperature sensor may be communicatively coupled to the one or more processors of the beverage carbonator and the server computer. The one or more processors of the beverage carbonator and the server computer may be configured to collectively: receive a carbonation signal associated with a user request to carbonate the beverage in the beverage container; receive, from the beverage temperature sensor, a temperature signal associated with a detected temperature of the beverage; determine a customized carbonation duration, based at least in part on the detected temperature, to obtain a targeted carbonation level in the beverage; and direct carbon dioxide gas into contact with the beverage until expiry of the customized carbonation duration.

In another aspect, a beverage carbonation system for carbonating a beverage is disclosed. The beverage carbonation system may include a beverage carbonator having one or more processors, a beverage container connectable to the beverage carbonator, and a beverage temperature sensor communicatively coupled to the one or more processors of the beverage carbonator at least when the beverage container is connected to the beverage carbonator. The beverage container may contain the beverage. The one or more processors of the beverage carbonator may be configured to collectively: receive a carbonation signal associated with a user request to carbonate the beverage in the beverage container; receive, from the beverage temperature sensor, a temperature signal associated with a detected temperature of the beverage; determine a customized carbonation duration, based at least in part on the detected temperature, to obtain a targeted carbonation level in the beverage; and direct carbon dioxide gas into contact with the beverage until expiry of the customized carbonation duration.

DESCRIPTION OF VARIOUS EMBODIMENTS

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment", "embodiment", "embodiments", "the embodiment", "the embodiments", "one or more embodiments", "some embodiments", and "one embodiment" mean "one or more (but not all) embodiments of the present invention(s)", unless expressly specified otherwise.

The terms "including", "comprising" and variations thereof mean "including but not limited to", unless expressly specified otherwise. A listing of items does not imply that any or all of the items are mutually exclusive, unless expressly specified otherwise. The terms "a", "an" and "the" mean "one or more", unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

As used herein and in the claims, a first element is said to be 'communicatively coupled to' or 'communicatively connected to' or 'connected in communication with' a second element where the first element is configured to send or receive electronic signals (e.g. data) to or from the second element, and the second element is configured to receive or send the electronic signals from or to the first element. The communication may be wired (e.g. the first and second elements are connected by one or more data cables), or wireless (e.g. at least one of the first and second elements has a wireless transmitter, and at least the other of the first and second elements has a wireless receiver). The electronic signals may be analog or digital. The communication may be one-way or two-way. In some cases, the communication may conform to one or more standard protocols (e.g. SPI, $I^2C$, Bluetooth™, or IEEE™ 802.11).

As used herein and in the claims, two components are said to be "fluidly connected" or "fluidly coupled" where the two components are positioned along a common fluid flow path. "Fluid" refers to liquid and/or gas. The fluid connection may be formed in any manner that can transfer fluids between the two components, such as by a fluid conduit which may be formed as a pipe, hose, channel, or bored passageway. One or more other components can be positioned between the two fluidly coupled components. Two components described as being "downstream" or "upstream" of one another, are by implication fluidly connected.

As used herein and in the claims, a group of elements are said to 'collectively' perform an act where that act is performed by any one of the elements in the group, or performed cooperatively by two or more (or all) elements in the group.

Some elements herein may be identified by a part number, which is composed of a base number followed by an alphabetical or subscript-numerical suffix (e.g. $112a$, or $112_1$). Multiple elements herein may be identified by part numbers that share a base number in common and that differ by their suffixes (e.g. $112_1$, $112_2$, and $112_3$). All elements with a common base number may be referred to collectively or generically using the base number without a suffix (e.g. 112).

Reference is first made to FIGS. 1-4. Embodiments herein relate to a beverage carbonation system, referred to generally as 100. As shown, beverage carbonation system 100 includes a beverage carbonator 104 and a beverage container 108. In use, the beverage container 108 can be filled with a liquid beverage (e.g. water, juice, wine, etc.), the beverage container 108 connected to the beverage carbonator 104, and the beverage carbonator 104 activated to carbonate the beverage. In the result, the beverage container 108 holds a carbonated liquid beverage.

The beverage carbonation system 100 may carbonate the beverage in-situ within the beverage container 108. That is, the beverage may at all times remain in the beverage container 108 from the time the beverage container 108 is connected to the beverage carbonator 104 until the beverage container 108 is removed from the beverage carbonator 104. When compared to a system that moves the beverage into the beverage carbonator, this can avoid the beverage spoiling a fluid flow path in the beverage carbonator. For example, a juice or sugary drink beverage can form a sticky residue within the fluid flow path when dried. In some cases, such spoiling can cause damage to the beverage carbonator, contaminate subsequently carbonated beverages, and/or require time consuming maintenance (e.g. flushing the beverage carbonator with a cleaning agent).

Figure 3:
FIG. 3 is a cross-sectional view taken along line 3-3 in FIG. 2, with the beverage container disengaged with the beverage carbonator.
Figure 3:
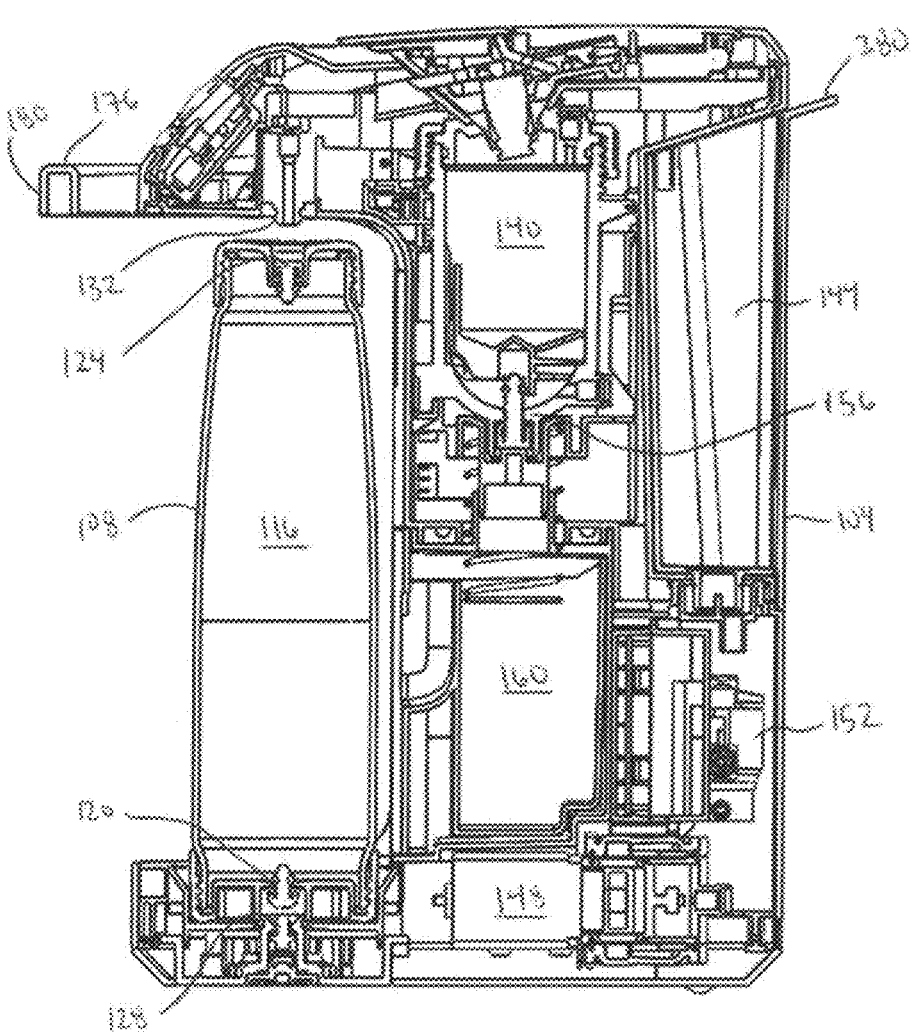
Figure 4:
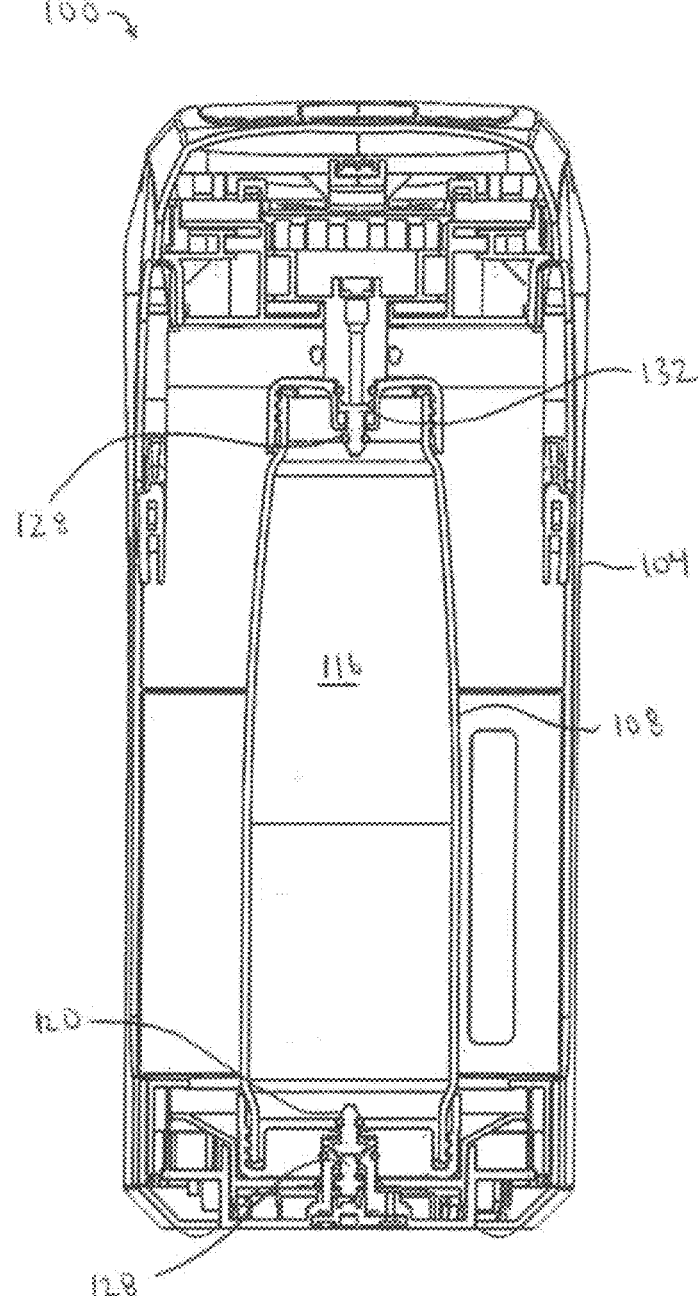
FIG. 4 is a cross-sectional view taken along line 4-4 in FIG. 2, with the beverage container engaged with the beverage carbonator.

Referring to FIGS. 3-4, beverage container 108 (e.g. a bottle) includes an inner volume 116, a container inlet 120 to admit gas (e.g. carbon dioxide gas) into inner volume 116, and a container outlet 124 to discharge gas (e.g. carbon dioxide gas) from inner volume 116. As shown in FIG. 3, beverage carbonator 104 includes a carbonation chamber 140 where carbon dioxide gas is generated. As will be described below, carbonation chamber 140 is fluidly coupled to the beverage container 108 when the beverage container 108 is engaged with the beverage carbonator 104. This allows carbon dioxide gas generated in the carbonation chamber 140 to flow into the beverage container 108 and thereby carbonate the beverage within the beverage container 108. In some embodiments, inner volume 116 of beverage container 108 is between 250 mL to 2 L, such as for example 500 ml to 1 L.

In the example shown, beverage carbonator 104 includes a carbonator outlet 128 to discharge carbon dioxide gas generated in the carbonation chamber 140 into container inlet 120, and a carbonator inlet 132 to receive carbon dioxide gas from container outlet 124 into beverage carbonator 104. Although hidden from view in FIGS. 3-4, a carbonator fluid flow path 136 (FIG. 9) extends between carbonator inlet 132 and carbonator outlet 128 so that carbon dioxide gas received from container outlet 124 can be recirculated back into the beverage container 108 at container inlet 120. In an alternative embodiment, beverage carbonator 104 may not include a carbonation inlet 132. In such an embodiment, container outlet 124 may act to vent unabsorbed carbon dioxide gas from inner volume 116 into the surrounding environment.

In the example shown, beverage carbonator 104 includes a water reservoir 144 for supplying water to carbonation chamber 140, and a pump 148 that acts to move water from water reservoir 144 into carbonation chamber 140. Pump 148 may also act to recirculate carbon dioxide gas from carbonator inlet 132 to carbonator outlet 128. In an alternative embodiment, beverage carbonator 104 may not require a pump 148 to move water from water reservoir 144 into carbonation chamber 140. For example, water reservoir 144 may be positioned above carbonation chamber 140 so that water may be moved by gravity (i.e. gravity-fed) from water reservoir 144 into carbonator chamber 140. In another alternative embodiment, beverage carbonator 104 may not include a water reservoir 144 and/or a pump 148. In this embodiment, carbonation chamber 140 may receive water from a building's water supply (e.g. a water line may connect carbonation chamber 140 to the building's water supply).

In the example shown, beverage carbonator 104 also includes a flow valve 152 to fluidly connect pump 148 to water reservoir 144 or to carbonator inlet 132 in different system states. Flow valve 152 may include electronics and electro-mechanical compartments. For example, flow valve 152 may include a processor (e.g. a microcontroller) that toggles the state of one or more solenoids in response to determining that pressure readings from one or more pressure sensors indicate a system gas pressure which exceeds the predetermined threshold. An advantage of this design is that the processor can be reprogrammed with a different predetermined threshold, e.g. based on a selected user mode of operation (e.g. carbonation level). In an alternative embodiment, flow valve 152 may be mechanical. That is, mechanical flow valve 152 may operate to toggle fluid connections to pump 148 in response to system gas pressure, as described above, without electronics or electro-mechanical components. In some embodiments, flow valve 152 can include features of the flow valves disclosed in U.S. Patent Publication No. 2020/0156019 A1, the entire contents of which is hereby incorporated herein by reference.

In an alternative embodiment, beverage carbonator 104 may not include such a flow valve 152. For example, beverage carbonator 104 may include a first dedicated pump that acts to move water from water reservoir 144 into carbonation chamber 140 and a second dedicated pump that acts to recirculate carbon dioxide gas from carbonator inlet 132 to carbonator outlet 128.

Carbonation chamber 140 is shown having a byproduct outlet 156 to discharge byproduct waste from carbonation chamber 140 into an emptyable (e.g. removable) byproduct container 160. Byproduct container 160 may be emptied periodically as needed (e.g. by dumping byproduct waste into a sink).

Referring again to FIGS. 1-2, beverage carbonator 104 includes a container engagement actuator 176. In the example shown, container engagement actuator 176 may include a manually user-operable lever 180 that is movable (e.g. rotatable) to engage and disengage beverage container 108 from beverage carbonator 104. FIG. 3 shows container engagement actuator 176 in a container disengaged position (e.g. lever 180 is fully raised). When the engagement actuator 176 is in the container disengaged position, beverage container inlet 120 and carbonator outlet 128 are unsealed, and container outlet 124 and carbonator inlet 132 are unsealed. Accordingly, when the container engagement actuator 176 is in the container disengaged position, beverage container 108 may be disconnected (i.e. removed) from beverage carbonator 104.

Figure 24:
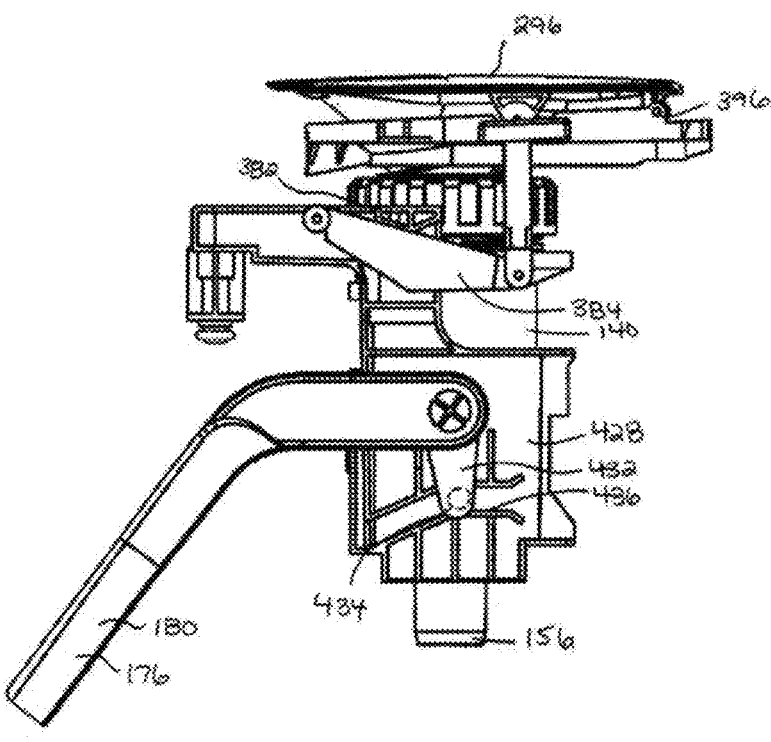
FIG. 24 is the side elevation view of FIG. 23, with the engagement actuator in an engaged position and exterior door closed.

By moving container engagement member 176 (e.g. lowering lever 180), a user can engage the beverage container 108 with the beverage carbonator 104. With reference to FIGS. 4 and 24, when the engagement actuator 176 is in a container engaged position (e.g. lever 180 is fully lowered), beverage container inlet 120 and carbonator outlet 128 are fluidly coupled, and container outlet 124 and carbonator inlet 132 are fluidly coupled. Container inlet and outlet 120, 124 and carbonator inlet and outlet 128, 132 may be fluidly connected in any manner that allows container inlet and outlet 120, 124 to reclose to seal container inner volume 116.

Due to the fluid connection between container inlet 120 and carbonation outlet 128, carbon dioxide gas generated in carbonation chamber 140 may flow into beverage container 108 at container inlet 120. Further, due to the fluid connection between container outlet 124 and carbonation inlet 132, any carbon dioxide gas that passes through the beverage container 108 without being absorbed into the beverage may pass back into to beverage carbonator 104 at carbonator inlet 132. As discussed above, this carbon dioxide gas can be recirculated along fluid flow path 136 (FIG. 9) back into beverage container 108 at container inlet 120. This allows a volume of carbon dioxide gas generated by beverage carbonator 104 to make repeated contact with the beverage inside beverage container 108, and thereby accelerate absorption into the beverage as compared with relying on the diffusion of carbon dioxide gas, which has accumulated in the container headspace, into the liquid below. Consequently, beverage carbonation system 100 may take less time to carbonate a beverage, all else being equal.

Figure 1:
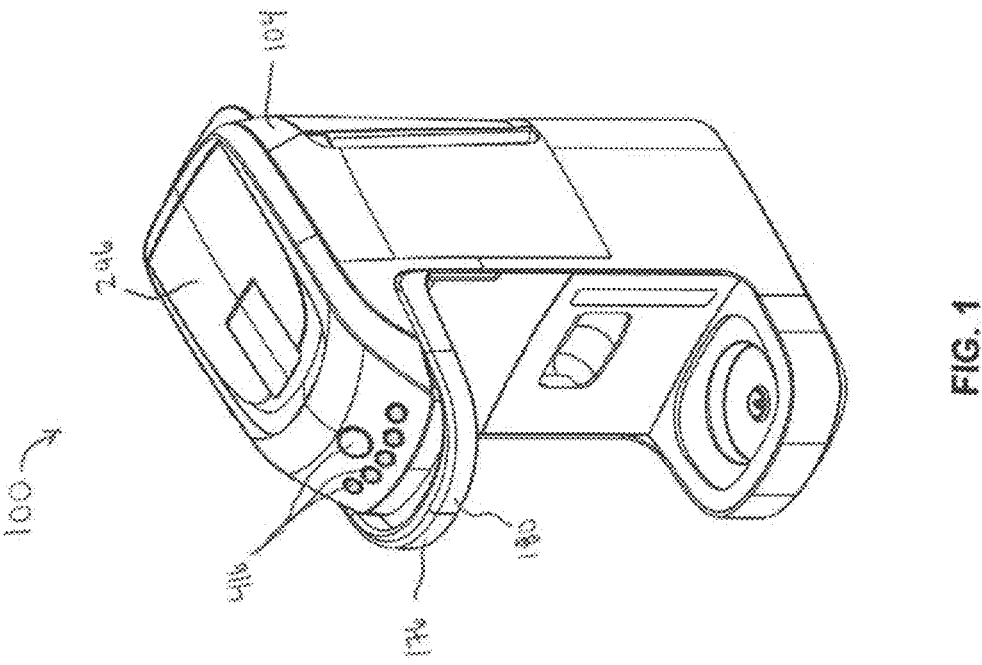
FIG. 1 is a perspective view of an example beverage carbonator.
Figure 5:
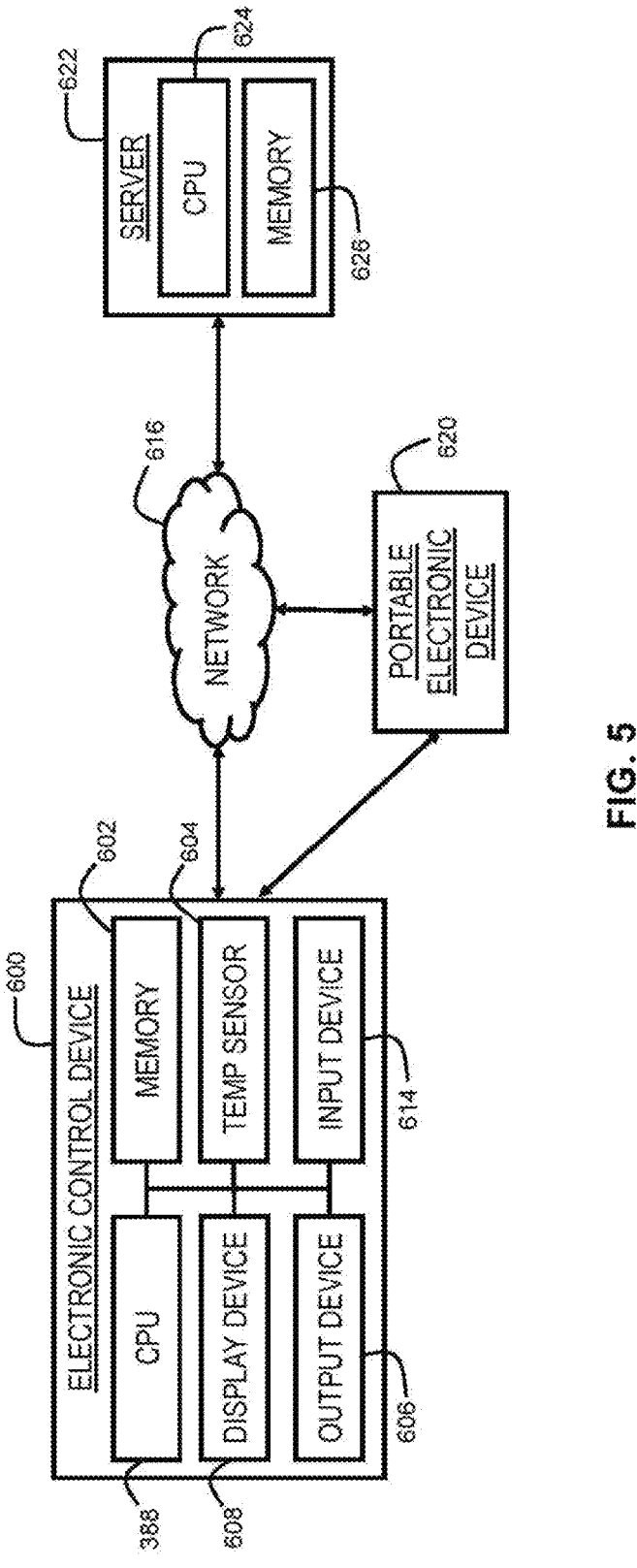
FIG. 5 is a schematic illustration of an example electronic control device of the beverage carbonator of FIG. 1 shown communicatively coupled to a portable electronic device and a server computer.

In some embodiments, beverage carbonator 104 includes an electronic control device with an electronic controller 388 (also referred to as "processor 388") (FIG. 5). The electronic control device may include one or more inputs (e.g. user inputs) and outputs (e.g. valves, relays, switches, or pumps) that are communicatively coupled to electronic controller 388 and operated by control signals from electronic controller 388. For example, electronic controller 388 may determine the timing of events (e.g. activation of flow valve 152 and pump 148) based on a carbonation program stored in memory. In some cases, electronic controller 388 is responsive to inputs from, e.g. user inputs 416 (FIGS. 1-2). For example, a user may manipulate user inputs 416 to direct the operation of electronic controller 388 (e.g. to select a carbonation level, start a carbonation operation, or stop a carbonation operation).

Reference is made to FIG. 5, which shows a schematic illustration of an example electronic control device 600 of beverage carbonator 104. As shown, electronic control device 600 may include a connection with a network 616 such as a wired or wireless connection to the Internet or to a private network. In some cases, network 616 includes other types of computer or telecommunication networks.

The schematic of FIG. 5 illustrates the connection of electronic control device 600 to a portable electronic device 620. As shown, portable electronic device 620 can be communicatively connected to electronic control device 600 through a wireless network 616 (e.g. wireless access network, Bluetooth®, etc.) and/or through a wired connection (e.g. USB). These connections can allow electronic control device 600 of beverage carbonator 104 to communicate and/or relay signals with portable electronic device 620. Portable electronic device 620 may include a smart phone, tablet or notebook computer, for example.

In at least one embodiment, a user may be able to control operation of beverage carbonator 104 (e.g. start or stop a carbonation operation, select a carbonation level, etc.) by accessing a website or running a program on portable electronic device 620. For example, portable electronic device 620 may send control signals to electronic controller 388, and in response, electronic controller 388 may activate pump 148 and/or flow valve 152 in accordance with those control signals.

In the example shown, electronic control device 600 includes a processor 388, a memory 602, a temperature sensor 604, an output device 606, a display device 608, and an input device 614. Each of memory 602, temperature sensor 604, output device 606, display device 608, and input device 614 are communicatively coupled to processor 388, directly or indirectly. In some embodiments, electronic control device 600 includes multiple of any one or more of processor 388, memory 602, temperature sensor 604, output device 606, display device 608, and input device 614. In some embodiments, electronic control device 600 does not include one or more of temperature sensor 604, network connections, output devices 606, display devices 608, and input devices 614. For example, electronic control device 600 may not include temperature sensor 604, and/or may not include output device 606, and/or may not include display device 608, and/or may not include input device 614.

In some embodiments, electronic control device 600 is a single, unitary device that houses all of its subcomponents (processor 388, memory 602, etc.). In other embodiments, electronic control device 600 is composed of two or more discrete subdevices that are communicatively coupled to each other, that collectively include all of the subcomponents of electronic control device 600 (processor 388, memory 602, temperature sensor 604, etc.), and that collectively provide the functionality described herein.

Memory 602 can include random access memory (RAM), read only memory (ROM), or similar types of memory. Also, in some embodiments, memory 602 stores one or more applications for execution by processor 388. Applications correspond with software modules including computer executable instructions to perform processing for the functions and methods described below (e.g. one or more carbonation programs). In some embodiments, some or all of memory 602 may be integrated with processor 388. For example, processor 388 may be a microcontroller (e.g. Microchip™ AVR, Microchip™ PIC, or ARM™ microcontroller) with onboard volatile and/or non-volatile memory.

Generally, processor 388 can execute computer readable instructions (also referred to as applications or programs). The computer readable instructions can be stored in memory 602, or can be received from remote storage accessible through network 616, for example. When executed, the computer readable instructions can configure processor 388 (or multiple processors 388, collectively) to perform the acts described herein with reference to beverage carbonator 104, for example.

Output device 606 can include any device for outputting data, such as for example speakers. In at least one embodiment, output device 606 includes one or more of output ports and wireless radios (e.g. Bluetooth®, or 802.11x) for making wired and/or wireless connections to external devices (e.g. for sending alerts, such as a carbonation complete notification or error notification to portable electronic device 620).

Display device 608 can include any type of device for presenting visual information. For example, display device 608 can be a computer monitor, a flat-screen display, or a display panel (e.g. OLED, LCD, or TFT display panel).

Input device 614 can include any device for entering information into electronic control device 600. Input device 614 can be a keyboard, key pad, button, switch, cursor-control device, touch-screen, camera, or microphone. For example, referring to FIGS. 1-2, input device 614 is shown as multiple user inputs 416 located on the front of beverage carbonator. Input device 614 can also include input ports and wireless radios (e.g. Bluetooth®, or 802.11x) for making wired and wireless connections to external devices (e.g. for sending control signals, such as user selections, to processor 388 from portable electronic device 620).

FIG. 5 illustrates one example hardware schematic of an electronic control device 600. In alternative embodiments, electronic control device 600 contains fewer, additional or different components. In addition, although aspects of an implementation of electronic control device 600 are described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM.

The schematic of FIG. 5 illustrates the connection of electronic control device 600 to a remote server computer 622 across network 616 (e.g. a wired or wireless access network, which may include a private network and/or a public network such as the internet). This connection can allow electronic control device 600 and server computer 622 to communicate and/or relay signals with each other. For simplicity of illustration, only one electronic control device 600 is shown connected to server computer 622. However, multiple electronic control devices 600 may be concurrently connected to server computer 622. Accordingly, server computer 622 can be communicatively coupled with multiple beverage carbonators 104 at a given time.

In the example shown, server computer 622 includes a processor 624 and a memory 626. Memory 626 is communicatively coupled to processor 624, directly or indirectly. In some embodiments, server computer 622 includes multiple of any one or both of processor 624 and memory 626. In some embodiments, server computer 622 is a single, unitary device that houses all of its subcomponents (processor 624 and memory 626). In other embodiments, server computer 622 is composed of two or more discrete subdevices that are communicatively coupled to each other, that collectively include all of the subcomponents of server computer 622 (processor 624 and memory 626), and that collectively provide the functionality described herein.

Memory 626 can include random access memory (RAM), read only memory (ROM), or similar types of memory. Also, in some embodiments, memory 626 stores one or more applications for execution by processor 624.

The schematic of FIG. 5 illustrates the connection of remote server computer 622 to a portable electronic device 620. As shown, portable electronic device 620 can be connected to electronic control device 600 through a wireless network 616 (e.g. wireless access network, Bluetooth®, etc.). Such a connection can allow processor 624 of server computer 622 to communicate and/or relay signals with portable electronic device 620.

In at least one embodiment, a user may be able to control operation of beverage carbonator 104 (e.g. start or stop a carbonation operation, select a carbonation level, etc.) via server computer 622. For example, portable electronic device 620 may send control signals to server computer 622, which in turn may relay the control signals to electronic controller 388 (or generate and send control signals to electronic controller 388), and in response, electronic controller 388 may activate pump 148 and/or flow valve 152 in accordance with those control signals.

In some embodiments, electronic control device 600 stores information in a remote storage device, such as memory 626 of remote server computer 622, accessible across a network, such as wireless network 616 or another suitable network. In some embodiments, electronic control device 600 stores information distributed across multiple storage devices, such as memory 602 and memory 626 (i.e. each of the multiple storage devices stores a portion of the information and collectively the multiple storage devices store all of the information). Accordingly, storing data on a storage device as used herein and in the claims, means storing that data in a local storage device, storing that data in a remote storage device, or storing that data distributed across multiple storage devices, each of which can be local or remote.

Generally, processor 624 can execute computer readable instructions (also referred to as applications or programs). In some embodiments, processor 388 of electronic control device 600 and processor 624 of server computer 622 are configured to collectively execute computer readable instructions. That is, when executed, the computer readable instructions can collectively configure processors 388, 624 to perform the acts described herein with reference to beverage carbonator 104, for example.

Figures 6A, 6B:
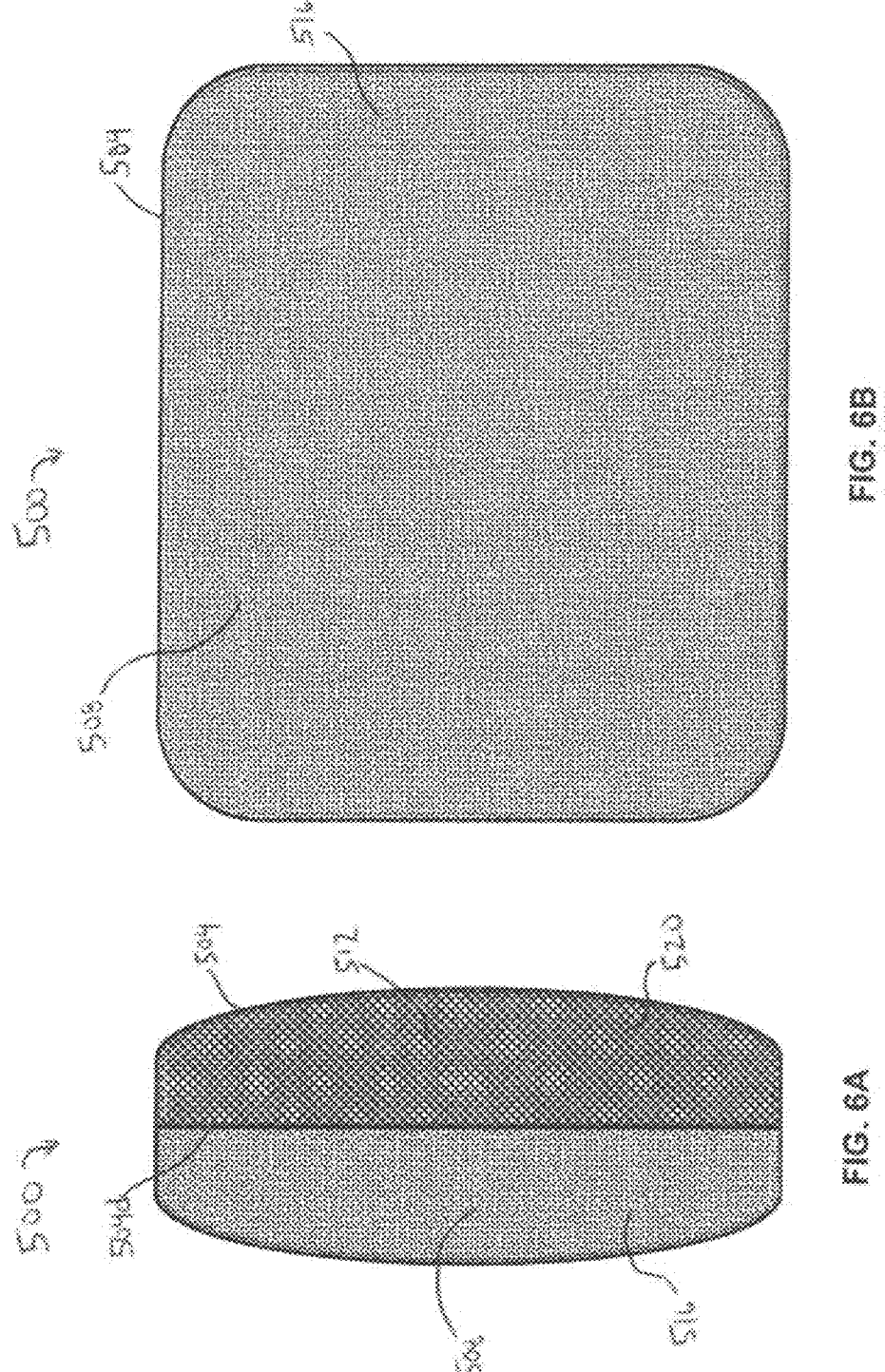
FIGS. 6A-6B are top and side views of an example carbonation pod.

Reference is now made to FIGS. 6A-6B, which illustrate an example carbonation pod, referred to generally as 500. As will be described below, carbonation pod 500 contains carbon dioxide generating material that comprises at least two ingredients. The two ingredients may be any substances that, when combined form a carbon dioxide generating material, which in an aqueous mixture, reacts to produce carbon dioxide gas. The two ingredients may be solid or liquid. Thus, to provide a source of carbon dioxide gas, a carbonation pod 500 can be deposited into a carbonation chamber 140 of a beverage carbonator 104 (FIG. 3) before activating beverage carbonator 104 to carbonate a beverage.

Carbonation pod 500 can include a dissolvable pod shell 504, which is flexible and rapidly water-dissolvable. As used herein and in the claims, rapidly dissolvable means at least 50% dissolved when exposed to water for 15 minutes. Pod shell 504 may be formed of a water-soluble synthetic polymer, such as polyvinyl alcohol (PVA), thermoplastic polymers (e.g. polylactic acid), or cellulose esters (e.g. cellulose acetate or nitrocellulose). In some embodiments, pod shell 504 is compostable and includes polyhydroxyalkanoates (e.g. poly-3-hydroxybutyrate (PHB), polyhydroxyvalerate (PHV), or polyhydroxyhexanoate (PHH)), cellulose esters (e.g. cellulose acetate or nitrocellulose), or polyanhydrides. Pod shell 504 may also include any water-soluble material that is considered generally recognized as safe ("GRAS") by the U.S. Food and Drug Administration (e.g. on the FDA's GRAS list).

Pod shell 504 may define at least two separated and sealed compartments. In the example shown, pod shell 504 defines separated and sealed first and second compartments 508, 512. In the example shown, a granular carbonate material 516 is sealed within first compartment 508, while a granular acid material 520 is sealed within second compartment 512. Generally, granular carbonate material 516 and granular acid material 520 are relatively inexpensive, non-toxic, easy to transport, and easy to handle. However, in alternative embodiments, one or both of the sealed carbonate and acid materials are liquid. Each of granular carbonate material 516 and granular acid material 520 may be water-dissolvable.

Granular carbonate material 516 reacts with granular acid material 520 when mixed together in water (i.e. an aqueous solution) to generate carbon dioxide gas. To prevent premature reaction between granular carbonate material 516 and granular acid material 520 (e.g. while pod 500 is still in retail packaging), first and second compartments 508, 512 are sealed from each other. Sealing the granular carbonate material 516 and granular acid material 520 within respective compartments defined by pod shell 504 can help to extend the shelf life of carbonation pod 500. Pod shell 504 can block entry of air moisture that could otherwise react with the granular carbonate material 516 and/or granular acid material 520 and thereby reduce their carbon dioxide generating capacity over time. It is not until at least a portion of the granular carbonate material 516 and granular acid material 520 are released (i.e. unsealed) from their respective compartments that a carbon dioxide generating reaction can occur. Thus, by dissolving pod shell 504 in water one can expose granular carbonate material 516 to granular acid material 520 by unsealing first and second compartments 508, 512. In some embodiments, pod shell 504 is at least 50% dissolved when exposed to water for 5 minutes, such as for example 75% to 100% dissolved, such as approximately 90% to 100% dissolved.

In some embodiments, first and second compartments 508, 512 are adjacent. For example, as shown in FIG. 6A, a portion of pod shell 504 forms a common dividing wall 504d that separates and seals first compartment 508 from second compartment 512. Such an arrangement may facilitate mixing of the granular carbonate material 516 and the granular acid material 520.

Granular carbonate material 516 may include one or more water soluble carbonates (e.g. potassium bicarbonate $KHCO_3$, sodium bicarbonate $NaHCO_3$, ammonium carbonate $(NH_4)_2CO_3$, lithium carbonate $Li_2CO_3$, etc.). Granular acid material 520 may include one or more carboxylic acids in powdered form (e.g. citric acid $C_6H_8O_7$, acetic acid $CH_3COOH$, propionic acid $C_3H_6O_2$, etc.). In general, smaller carboxylic acids (one to five carbon atoms) tend to be more soluble in water than larger carboxylic acids (six carbon atoms and above) due to the increasing hydrophobic nature of the hydrocarbon chains.

In some embodiments, granular carbonate material 516 is granular sodium bicarbonate and granular acid material 520 is granular citric acid. Sodium bicarbonate and citric acid are advantageous for mixing with water because their reaction does not create heat. This may be desirable for producing a cooled carbonated beverage. In addition, the reaction of sodium bicarbonate and citric acid generates carbon dioxide gas having little to no taste. This can be advantageous for carbonating beverages since the taste of the carbon dioxide gas should not detract from the taste of the beverage itself. Moreover, granular citric acid and sodium bicarbonate may be relatively inexpensive, non-toxic, easy to transport, and easy to handle. All else being equal, sodium bicarbonate may generate more carbon dioxide gas than the same quantity of other carbonates. In alternative embodiments, granular carbonate material 516 and granular acid material 520, when mixed in an aqueous solution, may react exothermically to produce carbon dioxide gas.

In the presence of water, citric acid ($C_6H_8O_7$) and sodium bicarbonate ($NaHCO_3$) react to form sodium citrate ($Na_3C_6H_5O_7$), water ($H_2O$) and carbon dioxide ($CO_2$). The reaction may be written as:

$$C_6H_8O_7 + 3NaHCO_3 \rightarrow Na_3C_6H_5O_7 + 3H_2O + 3CO_2$$

Accordingly, the reaction of citric acid and sodium bicarbonate within carbonation chamber 140 produces carbon dioxide gas, water and sodium citrate. Water and sodium citrate, as well as the dissolved shell pod 504, may be referred to herein as "byproduct waste". The byproduct waste may have a viscosity greater than water or a viscosity equal to or less than water.

As discussed above, the byproduct waste may be discharged from carbonation chamber 140 into byproduct container 160 via byproduct outlet 156 (FIG. 3). It will be appreciated that the composition of the byproduct waste depends on which granular carbonate material 516 and granular acid material 520 are respectively sealed in first and second compartments 508, 512 of carbonation pod 500, and the composition of the dissolvable pod shell 504. That is, different combinations of granular carbonate material 516 (e.g. potassium bicarbonate) and granular acid material 520 (e.g. acetic acid), and different compositions of dissolvable pod shell 504 (e.g. PVA) generate different byproduct waste compositions.

In some embodiments, between 5 g and 25 g of granular carbonate material 516 may be sealed within first compartment 508, such as for example, 10 g to 20 g, such as approximately 10 g to 15 g. In some embodiments, between 5 g and 25 g of granular acid material 520 may be sealed within second compartment 512, such as for example, 10 g to 20 g, such as approximately 10 g to 15 g. In some embodiments, a ratio of granular carbonate material to granular acid material is between 1:1 and 1.5:1.

The commonly accepted industry measurement of carbonation level is volume of $CO_2$ gas (in litres, measured at the temperature of the beverage) over the volume of carbonated beverage (in litres), typically expressed as a ratio over 1. For example, a carbonation level of 2.5 equates to 2.5 L of $CO_2$ gas absorbed in 1 L of carbonated beverage. Generally, a carbonated beverage with a carbonation level above 3.0 is perceived as strongly carbonated, while a carbonated beverage with a carbonation level above 3.5 is perceived as very strongly carbonated.

In some embodiments, first and second compartments 508, 512 may have a collective internal volume between 15 mL and 50 mL, such as for example, 20 mL to 40 mL, such as approximately 25 mL to 35 mL. It will be appreciated that the collective internal volume of first and second compartments 508, 512 may be based on the quantity of granular carbonate material 516 and granular acid material 520 sealed within respective first and second compartments 508, 512. That is, an internal volume of first compartment 508 and an internal volume of second compartment 512 must be sufficient to accommodate respective quantities of granular carbonate material 516 and granular acid material 520.

In some embodiments, the quantity of granular carbonate material 516 and granular acid material 520 may be selected so that when reacted in water a sufficient volume of carbon dioxide gas is generated to carbonate a beverage to a very high carbonation level (e.g. a carbonation level of at least 4). This can allow carbonation pod 500 to generate a sufficient volume of carbon dioxide gas to carbonate a beverage to any target carbonation level at or below this very high carbonation level. In terms of both manufacturing cost and consumer ease, it may be advantageous to produce one standardized carbonation pod 500 that can be used to produce a carbonated beverage within a wide range of carbonation levels (e.g. from very low to very high carbonation).

In some embodiments, an aqueous mixture of granular carbonate material 516 and granular acid material 520 generates between 2 L and 6 L of carbon dioxide gas, such as for example 2.5 L to 5 L, such as approximately 3.5 L to 4.5 L (measured at a pressure of 1 atm and a temperature of 25° C.).

As an example, carbonation pod 500 may have 14 g of granular sodium bicarbonate sealed within first compartment 508. When mixed together in water, 14 g of granular sodium bicarbonate can react with granular acid material to generate up to 4074 mL of carbon dioxide gas (measured at 1 atm and 25° C.). This can be calculated as follows:

(1) Determine the mole-to-mole ratio of sodium bicarbonate ($NaHCO_3$) to carbon dioxide ($CO_2$) from balanced equation.

$$C_6H_8O_7 + 3NaHCO_3 \rightarrow Na_3C_6H_5O_7 + 3H_2O + 3CO_2$$

The mole-to-mole ratio of $NaHCO_3$ to $CO_2$ from balanced equation is 3:3 (or 1:1).

(2) Estimate the molar volume of $CO_2$ using the ideal gas law at a pressure of 1 atm and a temperature of 298 K (approximately 25° C.)

$$\frac{V}{n} =$$

$$\frac{RT}{P} = \frac{(82.06 \text{ mL} \cdot \text{atm} \cdot \text{mol}^{-1} \cdot \text{K}^{-1}) \times (298 \text{ K})}{1 \text{ atm}} = 2.445388 \times 10^4 \text{ mL/mol}$$

The molar volume of carbon dioxide is $2.45 \times 10^4$ mL/mol at a pressure of 1 atm and a temperature of 298 K.

(3) Determine the molar mass of sodium bicarbonate ($NaHCO_3$). The atomic weights of sodium (NA), hydrogen (H), carbon (C) and oxygen (O) are 22.99, 1.01, 12.01, and 16, respectively.

$$22.99 + 1.01 + 12.01 + 3 \cdot (16.00) = 84.0 \text{ g/mol NaHCO}_3$$

The molar mass of sodium bicarbonate is approximately 84.0 g/mol.

(4) Convert grams (g) of sodium bicarbonate ($NaHCO_3$) into millilitres (mL) of carbon dioxide ($CO_2$) gas using the mole-to-mole ratio of $NaHCO_3$ to $CO_2$ determined in (1), the molar volume of $CO_2$ estimated in (2) and the molar mass of $NaHCO_3$ determined in (3).

$$14 \text{ g NaHCO}_3 \times \left( \frac{1 \text{ mol NaHCO}_3}{84.0 \text{ g NaHCO}_3} \right) \times \left( \frac{2.45 \times 10^4 \text{ mL CO}_2}{1 \text{ mol CO}_2} \right) =$$

$$4074 \text{ ml CO}_2$$

Accordingly, a carbonation pod 500 with 14 g of granular sodium bicarbonate sealed within first compartment 508 can generate over 4 L of carbon dioxide gas if fully reacted. Sealing a sufficient quantity of granular citric acid within second compartment 512 can help ensure that all of the provided granular sodium bicarbonate is reacted. This can maximize carbon dioxide gas production for a given quantity of granular sodium bicarbonate. In order to fully react 14 g of granular sodium bicarbonate, 11 g of granular citric acid can be sealed within second compartment 512. This can be calculated as follows:

(1) Determine the mole-to-mole ratio of citric acid ($C_6H_8O_7$) to sodium bicarbonate ($NaHCO_3$) from balanced equation.

$$C_6H_8O_7 + 3NaHCO_3 \rightarrow Na_3C_6H_5O_7 + 3H_2O + 3CO_2$$

The mole-to-mole ratio of $C_6H_8O_7$ to $NaHCO_3$ from balanced equation is 1:3

(2) Determine the molar mass of citric acid ($C_6H_8O_7$) and sodium bicarbonate ($NaHCO_3$). The atomic weights of carbon (C), hydrogen (H), and oxygen (O) are 12.01, 1.01, and 16, respectively.

$$6 \cdot (12.01) + 8 \cdot (1.01) + 7 \cdot (16.00) = 192.14 \text{ g/mol C}_6H_8O_7$$

The molar mass of citric acid is approximately 192.14 g/mol. The molar mass of sodium bicarbonate is approximately 84.0 g/mol (calculated above).

(3) Convert grams (g) of sodium bicarbonate ($NaHCO_3$) into grams (g) of citric acid ($C_6H_8O_7$) using the mole-to-mole ratio of $C_6H_8O_7$ to $NaHCO_3$ determined in (1), and the molar mass of $C_6H_8O_7$ and $NaHCO_3$ determined in (2).

$$14 \text{ g NaHCO}_3 \times \left( \frac{1 \text{ mol NaHCO}_3}{84.0 \text{ g NaHCO}_3} \right) \times$$

$$\left( \frac{1 \text{ mol C}_6H_8O_7}{3 \text{ mol NaHCO}_3} \right) \times \left( \frac{192.14 \text{ g C}_6H_8O_7}{1 \text{ mol C}_6H_8O_7} \right) = 10.67 \text{ g C}_6H_8O_7$$

Thus, 10.67 g of citric acid is needed to fully react 14 g of sodium bicarbonate. The amount of granular citric acid sealed within second compartment 512 can be advantageously increased above the amount calculated to full react a given quantity of sodium bicarbonate in order to provide a buffer (i.e. a margin of error). In this example, the calculated 10.67 g of citric acid can be increased to 11 g of citric acid, or even higher, to ensure all of the 14 g of sodium bicarbonate reacts to generate carbon dioxide gas.

Accordingly, a carbonation pod 500 with 14 g of granular sodium bicarbonate sealed within first compartment 508 and 11 g of granular citric acid sealed within the second compartment 512 can generate over 4 L of carbon dioxide gas (measured at 1 atm and 25° C.). For systems where beverage container 108 has a maximum inner volume 116 of 750 mL, this is enough carbon dioxide gas to achieve a very strong carbonation level within beverage. If all of the $CO_2$ gas generated from carbonation pod 500 were to dissolve in a full beverage container 108 (750 mL) with a beverage temperature of 25° C., the final carbonated beverage would have a very strong carbonation level of 5.3 (4 L $CO_2$ gas/0.75 L carbonated beverage). A carbonation level of 4.0 (measured at the beverage temperature) is generally perceived as an upper carbonation level (i.e. a carbonation level above which its drinker is unlikely to find appealing). Accordingly, this particular carbonation pod 500 can generate sufficient carbon dioxide gas to carbonate a 750 mL beverage to an upper carbonation level of 4.0 with carbon dioxide gas to spare. In some cases, a portion of the carbon dioxide gas generated within carbonation chamber 140 may be lost due to system headspace and inefficiencies. In this context, the spare or excess carbon dioxide gas may be characterized as a buffer, which can make up for any carbon dioxide gas that is lost. For this reason, it can be advantageous to provide slightly more carbon dioxide generating materials within carbonation pod 500 than needed.

The example above is intended for illustrative purposes. It illustrates how one can determine a volume of carbon dioxide gas that can be generated when specific quantities of sodium bicarbonate and citric acid are mixed together in water. For example, the quantities of granular sodium bicarbonate and granular citric acid to be sealed within respective first and second compartments 508, 512 of carbonation pod 500 can be selected so that when mixed in water they react to generate a targeted volume of carbon dioxide gas (e.g. 2.5 L, 3 L, 3.5 L, 4 L, etc.) (measured at 1 atm and 25° C.). Those skilled in the art will appreciate that similar calculations can be made for different types of granular carbonate material 516 (e.g. potassium bicarbonate) and granular acid material 520 (e.g. acetic acid), and/or at different pressures and temperatures.

Figures 7A, 7B:
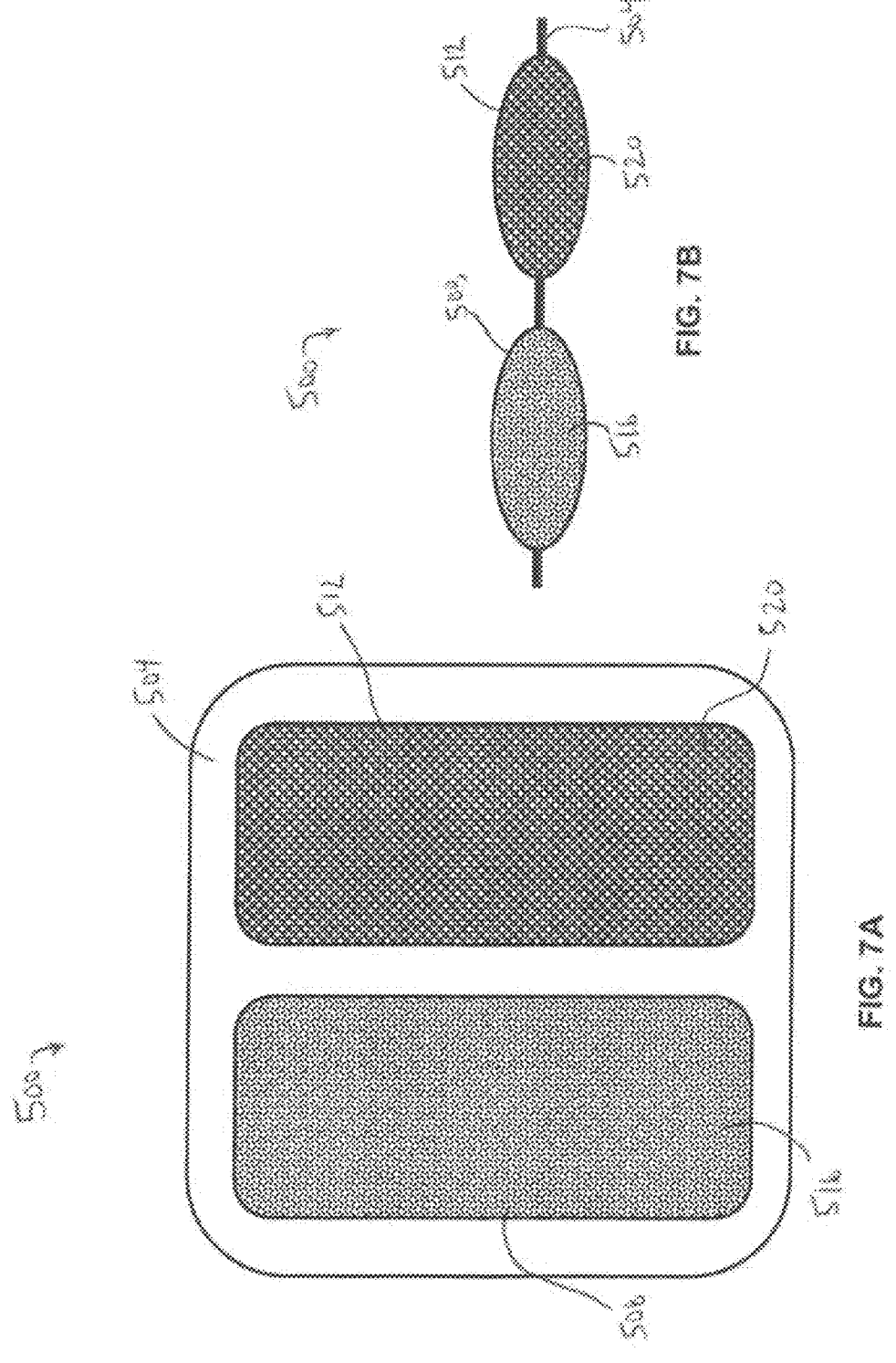
FIGS. 7A-7B are top and side views of another example carbonation pod.

FIGS. 7A-7B illustrate another example carbonation pod, referred to generally as 500. Carbonation pod 500 shown in FIGS. 7A-7B is similar to carbonation pod 500 shown in FIGS. 6A-6B except for differences in the configuration of dissolvable pod shell 504. As shown in FIGS. 7A-7B, pod shell 504 defines separated and adjacent first and second compartments 508, 512 that do not share a common wall or boundary. That is, first compartment 508 and second compartment 512 are each fully sealed by their own respective portions of pod shell 504. Unlike in FIGS. 6A-6B where first and second compartments 508, 512 of carbonation pod 500 are separated and sealed by common dividing wall 504d.

Figure 8:
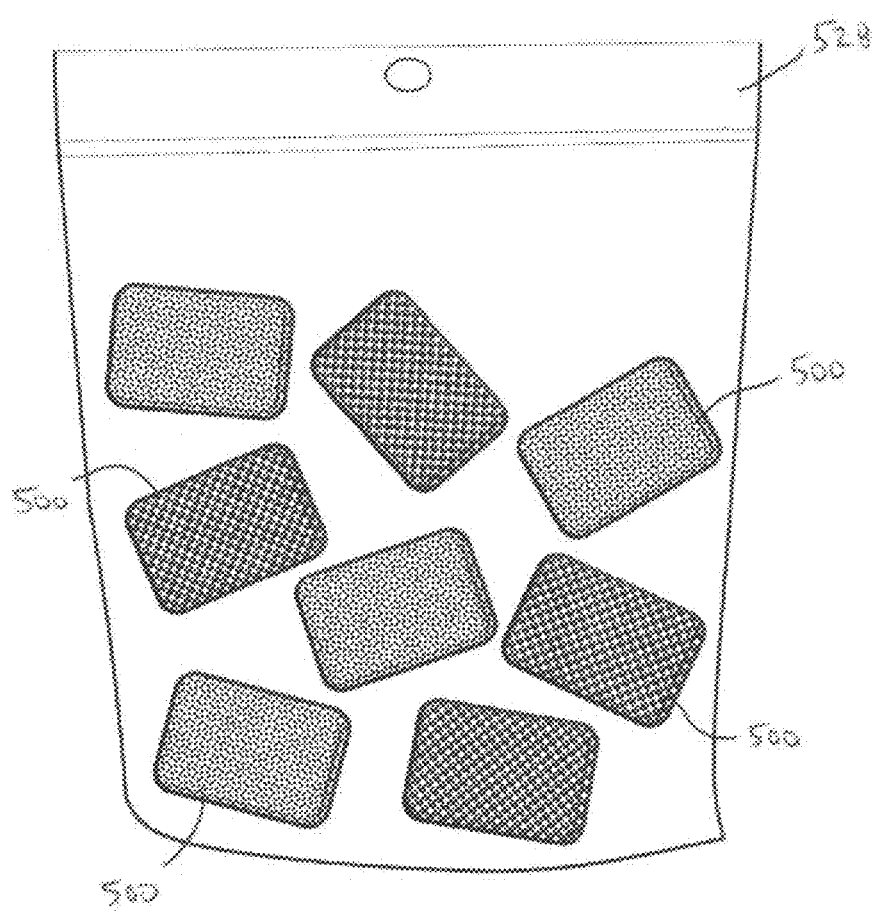
FIG. 8 is a front view of an example retail package that includes a number of the carbonation pods of FIGS. 6A-6B.

FIG. 8 illustrates a retail package 524 that includes a plurality of carbonation pods 500. As shown, the retail package 524 includes eight of carbonation pods 500. Retail package 524 is shown configured as a pouch with a sealable top portion 528. Various configurations are possible. For example, retail package 524 may be alternatively configured as a container with an openable lid.

Retail packages 524 may come in one or more sizes (i.e. include different numbers of carbonation pods 500). As an example, a retail package 524 may come with 5 to 50 carbonation pods 500. Accordingly, a customer who purchases such a retail package 524 can carbonate that many beverages of their choosing (e.g. wine, water, apple juice, etc.). As another example, a larger retail package 524 may include up to 250 carbonation pods (or more in some cases). In some embodiments, each carbonation pod 500 in a retail package 524 holds equivalent quantities of granular carbonate material 516 as each other carbonation pod 500, and holds equivalent quantities of granular acid material 520 as each other carbonation pod 500. Accordingly, each carbonation pod 500 in retail package 524 may have the same carbon dioxide generating capacity as any other carbonation pod 500 in retail package 524.

In some embodiments, a retail package 524 may include one or more carbonation pods 500 having a different quantity of granular carbonate material 516 as one or more other carbonation pods 500; and/or having a different quantity of granular acid material 520 as one or more other carbonation pods 500. This can allow the user to select a carbonation pod 500 based on the pod's specific carbon dioxide generating capacity suitability to produce the user's targeted carbonation level.

FIGS. 9-12 schematically illustrate an example sequence of system states in the operation of beverage carbonation system 100 to carbonate a beverage 112. As shown, beverage carbonator 104 includes a carbonator fluid flow path 136 extending between carbonator inlet 132 and carbonator outlet 128.

Figure 9:
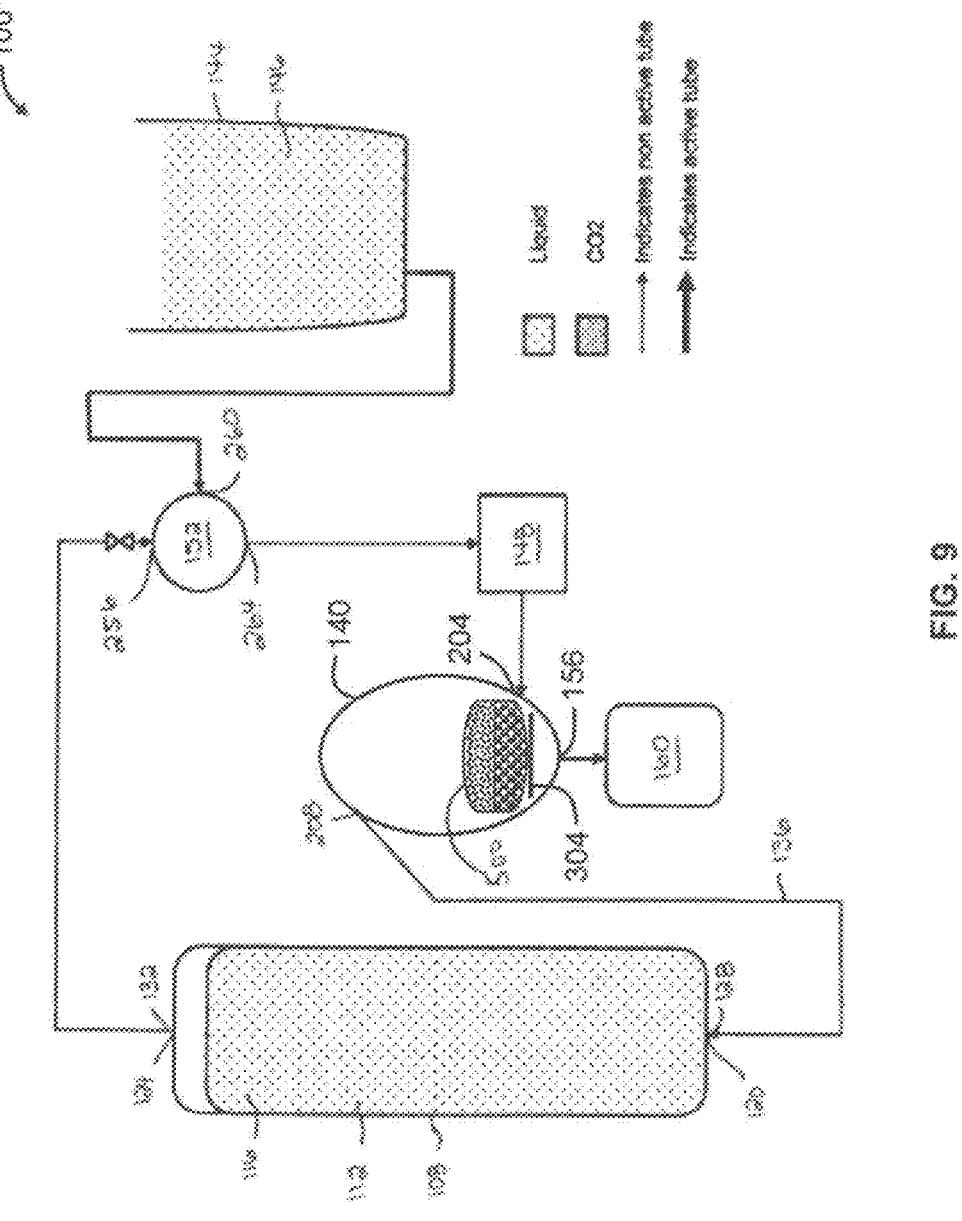
FIG. 9 is a schematic illustration of the beverage carbonation system of FIG. 2, in a container connected state.

FIG. 9 shows a system state ("container connected state") in which beverage container 108 is connected to beverage carbonator 104, prior to initiating a carbonation operation. Inner volume 116 of beverage container 108 is shown holding a beverage 112 to be carbonated, while water reservoir 144 is shown holding water 146 that can be supplied to carbonation chamber 140. As shown, beverage container inlet 120 and carbonator outlet 128 are fluidly coupled, and container outlet 124 and carbonator inlet 132 are fluidly coupled. Carbonation pod 500 of FIGS. 6A-6B is shown deposited into carbonation chamber 140. Flow valve 152 is shown fluidly connecting water reservoir 144 to pump 148, and fluidly disconnecting gas flow along fluid flow path 136 from carbonator inlet 132 to carbonator outlet 128. Byproduct outlet 156 is closed and pump 148 is deactivated (i.e. not moving fluid).

Figure 10:
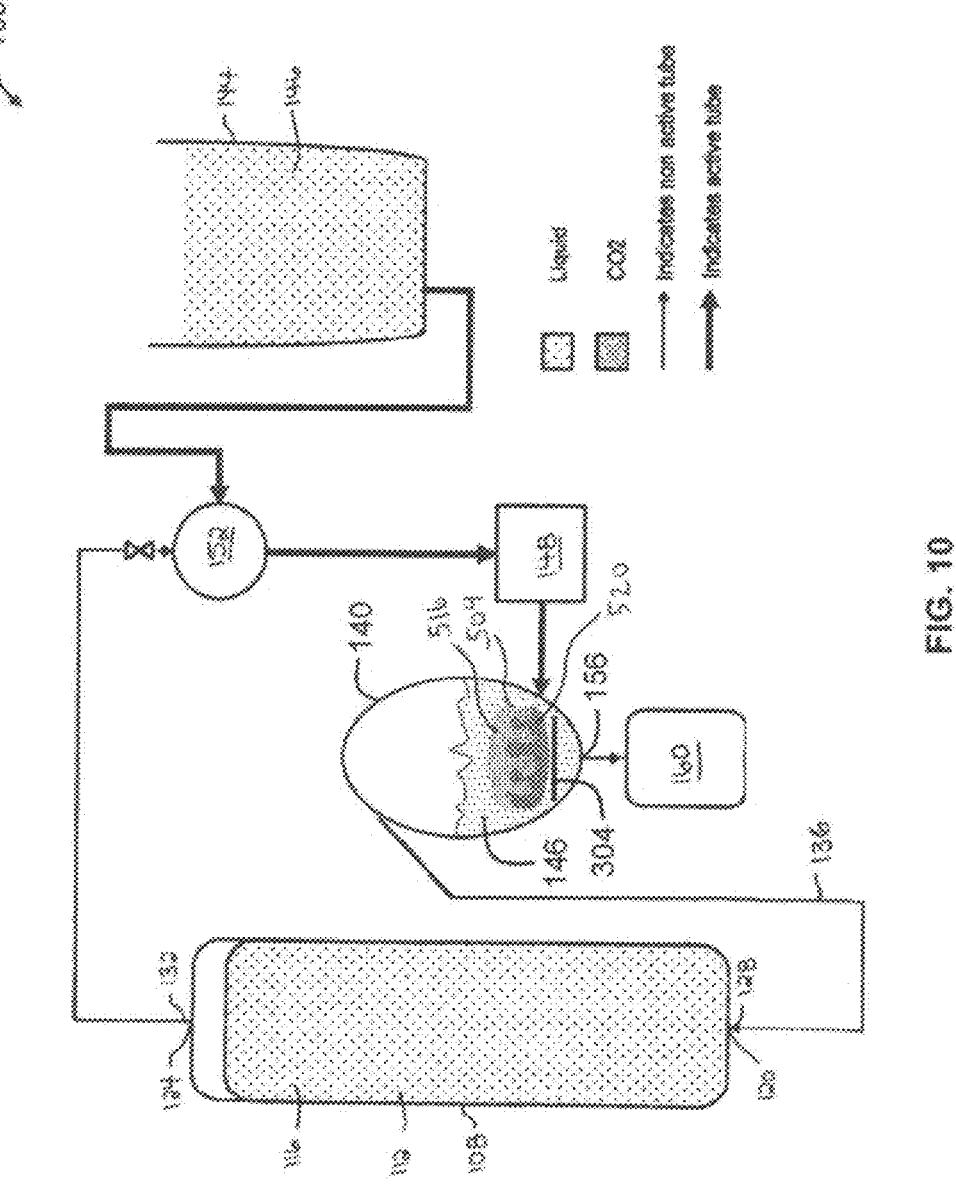
FIG. 10 is a schematic illustration of the beverage carbonation system of FIG. 2, in a reservoir draw state.

FIG. 10 shows a system state ("reservoir draw state") shortly after activating beverage carbonator 104. As compared with the state of FIG. 9, pump 148 is activated and moving water 146 from water reservoir 144 into carbonation chamber 140 to form an aqueous mixture of granular carbonate material 516 and granular acid material 520 released from partially dissolved pod shell 504. A reaction takes place in the aqueous mixture that generates carbon dioxide gas. The generated carbon dioxide gas may flow from carbonation chamber 140 through beverage container 108 and back into fluid flow path 136 at carbonator inlet 132. Flow valve 152 is shown closing fluid flow path 136 upstream of carbonation chamber 140, which inhibits the carbon dioxide gas that has re-entered carbonator inlet 132 from recirculating back into beverage container 108. In alternative embodiments, the generated carbon dioxide gas remains in beverage carbonator 104 and does not enter beverage container 108 at all during the reservoir draw state.

Figure 11:
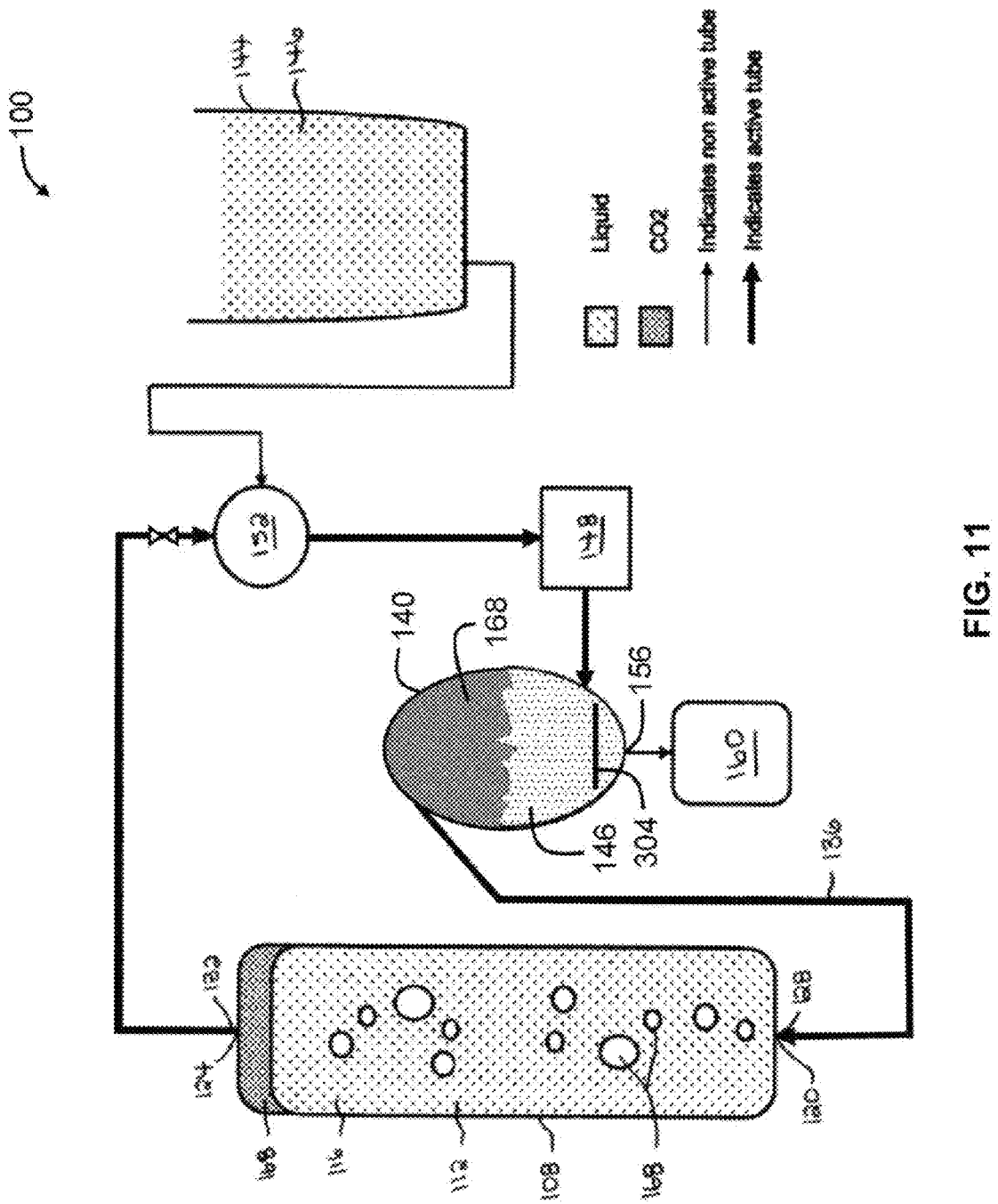
FIG. 11 is a schematic illustration of the beverage carbonation system of FIG. 2, in a gas recirculation state.

FIG. 11 shows a system state ("gas recirculation state") shortly after carbon dioxide gas 168 has been generated by the reaction in the aqueous mixture of water 146, granular carbonate material 516 and granular acid material 520 (FIG. 10) in carbonation chamber 140. Beverage carbonator 104 may be configured to begin recirculating gas in response to achieving a predetermined minimum system gas pressure. For example, pump 148 may be reconfigured from drawing water to recirculating carbon dioxide gas exiting container outlet 124 after a predetermined minimum system gas pressure is achieved. This can allow the system gas pressure upstream and downstream of pump 148 to normalize. This can reduce the pressure drop across pump 148 and thereby reduce the strain on pump 148. Moreover, elevated system gas pressure contributes to keeping the reaction in carbonation chamber 140 acquiescent. By delaying gas recirculation, the system gas pressure can rise quickly, and therefore quickly calm the reaction in carbonation chamber 140, which mitigates the aqueous mixture becoming entrained in the flow of carbon dioxide gas and mixing into beverage 112.

As compared with the state of FIG. 10, flow valve 152 is fluidly disconnecting pump 148 from water reservoir 144, and fluidly connecting pump 148 to carbonator inlet 132. As shown, pump 148 is activated and moving carbon dioxide gas 168 generated in carbonation chamber 140 into beverage container 108 via carbonator outlet 128 and container inlet 120. The carbon dioxide gas 168 exits container outlet 124 into carbonator inlet 132 after contacting beverage 112. Pump 148 recirculates the carbon dioxide gas 168 entering carbonator inlet 132 back into beverage container 108 through carbonator outlet 128 and container inlet 120. The illustrated state may continue for a duration (e.g. 1 to 5 minutes) sufficient to absorb a target concentration of carbon dioxide into beverage 112.

Beverage carbonation system 100 may permit the user to control the carbonation level in the final beverage 112. In general, a shorter duration (e.g. 1 to 2 minutes) of recirculation may produce a less carbonated beverage 112, and a longer duration (e.g. 3 to 5 minutes) of recirculation may produce a more carbonated beverage 112. Alternatively, or in addition, the carbonation level in the final beverage 112 may be varied by the amount and composition of granular carbonate material 516 and granular acid material 520 originally deposited into the carbonation chamber 140. For example, by mass, sodium bicarbonate can generate a greater volume of carbon dioxide gas than potassium bicarbonate.

Figure 12:
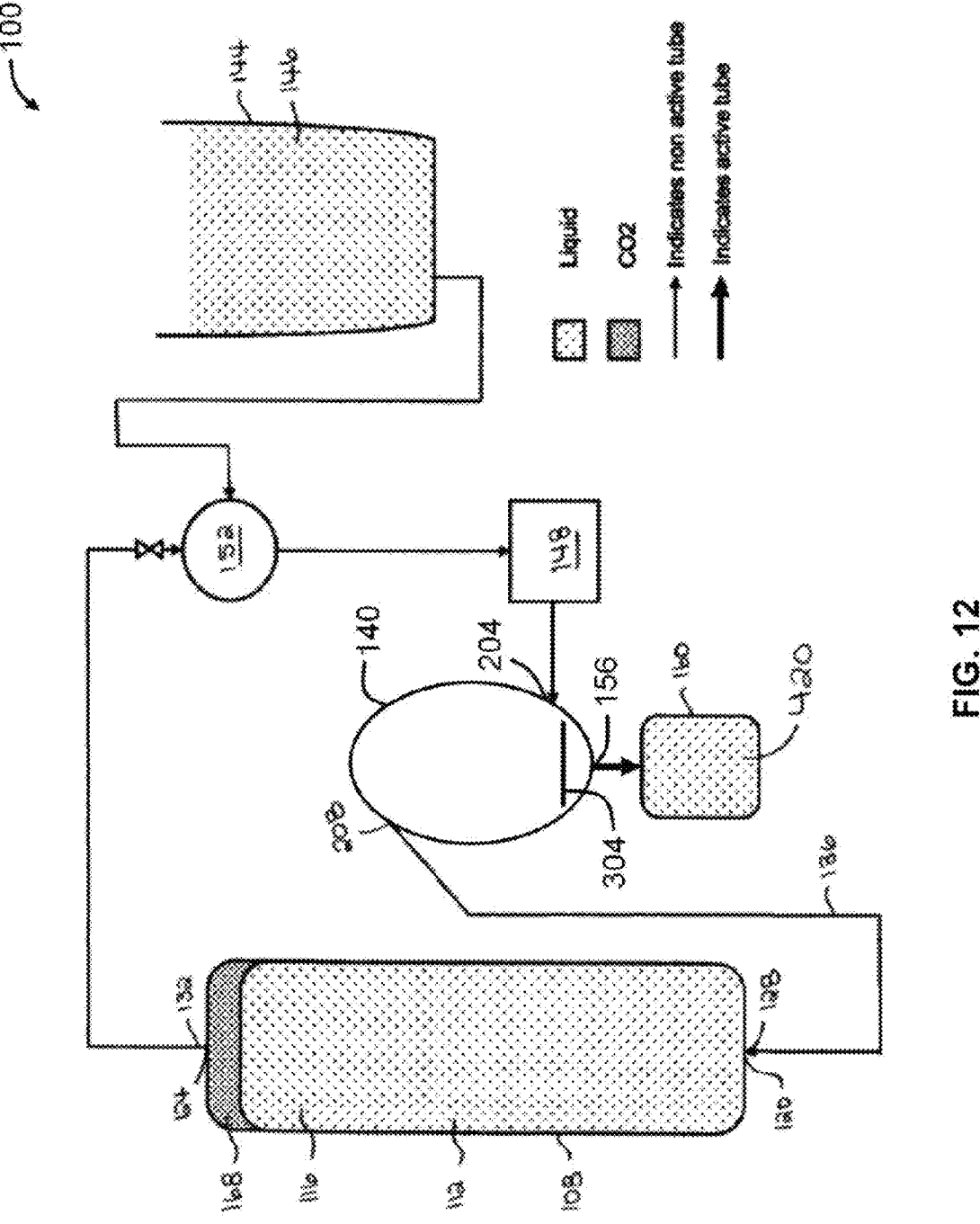
FIG. 12 is a schematic illustration of the beverage carbonation system of FIG. 2, in a container sealed state.

FIG. 12 shows a system state ("container sealed state") shortly after beverage container 108 has been sealed for removal from beverage carbonator 104. As compared with the state of FIG. 11, beverage container inlet and outlet 120, 124 are disconnected from beverage carbonator 104 and hermetically seal container inner volume 116 to prevent a loss of carbonation from carbonated beverage 112. Further, above-atmospheric pressure is trapped within carbonation chamber 140 (e.g. by closing carbonator outlet 128 and deactivating pump 148), and then byproduct outlet 156 is opened to vent the trapped above-atmospheric gas pressure through byproduct outlet 156 thereby evacuating byproduct waste 420 from carbonation chamber 140 through byproduct outlet 156 into byproduct container 160. The user may empty byproduct container 160 after carbonating one or many beverage containers 108 of beverage 112. The ability of beverage carbonation system 100 to use the system pressure remaining (i.e. trapped) after carbonation is complete to clear byproduct waste 420 from carbonation chamber 140, can reduce or eliminate any need for users to access and clean carbonation chamber 140. In the result, beverage carbonation system 100 may require less maintenance and therefore provide more convenience to users.

Figure 14:
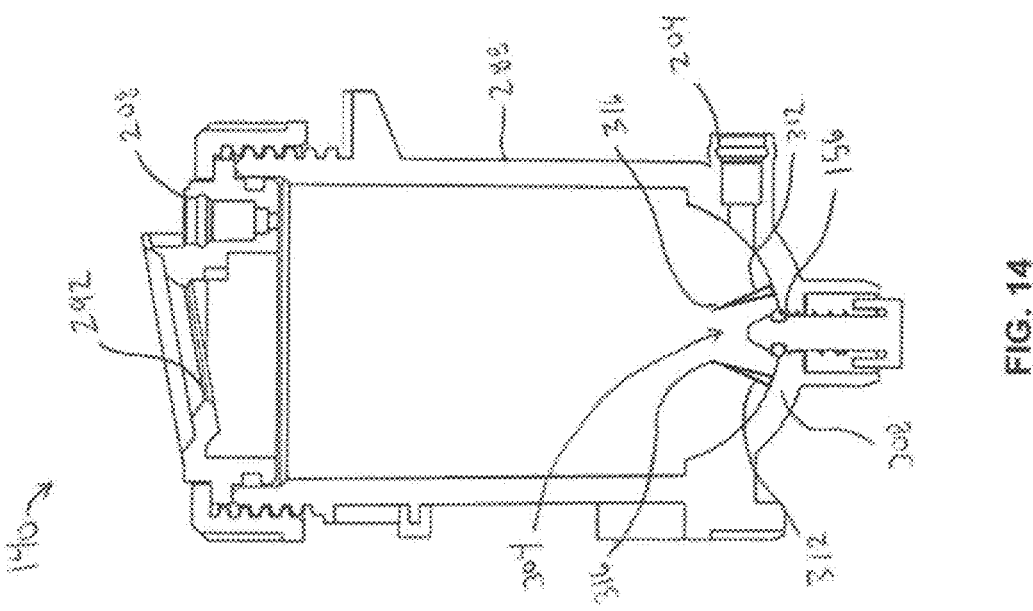
FIG. 14 is a cross-sectional view taken along line 14-14 in FIG. 13.
Figure 13:
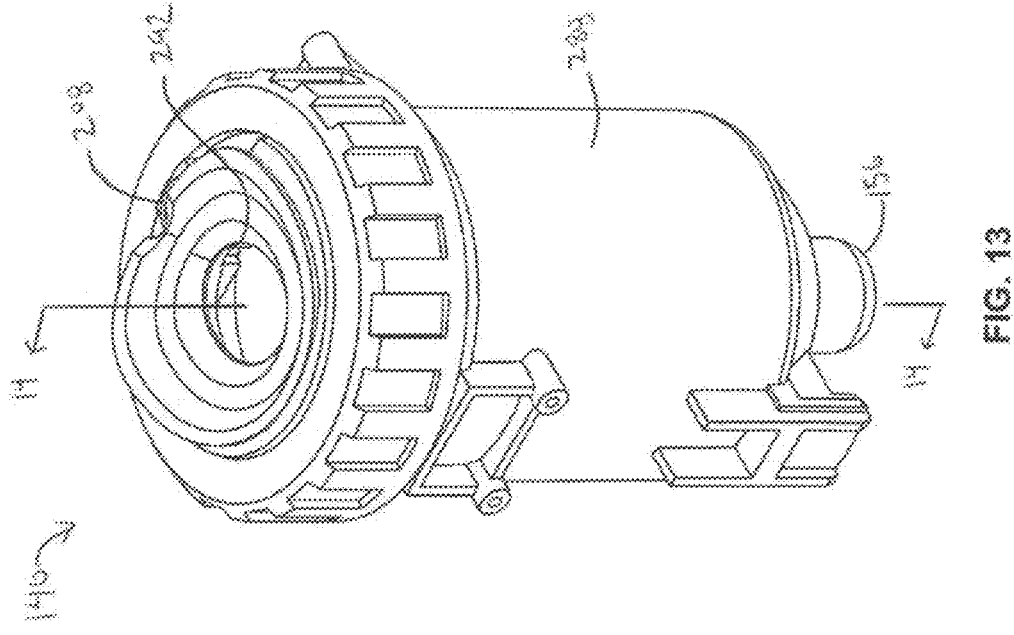
FIG. 13 is a perspective view of a carbonation chamber of the beverage carbonator of FIG. 1.

FIGS. 13-14 show an example carbonation chamber, referred to generally as 140. As shown, carbonation chamber 140 may include a chamber housing 288 having a fluid inlet 204, a carbon dioxide outlet 208, a carbonation pod insertion inlet 292, and a byproduct outlet 156. As shown in FIG. 9, in use, fluid inlet 204 is fluidly coupled to pump 148, carbon dioxide outlet 208 is fluidly coupled to carbonator outlet 128, and byproduct outlet 156 is fluidly coupled to byproduct container 160. Returning to FIGS. 13-14, carbonation pod insertion inlet 292 may be open or closed according to the corresponding position of an exterior door 296 (FIG. 1).

Referring to FIG. 14, carbonation chamber 140 includes a carbonation pod seat 304 positioned to receive a carbonation pod 500 deposited into chamber housing 288 through carbonation pod insertion inlet 292. In the example shown, carbonation pod seat 304 is partially defined by a lower end 308 of chamber housing 288. In alternative embodiments, carbonation pod seat 304 may include a platform, plate, table, or tray located within chamber housing 288. For example, the carbonation chamber 140 shown in FIGS. 9-12 has a carbonation pod seat in the form of a table 304. Referring again to FIG. 14, carbonation pod seat 304 and fluid inlet 204 can be arranged to expose a carbonation pod 500 (FIGS. 6A-7B) received on the carbonation pod seat 304 to water introduced into chamber housing 288 through fluid inlet 204. Carbon dioxide outlet 208 can provide an exit for carbon dioxide gas generated within chamber housing 288.

Fluid inlet 204 may admit carbon dioxide gas into carbonation chamber 140 (e.g. during a gas recirculation system state, FIG. 11). Carbon dioxide gas may enter chamber housing 288 at fluid inlet 204 and exit through gas outlet 208. In some embodiments, the carbon dioxide gas flow from fluid inlet 204 to gas outlet 208 may help to agitate the aqueous mixture of granular carbonate material 516 and granular acid material 520 to promote a complete reaction (i.e. leaving no unreacted carbon dioxide generating material). For example, carbon dioxide gas entering at fluid inlet 204 may bubble up through the aqueous mixture before exiting gas outlet 208. This may agitate any remaining granular carbonate material 516 and/or granular acid material 520 that has not completely reacted within the aqueous mixture to generate carbon dioxide gas.

In some embodiments, carbonation chamber 140 includes a means for piercing (e.g. puncturing or slicing) pod shell 504 of a deposited carbonation pod 500. Piercing pod shell 504 may quicken the release and mixing of granular carbonate material 516 and/or granular acid material 520 from their respective compartments 508, 512 when water is introduced into chamber housing 288. In turn, this may allow for carbon dioxide gas to be generated quicker than when pod shell 504 is not pierced. In the example shown, carbonation chamber 140 includes a pair of shell piercers 312 that project upwardly from lower end 308 of chamber housing 288. When a carbonation pod 500 is dropped into chamber housing 288 through carbonation pod insertion inlet 292, gravity causes it to fall onto sharpened tips 316 of shell piercers 312, which may puncture, impale or slice pod shell 504. In an alternative embodiment, more (e.g. 3-6) or fewer (e.g. 1) shell piercers 312 may be positioned within chamber housing 288. In another alternative embodiment, a means for piercing pod shell 504 may not be provided.

Figure 23:
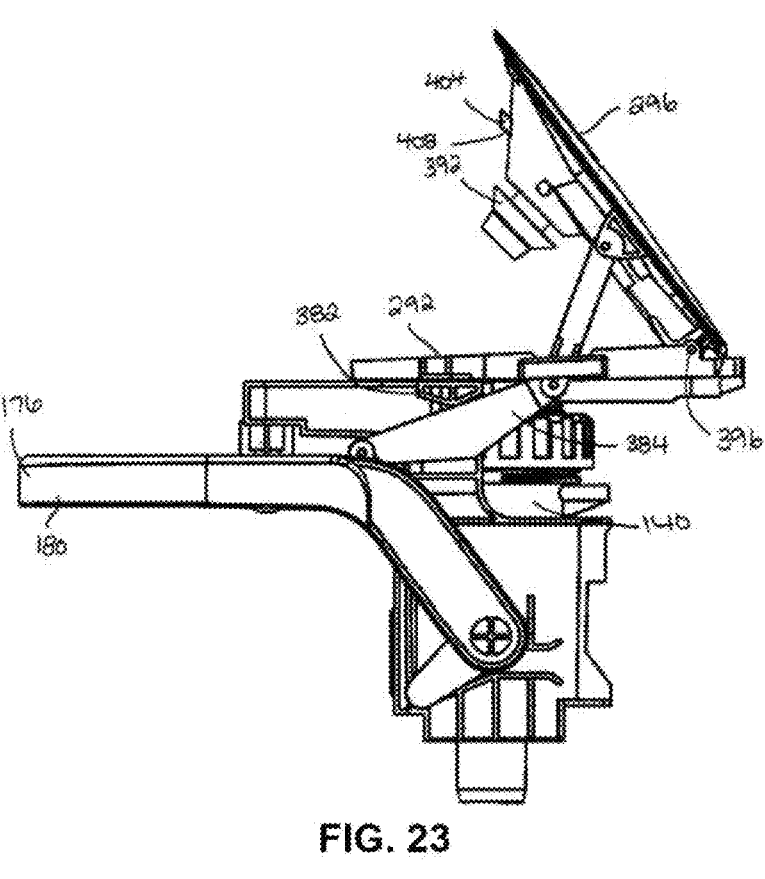
FIG. 23 is a side-elevation view of an engagement actuator and carbonation chamber of the beverage carbonator of FIG. 1, with the engagement actuator in a disengaged position and exterior door opened.

In some embodiments, shell piercers 312 may be actuated according to movement of exterior door 296 (FIG. 1). For example, shell piercers 312 may be mechanically actuated from a retracted state to an extended state when exterior door 296 is closed and/or when the container engagement actuator 176 is moved from the container disengaged position (e.g. lever 180 is fully raised as shown in FIG. 23) to the container engaged position (e.g. lever 180 is fully lowered as shown in FIG. 24). In some embodiments, one or more actuable shell piercers 312 are located in a lid of chamber housing 288. In these embodiments, when the lid closes the carbonation pod insertion inlet 292, the shell piercers 312 move from a retracted to an extended state (i.e. project downwardly) to pierce a deposited carbonation pod 500. Alternatively, actuation of shell piercers 312 may be controlled electronically (e.g. moved from retracted to extended state automatically when beverage carbonator 104 is activated). Alternatively or in addition, shell piercers 312 may include one or many blades that when actuated rotate (e.g. swing) to slice pod shell 504.

Figure 15:
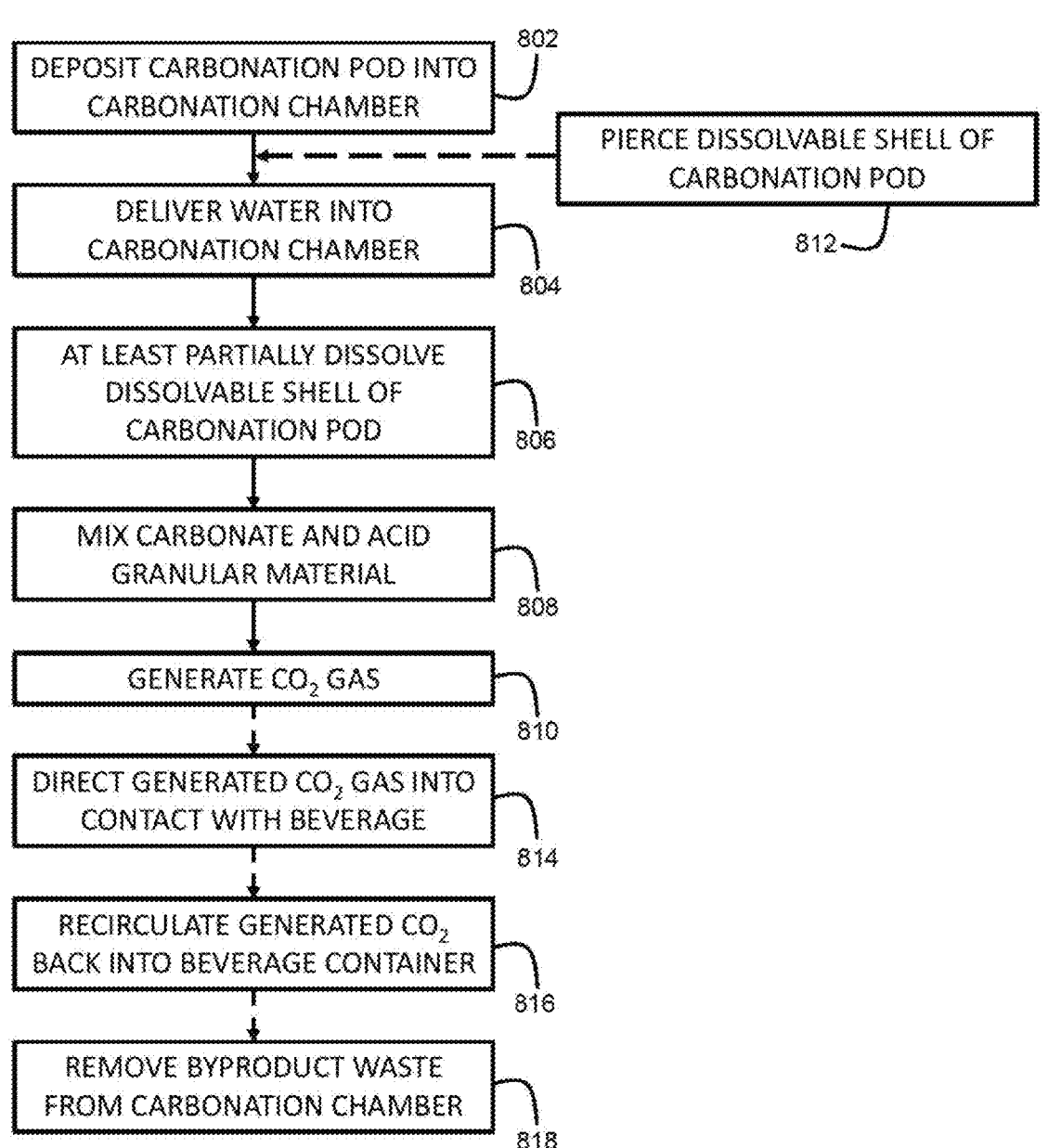
FIG. 15 is a flowchart of an example method of generating carbon dioxide gas for a beverage.

FIG. 15 shows a flowchart illustrating an example method 800 of generating carbon dioxide gas for a beverage. For clarity of illustration, method 800 is described below with reference to beverage carbonation system 100. However, method 800 is not limited to the use of beverage carbonation system 100, and can be practiced using any suitable carbonation device or system.

Figure 16:
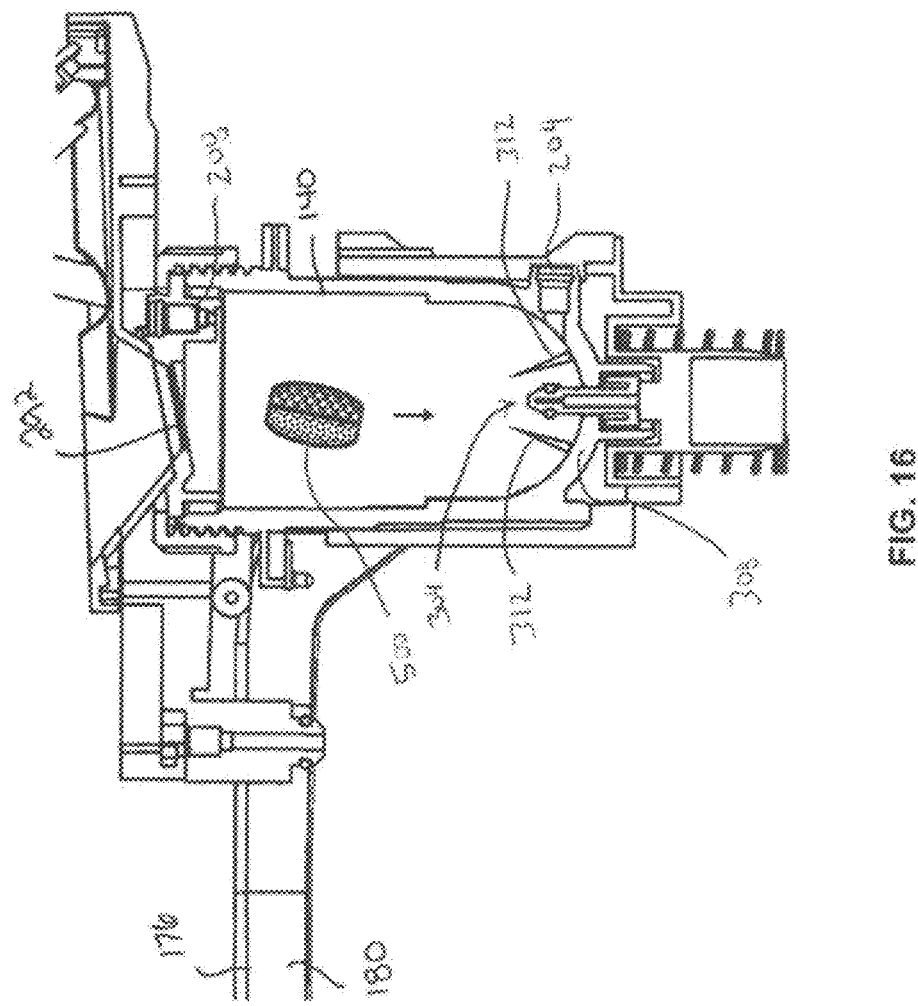
FIG. 16 is a partial cross-sectional view taken along line 3-3 in FIG. 2, with a container engagement actuator in a disengaged position.

Step 802 includes depositing a carbonation pod 500 through a carbonation pod insertion inlet 292 of a carbonation chamber 140 onto a carbonation pod seat 304 within carbonation chamber 140 (e.g. see FIG. 16). As discussed above, carbonation pod 500 has a dissolvable pod shell 504 that is flexible and rapidly water-dissolvable. Pod shell 504 defines separated and sealed first and second compartments 508, 512 that respectively hold a granular carbonate material 516 and a granular acid material 520.

Figure 19:
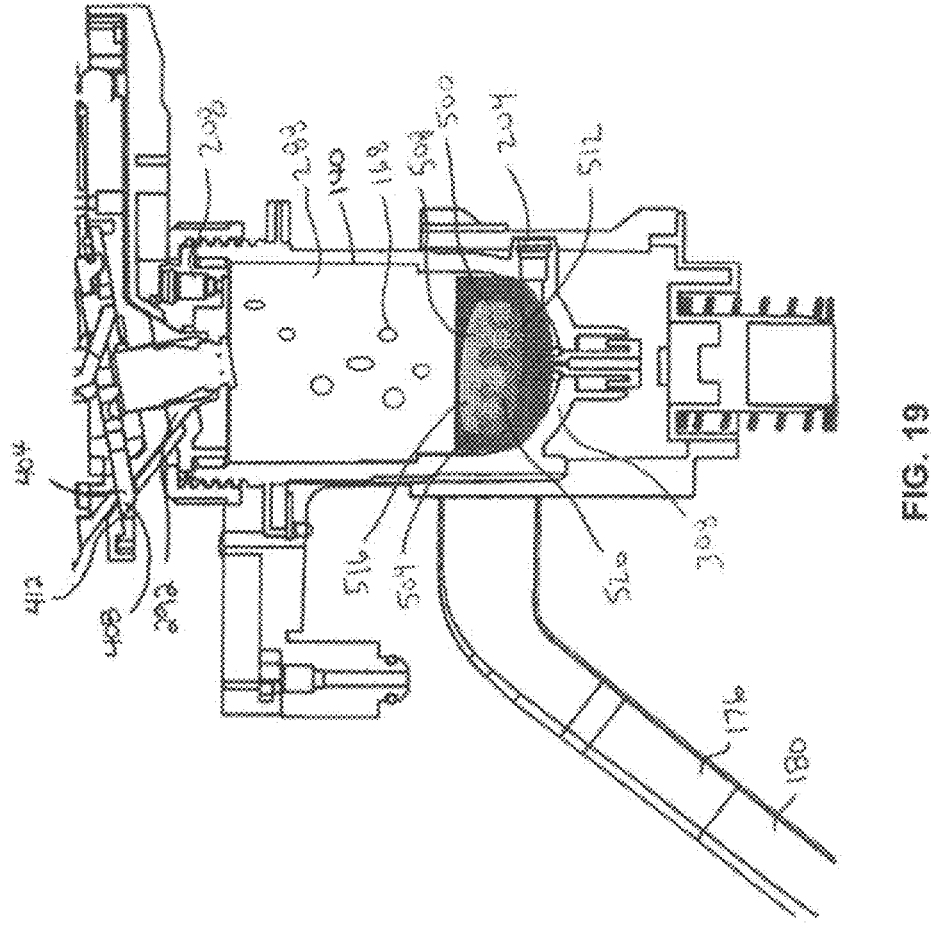
FIG. 19 is the partial cross-sectional view of FIG. 16, with the container engagement actuator in the engaged position and water pooling in the carbonation chamber.

Step 804 includes delivering a volume of water through a carbonation chamber fluid inlet 204 into carbonation chamber 140 (e.g. see FIG. 19). This may include pumping the volume of water from water reservoir 144 to carbonation chamber 140. For example, pump 148 may be activated to move the volume of water from water reservoir 144 into carbonation chamber 140 at fluid inlet 204. In an alternative embodiment, the volume of water may be moved from water reservoir 144 into carbonation chamber 140 by gravity (e.g. water reservoir 144 is positioned at a higher elevation than fluid inlet 204). In another alternative embodiment, the volume of water may be received from a building's water supply (e.g. a water line may connect fluid inlet 204 to the building's water supply).

The volume of water delivered into carbonation chamber 140 at step 804 is preferably greater than or equal to a volume of water required to completely react the carbon dioxide generating materials (e.g. sodium bicarbonate and citric acid) deposited into carbonation chamber 140. In some embodiments, the volume of water delivered into the carbonation chamber 140 at step 804 is at least 50 mL, such as for example between 80 mL and 110 mL. The volume of water required to completely react the carbon dioxide generating materials in carbonation chamber 140 may depend on the amount of granular carbonate material 516 and granular acid material 520 deposited into carbonation chamber 140, and/or the formulation of the granular carbonate material 516 and granular acid material 520. In some embodiments, pump 148 may be configured to cease delivering water from water reservoir 144 to carbonation chamber 140 in response to achieving a predetermined minimum system gas pressure. Waiting until the system gas pressure reaches at least a predetermined minimum pressure before stopping the delivery of water into carbonation chamber 140 may ensure that there is sufficient water for a complete reaction of granular carbonate material 516 and granular acid material 520 held within carbonation pod 500.

Step 806 includes at least partially dissolving pod shell 504 with the water that was delivered into carbonation chamber 140 at step 804 (e.g. see FIG. 19). As pod shell 504 dissolves in the delivered water, granular carbonate material 516 is released from previously sealed first compartment 508 and granular acid material 520 is released from previously sealed second compartment 512. In some embodiments, the delivered water dissolves between 75% and 100% of pod shell 504, such as for example 90% to 100%, such as approximately 95 to 100% over the course of the carbonation cycle.

Step 808 includes mixing granular carbonate material 516 and granular acid material 520 that have been released from their respective compartments 508, 512 of carbonation pod 500. The mixing of the released granular carbonate material 516 and granular acid material 520 may be performed by the water that was delivered into carbonation chamber 140. Alternatively, or in addition, carbonation chamber 140 may include one or more mixing elements or agitators that act to mix the released granular carbonate material 516 and granular acid material 520.

Figure 20:
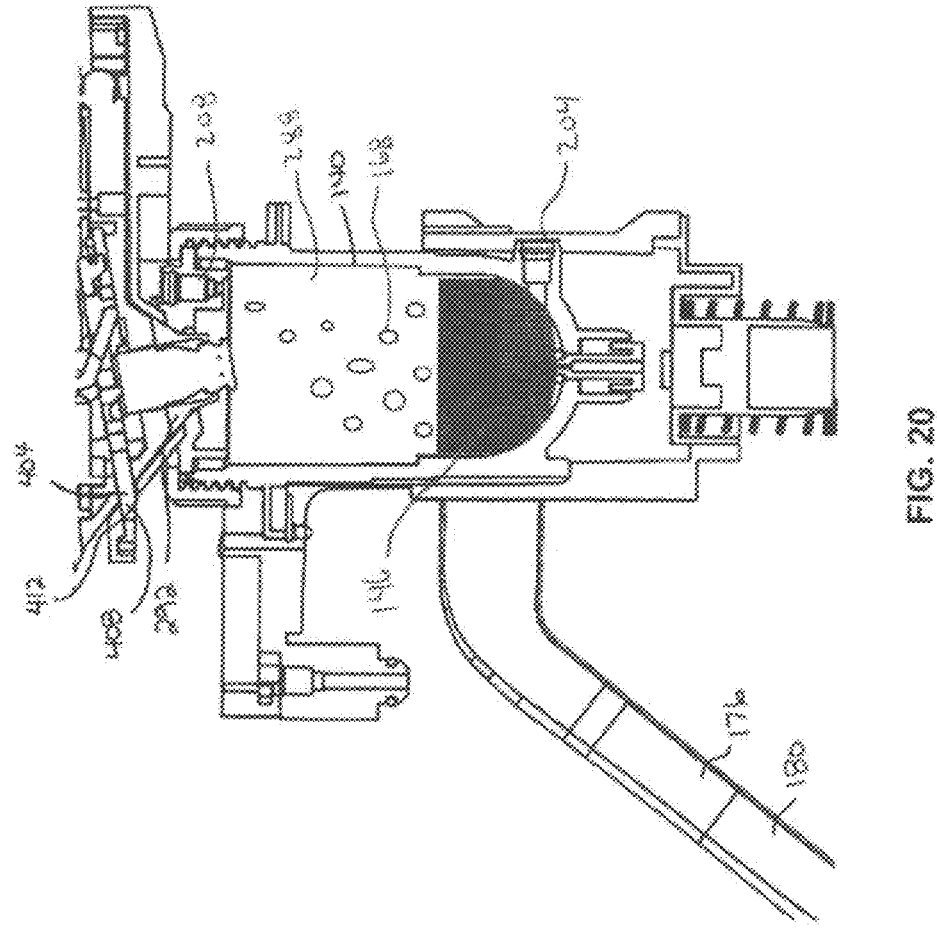
FIG. 20 is the partial cross-sectional view of FIG. 16, with the container engagement actuator in the engaged position, and carbon dioxide gas recirculating through the carbonation chamber.

Step 810 includes generating carbon dioxide gas from the mixed granular carbonate material 516 and granular acid material 520 (e.g. see FIG. 20). As discussed above, when in an aqueous mixture, granular carbonate material 516 and granular acid material 520 react to generate carbon dioxide gas. In some embodiments, an aqueous mixture of granular carbonate material 516 and granular acid material 520 generates between 2 L and 6 L of carbon dioxide gas, such as for example 2.5 L to 5 L, such as approximately 3.5 L to 4.5 L (measured at a pressure of 1 atm and a temperature of 25° C.).

Optionally, method 800 may include step 812 which comprises piercing (e.g. puncturing or slicing) pod shell 504 of carbonation pod 500 to release at least one of granular carbonate material 516 and granular acid material 520 from their respective compartments 508, 512. Pod shell 504 may be pierced after depositing carbonation pod 500 into carbonation chamber 140 at step 802. That is, carbonation pod 500 may be pierced after it has been deposited into carbonation chamber 140. For example, when a carbonation pod 500 is dropped into carbonation chamber 140, gravity may cause it to fall onto sharpened tips 316 of shell piercers 312, which puncture pod shell 504 (e.g. see FIG. 17). Alternatively, or in addition, pod shell 504 may be pierced before depositing carbonation pod 500 into carbonation chamber 140 at step 802. For example, a user may use one of their knives to make one or more cuts or punctures in pod shell 504. In other embodiments, pod shell 504 may be pierced after water has started being delivered into carbonation chamber 140 at step 804. Piercing pod shell 504 may quicken the release and mixing of granular carbonate material 516 and/or granular acid material 520 from their respective compartments 508, 512 when water is delivered into carbonation chamber 140.

Optionally, step 814 includes directing the generated carbon dioxide gas along a fluid flow path into contact with a beverage 112 in a beverage container 108. As shown in FIG. 9, fluid flow path 136 fluidly connects carbon dioxide outlet 208 of carbonation chamber 140 with container inlet 120. Accordingly, carbon dioxide gas generated in carbonation chamber 140 can be directed (i.e. flow) into beverage container 108 along fluid flow path 136. The carbon dioxide gas may bubble up through the beverage 112 from container inlet 120 to container outlet 124. A portion of the generated carbon dioxide gas that bubbles up through beverage 112 dissolves into and carbonates the liquid beverage 112, while the remaining carbon dioxide gas that does not dissolve can exit through container outlet 124.

Referring again to FIG. 15, optional step 816 includes recirculating the generated carbon dioxide gas that exits beverage container 108 along a fluid flow path and back into beverage container 108. As an example, the carbon dioxide gas exiting container outlet 124 can be recirculated back into container inlet 120 along fluid flow path 136 (e.g. see FIG. 11). As discussed above, when beverage container 108 is engaged with beverage carbonator 104, container inlet 120 and carbonator outlet 128 are fluidly coupled, and container outlet 124 and carbonator inlet 132 are fluidly coupled. Pump 148 may be activated at step 816 to recirculate carbon dioxide gas along fluid flow path 136 from carbonator inlet 132 to carbonator outlet 128.

Optionally, step 818 includes removing byproduct waste from carbonation chamber 140 through a byproduct outlet 156 of carbonation chamber 140. The byproduct waste may include the dissolved or partially dissolved pod shell 504. As an example, byproduct outlet 156 can be opened to discharge byproduct waste from carbonation chamber 140 through byproduct outlet 156 into byproduct container 160. The user may empty byproduct container 160 after carbonating one or many beverage containers 108 of beverage 112. In some embodiments, above-atmospheric pressure can be trapped within carbonation chamber 140 (e.g. by closing carbonator outlet 128 and deactivating pump 148), and then byproduct outlet 156 is opened to vent the trapped above-atmospheric gas pressure through byproduct outlet 156 thereby evacuating byproduct waste from carbonation chamber 140 through byproduct outlet 156 into byproduct container 160. Alternatively, or in addition, byproduct outlet 156 may include a release valve that acts to open and close byproduct outlet 156 to evacuate byproduct waste from carbonation chamber 140 into byproduct container 160.

Reference is now made to FIGS. 16-22, which illustrate steps in the operation of carbonation chamber 140, in accordance with an embodiment.

FIG. 16 shows carbonation chamber 140 when in the container disengaged position, with exterior door 296 open to allow carbonation pod 500 to be deposited through carbonation pod insertion inlet 292. Container engagement actuator 176 is in the disengaged position (e.g. lever 180 is fully raised as shown in FIG. 23). Pump 148 (FIG. 9) is deactivated. In the illustrated state ("container disengaged state"), water reservoir 144 (FIG. 3) may be filled if depleted of water. For example, water reservoir 144 may be filled in-situ (e.g. if not removable from beverage carbonator 104) or may be removed from beverage carbonator 104 to fill and then reconnected to beverage carbonator 104. As shown in FIG. 3, water reservoir 144 has a handle 380 that a user can grasp to remove and replace water reservoir 144 on beverage carbonator 104.

Figure 17:
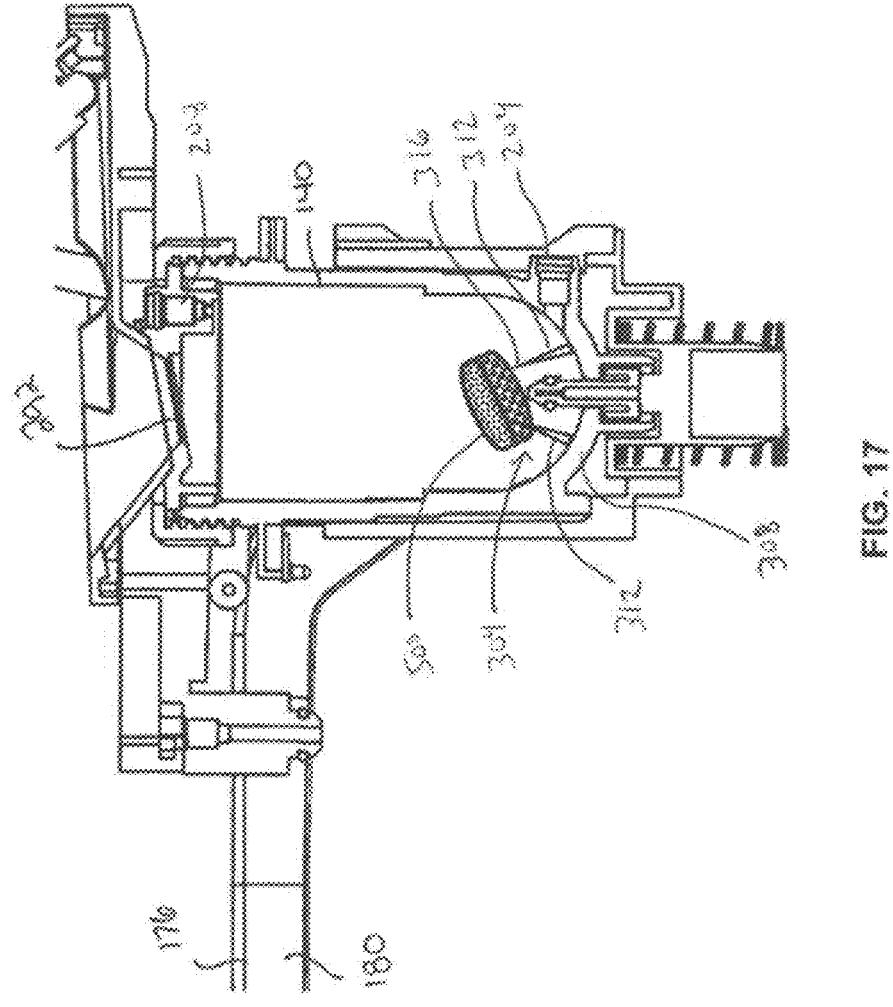
FIG. 17 is the partial cross-sectional view of FIG. 16, with the carbonation pod of FIGS. 6A-6B deposited into the carbonation chamber.

FIG. 17 shows carbonation chamber 140 after carbonation pod 500 has been deposited into carbonation chamber 140 through the opened carbonation pod insertion inlet 292. As compared with FIG. 16, carbonation pod 500 has fallen by gravity from carbonation pod insertion inlet 292 onto shell piercers 312. Carbonation pod 500 is shown punctured by shell piercers 312 at carbonation pod seat 304.

Figure 18:
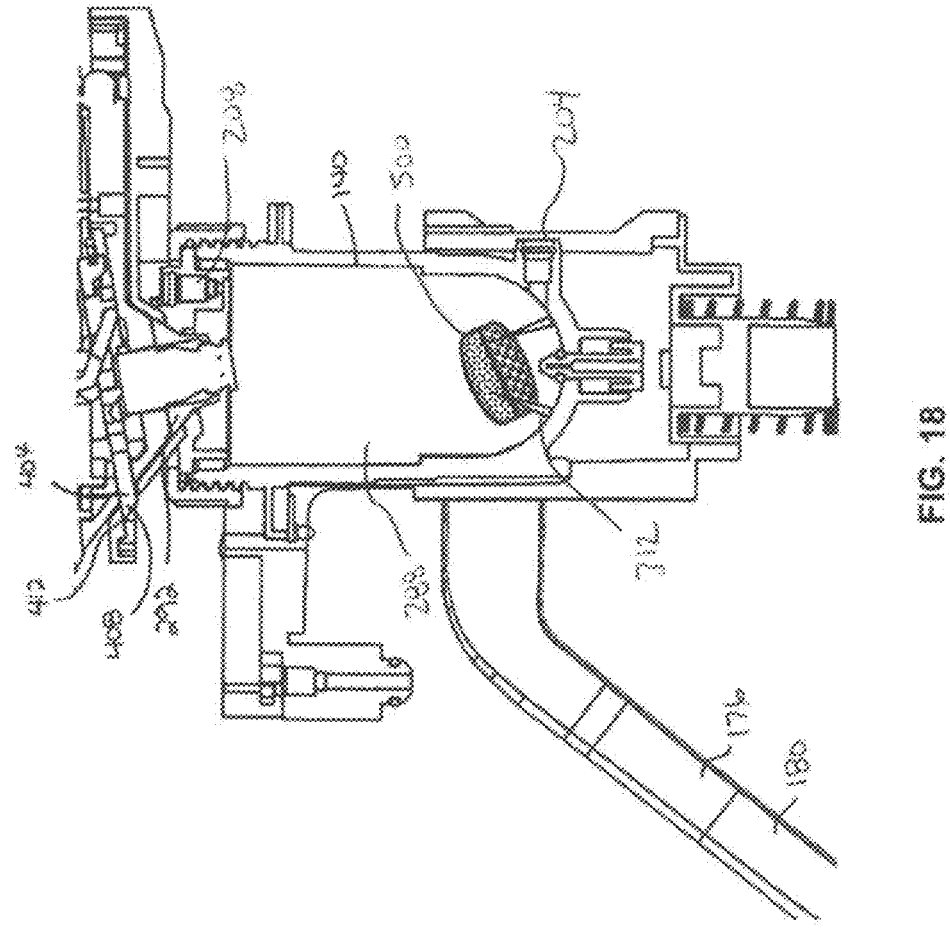
FIG. 18 is the partial cross-sectional view of FIG. 16, with the container engagement actuator in an engaged position.

FIG. 18 shows carbonation chamber 140 after exterior door 296 is closed to seal carbonation pod insertion inlet 292. Container engagement actuator 176 is in the container engaged position (e.g. lever 180 is fully lowered as shown in FIG. 24). In the example shown, moving container engagement actuator 176 to the container engaged position causes exterior door 296 to close. This may prevent a user from accidentally leaving exterior door 296 open when a carbonation operation is activated. In the example shown, container engagement actuator 176 is mechanically connected to exterior door 296. As shown by comparison of FIGS. 23 and 24, container engagement actuator 176 may drive a door closure guide 382 to bear upon door linkage 384, whereby door linkage 384 articulates to move exterior door 296 to the closed position. In other embodiments, an electronic controller 388 (FIG. 5) may activate an electro-mechanical device (e.g. motor or solenoid) to close exterior door 296 in coordination with the movement of container engagement actuator 176 to the container engaged position.

In some embodiments, exterior door 296 can optionally be manually closed by the user prior to moving container engagement actuator 176 to the container engaged position. That is, when container engagement actuator 176 is in the container disengaged position, exterior door 296 may not be prevented from closing. This mitigates a user damaging exterior door 296 by attempting to manually close exterior door 296 while engagement actuator 176 is in the container disengaged position. In this case, moving container engagement actuator 176 to the container engaged position causes exterior door 296 to close only if exterior door 296 was not already manually closed by the user.

Exterior door 296 may seal carbonation pod insertion inlet 292 in any manner that inhibits carbon dioxide gas generated within carbonation chamber 140 from escaping through carbonation pod insertion inlet 292. In the illustrated embodiment, exterior door 296 includes a seal 392 (also referred to as a sealing member, or gasket) that allows exterior door 296 to provide a gas-tight seal of carbonation pod insertion inlet 292 when in the closed position. Exterior door 296 may be movable in any manner that allows exterior door 296 to open and close carbonation pod insertion inlet 292. For example, exterior door 296 may rotate, translate, or both between the open position (FIG. 23) and the closed position (FIG. 24). In the example shown, exterior door 296 is pivotably openable by a hinge 396.

In some embodiments, exterior door 296 may be inhibited from re-opening by a door lock 404. This may prevent a user and/or system gas pressure (e.g. within carbonation chamber 140) from forcing exterior door 296 open during carbonation and/or evacuation operations. Door lock 404 may be movable from a locked position (FIG. 18) in which door lock 404 inhibits exterior door 296 from opening, and an unlocked position in which door lock 404 is disengaged (i.e. does not impede exterior door 296 from opening). Door lock 404 can have any configuration suitable to inhibit exterior door 296 from opening when in the locked position. In the example shown, door lock 404 includes a latch bolt 408 that extends into a lock recess 412 in the locked position and retracts from the lock recess 412 in the unlocked position.

Reference is now made to FIG. 19. After depositing carbonation pod 500, engaging beverage container 108 with beverage carbonator 104, and closing carbonation pod insertion inlet 292, beverage carbonation system 100 (FIG. 2) may begin a carbonation operation. The carbonation operation may be started in any suitable manner. For example, the carbonation operation may begin automatically upon moving container engagement actuator 176 to the container engaged position. In some embodiments, moving lever 180 to the container engaged position signals electronic controller 388 (FIG. 5) to begin the carbonation operation. In the example shown, a user may interact with (e.g. make a user-selection using) one or more user inputs 416 (FIG. 2) or may send control signals to the electronic controller 388 directly or by way of the server computer 620 (FIG. 5). For example, user inputs 416 may include a "START" button, which may be activated to trigger controller 388 (FIG. 5) to execute the carbonation operation. Optionally, user inputs 416 may permit the user to configure one or more parameters of the carbonation operation, such as for example desired carbonation level (e.g. corresponding to a duration of the gas recirculation state).

FIG. 19 illustrates carbonation chamber 140 when in the reservoir draw state (described above in connection with FIG. 10). As shown, water 146 is pumped into carbonation chamber 140 through fluid inlet 204, and begins pooling within chamber housing 288. Water 146 contacts carbonation pod 500 and starts dissolving pod shell 504, to release granular carbonate material 516 and granular acid material 520 from respective first and second compartments 508, 512. Granular carbonate material 516 begins mixing with granular acid material 520 to generate carbon dioxide gas 168. Pod shell 504 is shown partially dissolved in FIG. 19.

FIG. 20 illustrates carbonation chamber 140 at the start of the gas recirculation state (described above in connection with FIG. 11). Compared with FIG. 19, water 146 has risen within chamber housing 288 and pod shell 504 is fully dissolved. The system gas pressure (e.g. within carbonation chamber 140 or elsewhere) may exceed the predetermined threshold, whereby pump 148 has been fluidly disconnected from water reservoir 144 and instead fluidly connected to carbonator inlet 132. Carbon dioxide gas continues to be generated by yet unreacted granular carbonate material 516 and granular acid material 520 (i.e. carbon dioxide generating material that has not completely reacted), and is recirculated continuously through beverage container 108. The duration of the recirculation state may determine the degree of carbonation of the resulting beverage, and in some embodiments this duration is determined by the electronic controller 388 (FIG. 5) based at least in part on user selections made with user input(s) 416 (FIG. 1), a program stored in memory 602 or memory 626, and/or control signals received from portable electronic device 620 or server computer 620 (FIG. 5).

Figure 21:
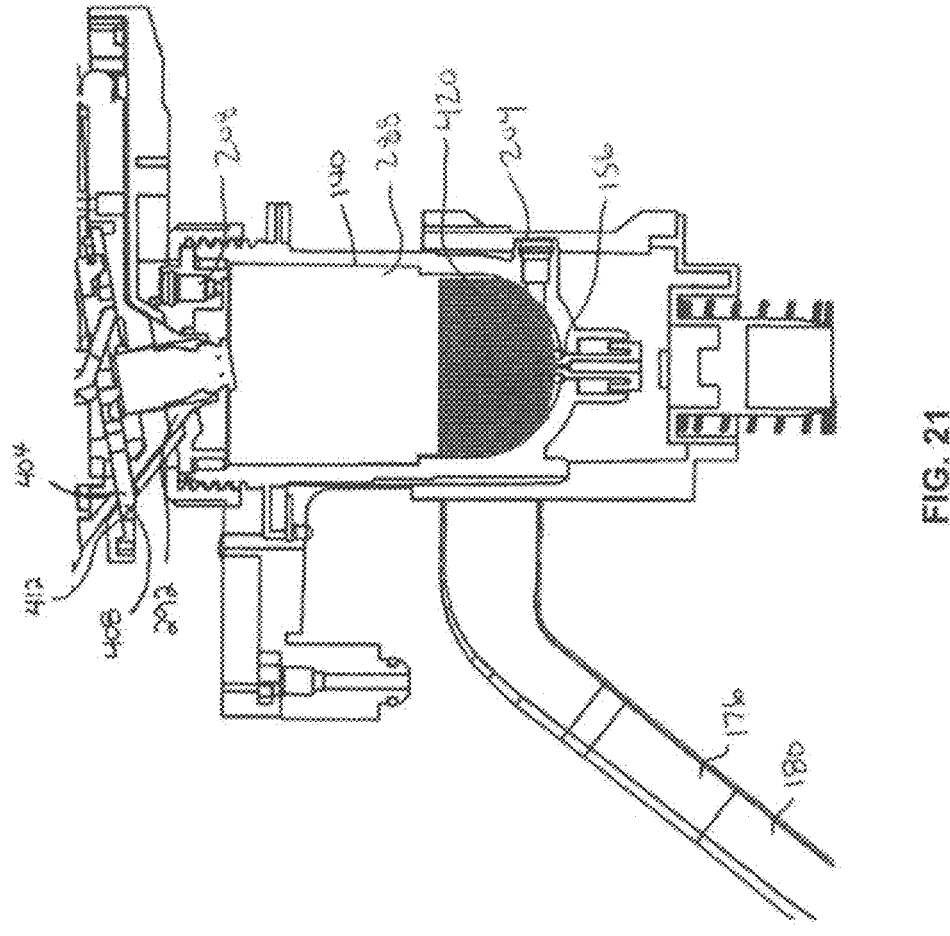
FIG. 21 is the partial cross-sectional view of FIG. 16, with the container engagement actuator in the engaged position, and gas recirculation terminated.

FIG. 21 illustrates carbonation chamber 140 at the moment the gas recirculation state is terminated. As shown, the reaction in the aqueous mixture of granular carbonate material, granular acid material, and water has completed, leaving only waste byproduct 420 behind. Dissolved pod shell 504 makes up part of this waste byproduct 420. Byproduct outlet 156 is shown in a closed position. In the example shown, container engagement actuator 176 is still in the container engaged position as shown in FIG. 24.

Figure 22:
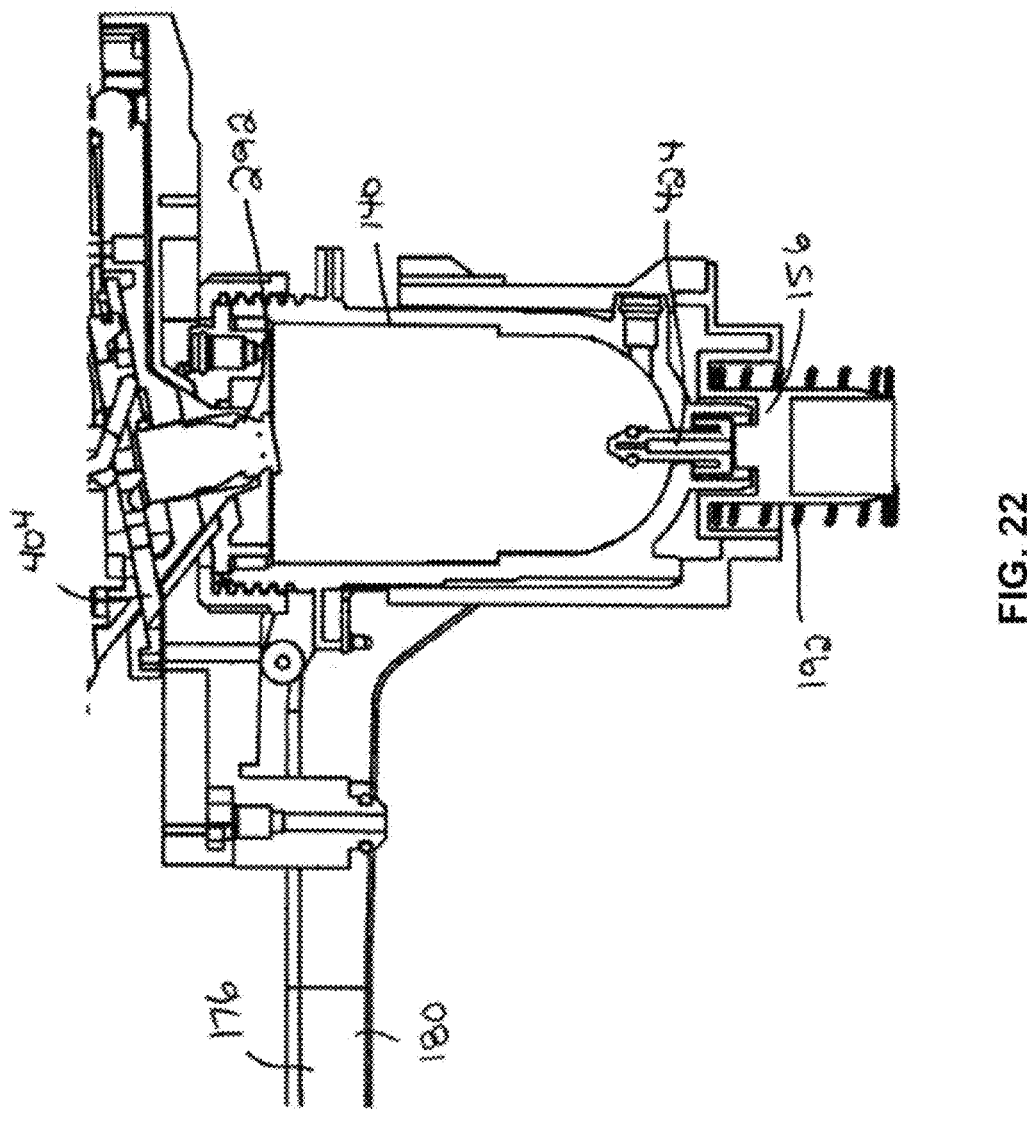
FIG. 22 is the partial cross-sectional view of FIG. 16, with the container engagement actuator in the disengaged position, and the carbonation chamber emptied of byproduct waste.

FIG. 22 illustrates carbonation chamber 140 after above-atmospheric gas pressure is trapped within carbonation chamber 140, and byproduct outlet 156 is opened whereby waste byproduct in carbonation chamber 140 is evacuated through byproduct outlet 156 into byproduct chamber 160 (FIG. 12). For example, a pressure difference between the above-atmospheric carbonation chamber 140 and the atmospheric byproduct chamber 160 (FIG. 12) may result in the contents of carbonation chamber 140 exiting rapidly through byproduct outlet 156 into byproduct chamber 160 when byproduct outlet 156 is opened.

Byproduct outlet 156 may be configured to be openable in any manner. In the example shown, byproduct outlet 156 includes a byproduct outlet valve 424. As shown, byproduct outlet valve 424 may remain in the closed position during the reservoir draw state and gas recirculation state, and may be opened after sealing above-atmospheric system gas pressure within at least carbonation chamber 140 to evacuate carbonation chamber 140 of byproduct. Byproduct outlet valve 424 may be moved between the open and closed position in any manner. For example, byproduct outlet valve

424 may be electronically actuated by electronic controller 388 (FIG. 5), or mechanically actuated (e.g. manually by the user, or automatically by an interaction with other system components). In the example shown, byproduct outlet valve 424 is biased to the closed position (e.g. by a valve bias 192), and opens automatically upon moving container engagement actuator 176 to the disengaged position (e.g. raising lever 180 to disengage the beverage container).

Figure 25:
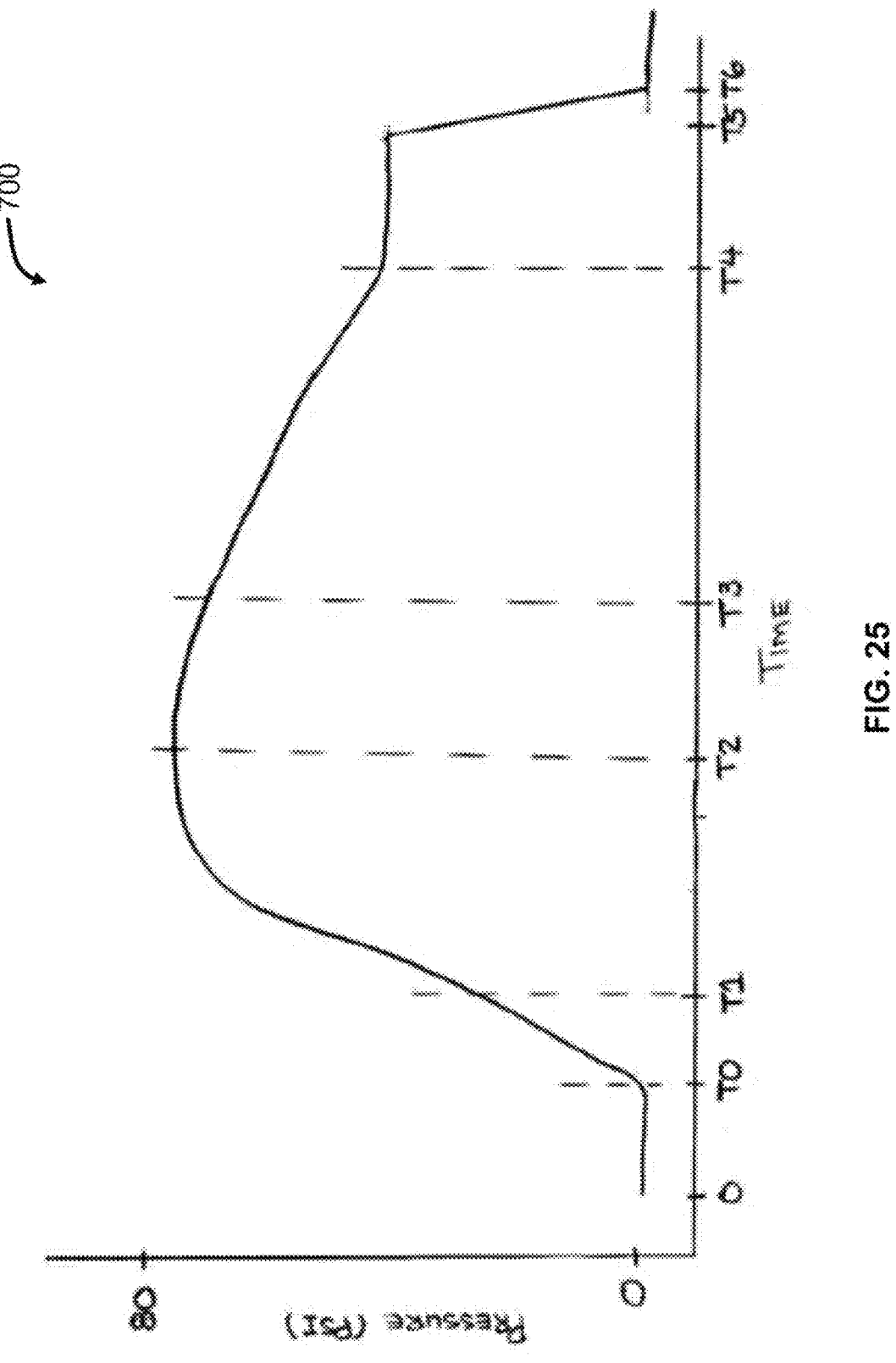
FIG. 25 is a pressure curve of system gas pressure during a carbonation operation.

FIG. 25 depicts a pressure curve 700 showing a system gas pressure within beverage carbonator 104 during a carbonation operation, in accordance with an embodiment. The plotted time and pressure values shown are examples reflecting only some embodiments. Other embodiments may produce a different curve. The general shape of curve 700 may apply to many embodiments. The pressure values shown are gage pressures, where 0 psi means 0 psi above atmospheric pressure.

Referring to FIGS. 10 and 19, at time TO beverage carbonation system 100 is in a reservoir draw state and the reaction in the aqueous mixture of water 146, granular carbonate material 516 and granular acid material 520 has just begun. The system gas pressure within beverage carbonator 104 rises to the predetermined threshold for flow valve 152 at T1. Thus, at T1 beverage carbonation system 100 changes to the gas recirculation state. Hereafter, beginning at T1, system gas pressure is (i) increased by carbon dioxide gas generation inside carbonation chamber 140 and (ii) decreased by carbon dioxide gas absorption by beverage 112.

At T2, the system gas pressure peaks and then begins to fall, which illustrates that the rate of carbon dioxide absorption equals and then begins to exceed the rate of carbon dioxide generation. This happens as a result of the unreacted carbon dioxide generating material (e.g. sodium bicarbonate and citric acid) within carbonation chamber 140 beginning to deplete.

At T3, all of the carbon dioxide generating material has been fully reacted and no further carbon dioxide gas is generated. The loss of system gas pressure is a result of carbon dioxide gas absorption into beverage 112.

At T4, beverage carbonation system 100 is in a container sealed state, and the remaining system gas pressure is retained in at least carbonation chamber 140.

At T5, byproduct outlet 156 is opened, and the system gas pressure is vented through byproduct outlet 156 to evacuate carbonation chamber 140 into byproduct container 160.

At T6, evacuation of byproduct container 160 is completed and the system gas pressure is at atmospheric pressure. Byproduct container 160 may be removed from beverage carbonator 104 and emptied (e.g. in a byproduct bin or sink) and then reconnected to beverage carbonator 104.

Figure 26:
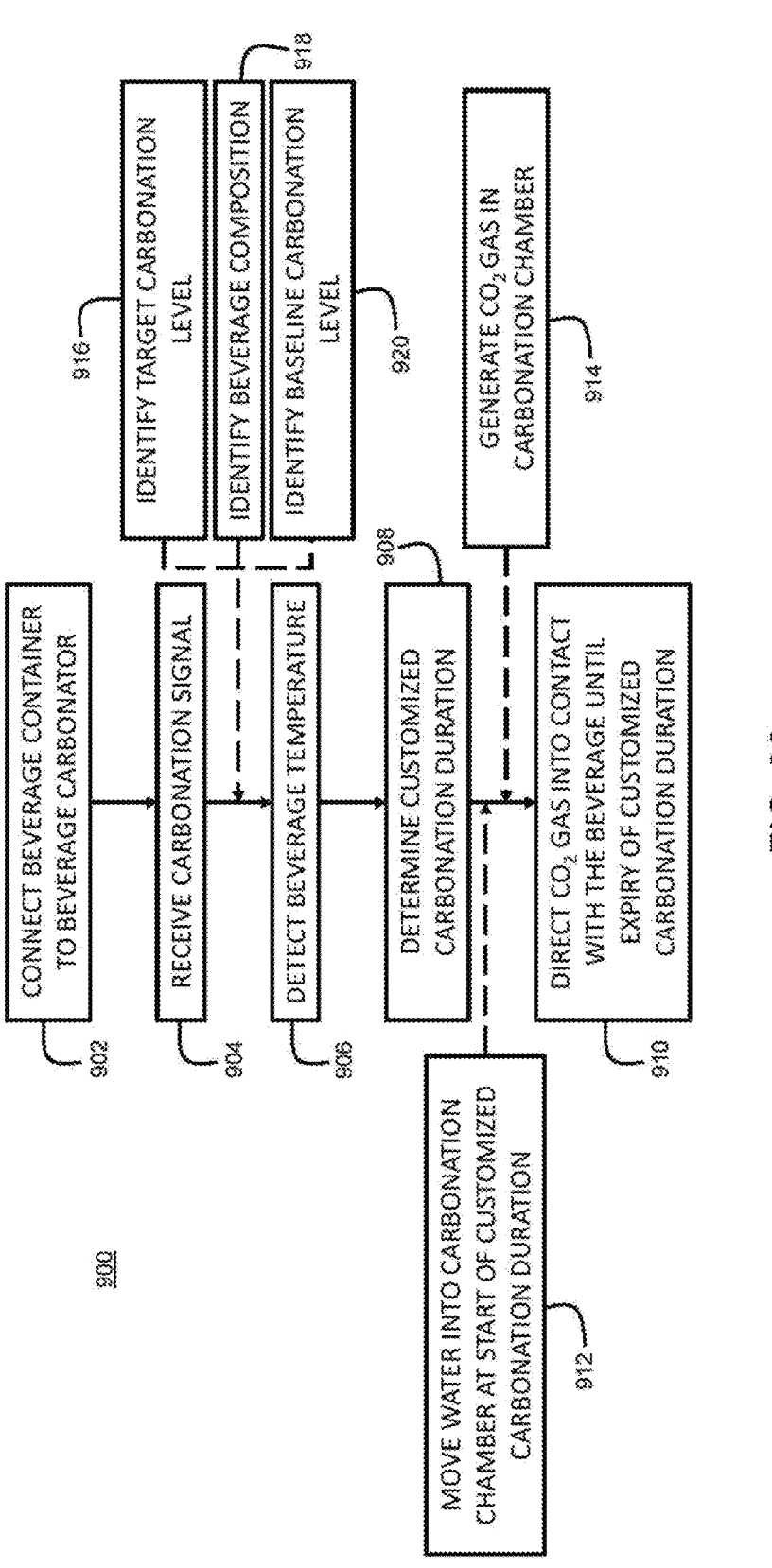
FIG. 26 is a flowchart of an example method of carbonating a beverage.

FIG. 26 shows a flowchart illustrating an example method 900 of carbonating a beverage. As discussed below, method 900 takes the temperature of the beverage into account when determining a carbonation duration (also referred to as a "carbonation cycle"). All else being equal, a beverage at a colder temperature (e.g. refrigerated water at 4° C.) will absorb carbon dioxide at a faster rate than the same beverage at a warmer temperature (e.g. cold tap water at 12° C.). As a result, the warmer beverage may need a longer carbonation duration (i.e. more contact time with the carbon dioxide gas) than the colder one to obtain the same carbonation level. Adjusting the carbonation duration for differences in beverage temperature can provide one or more advantages. For example, a user (i.e. drinker) may not have to worry that their cold beverage will be over carbonated, or alternatively, that their warm beverage will be under carbonated. In other words, the user may experience consistency in the carbonation level, irrespective of the temperature of the beverage being carbonated.

For clarity of illustration, method 900 is described below with reference to beverage carbonation system 100. However, method 900 is not limited to the use of beverage carbonation system 100, and can be practiced using any suitable carbonation device or system. For example, method 900 may be practiced using beverage carbonation system 100 shown in FIG. 28.

Figure 28:
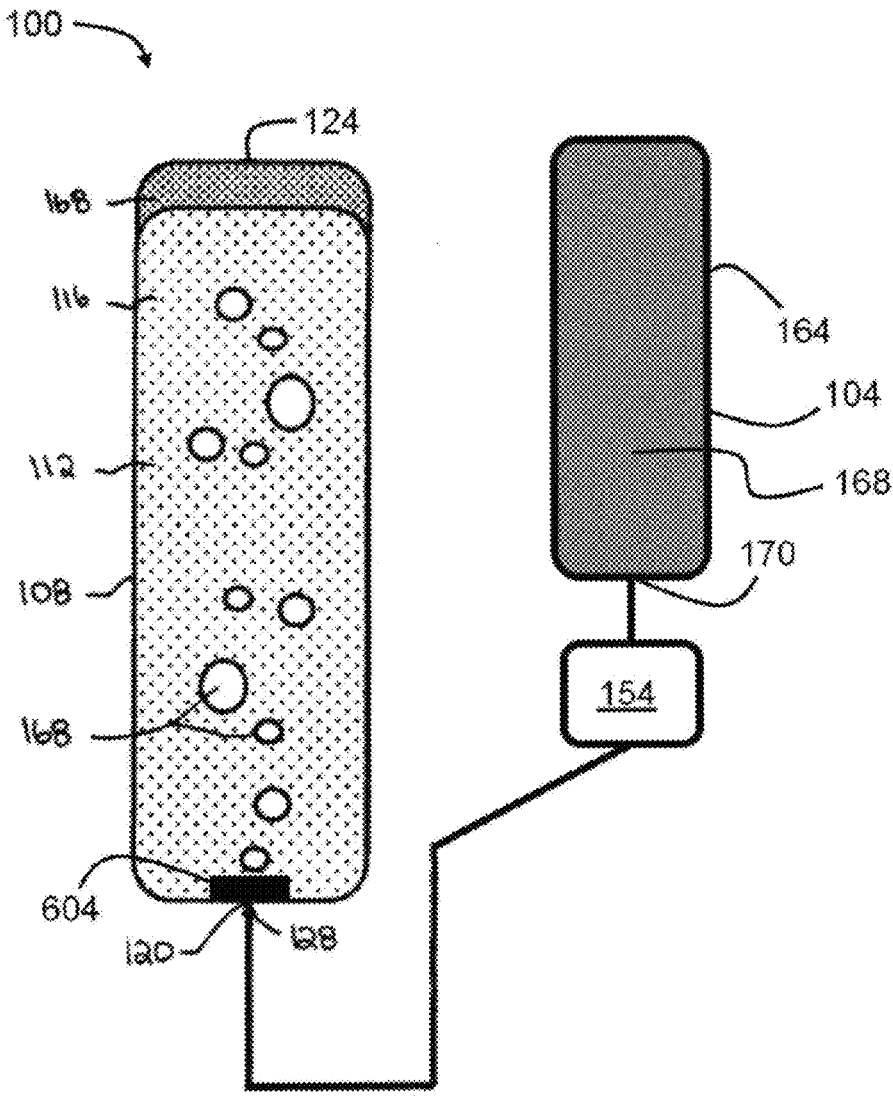
FIG. 28 is a schematic illustration of an example beverage carbonation system, including a carbon dioxide tank fluidly coupled to a beverage container across a flow valve.

FIG. 28 schematically illustrates a beverage carbonation system 100, in accordance with an alternative embodiment. As shown, beverage container 108 (e.g. a bottle), may include an inner volume 116 holding beverage 112, a container inlet 120 to admit carbon dioxide gas into inner volume 116, and a container outlet 124 to discharge carbon dioxide gas from inner volume 116. Container outlet 124 may vent unabsorbed carbon dioxide gas into the surrounding environment.

Beverage carbonator 104 may include a carbonator outlet 128 to discharge carbon dioxide from beverage carbonator 104 into container inlet 120, a carbon dioxide tank 164 having a tank outlet 170 for supplying carbon dioxide gas 168 to beverage container 108, a carbonator fluid flow path 136 extending between tank outlet 170 and carbonator outlet 128, and a flow valve 154 that controls movement of carbon dioxide gas from carbon dioxide tank 164 into beverage container 108 at container inlet 120. The carbon dioxide gas directed into inner volume 116 from carbon dioxide tank 164 can be absorbed into the beverage 112 to carbonate the beverage 112. As shown, carbon dioxide gas 168 is bubbling up through the beverage 112 in the beverage container 108. Beverage carbonator 104 is shown having a temperature sensor 604 located at the bottom of beverage container 108. Temperature sensor 604 may detect the temperature of beverage 112. When carbon dioxide tank 162 is depleted of carbon dioxide gas 168, it can be exchanged with a "fresh" carbon dioxide tank 162.

Referring again to FIG. 26, step 902 includes connecting a beverage container 108 to a beverage carbonator 104 (e.g. see FIG. 2). Beverage container 108 can be connected to beverage carbonator 104 in any way that allows carbon dioxide gas generated by beverage carbonator 104 to pass into beverage container 108 so that a beverage held therein can be carbonated. Step 902 may involve engaging a gas inlet of beverage container 108 to a gas outlet of the beverage carbonator 104. For example, as shown in FIG. 4, carbonator outlet 128 is sealed with container inlet 120 so that generated carbon dioxide gas can flow into inner volume 116 from beverage carbonator 104. The beverage held within beverage container 108 can be any beverage (or combination of beverages) that a user wishes to carbonate (e.g. water, wine, juice, etc.).

Step 904 includes receiving a carbonation signal associated with a user request to carbonate the beverage in the beverage container 108. The carbonation signal may be received from one or more user operable controls located on the beverage carbonator. For example, a user may manipulate user inputs 416 (FIGS. 1-2) to send the carbonation signal to processor 388 (e.g. to start a carbonation operation).

In some cases, the carbonation signal is received from a portable user device 620 or computer server 622 (FIG. 5). As discussed above with reference to FIG. 5, both portable user device 620 and computer server 622 can be communicatively coupled to beverage carbonator 104 through its electronic control system 600. For example, a portable electronic device 620 may send a control signal to processor 388 when a user accessing a website or running a program on portable electronic device 620 selects "start carbonation" or the like.

Step 906 includes detecting a temperature of the beverage to be carbonated. The temperature may be received from temperature sensor 604 (FIG. 5). Referring to FIG. 5, temperature sensor 604 is communicatively coupled to processor 388, directly or indirectly. In some embodiments, processor 388 may receive temperature signals from temperature sensor 604 at any time (e.g. just before or just after beginning the carbonation cycle), periodically (e.g., regularly every 0.5 to 10 seconds) and/or substantially continuously (e.g. a continuous analog signal, or signals at intervals of less than 0.5 seconds). Processor 388 may be configured to identify the detected temperature of the beverage based on the received temperature signal.

Figure 27:
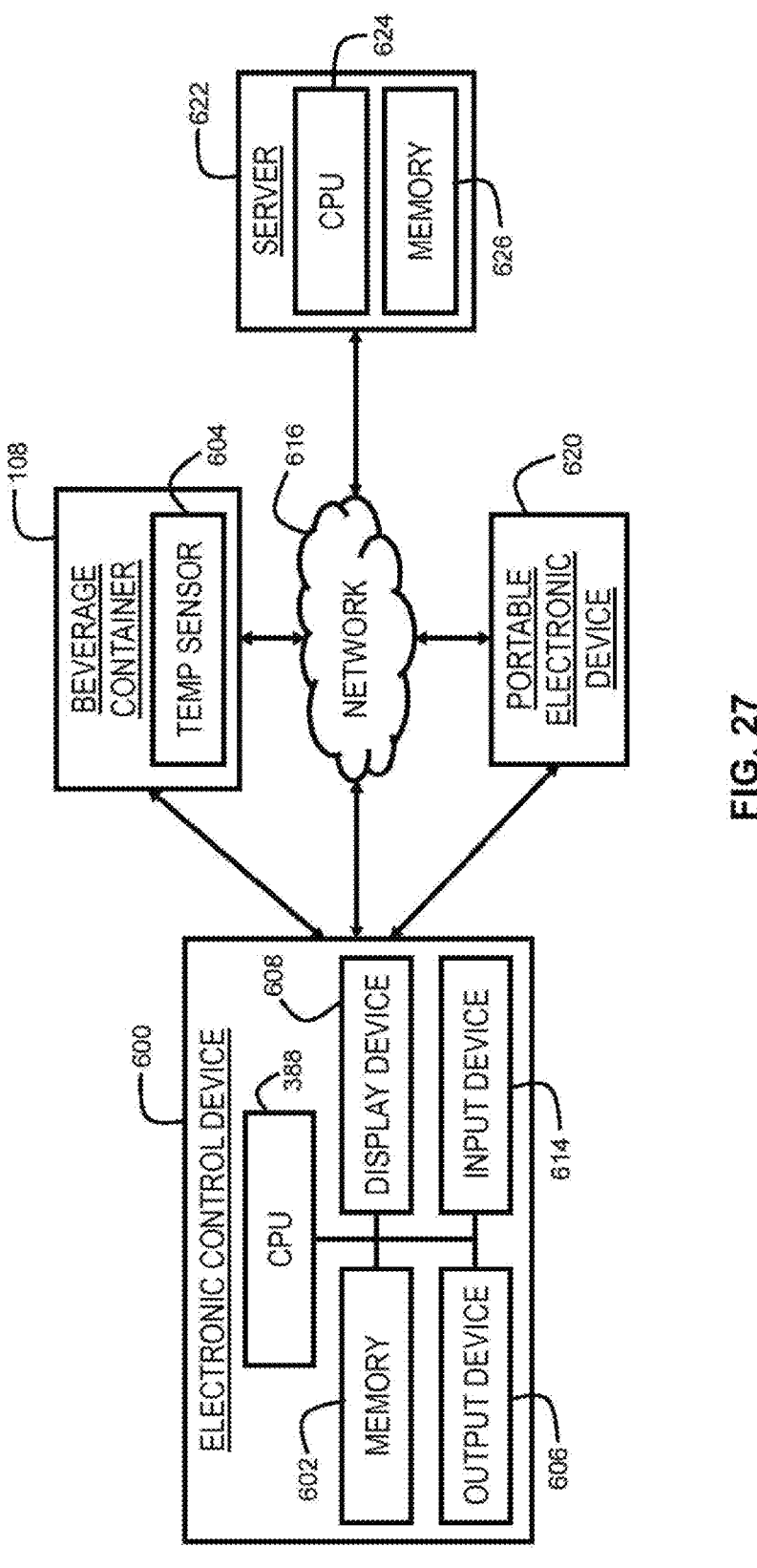
FIG. 27 is a schematic illustration of an example electronic control system of the beverage carbonator of FIG. 1 shown communicatively coupled to a portable electronic device, a beverage container, and a server computer.

Temperature sensor 604 may be located in any suitable position which allows it to take accurate temperature readings of the beverage within beverage container 108. The schematic of FIGS. 27 and 28 illustrate that temperature sensor 604 may be located inside the beverage container 108. In particular, the schematic of FIG. 27 shows that temperature sensor 604 can be communicatively coupled to processor 388 and/or processor 624 across wireless network 616 (e.g. Bluetooth®, or 802.11x). An advantage of locating temperature sensor 604 inside beverage container 108 (i.e. within inner volume 116) is that it may enable accurate temperature readings of the beverage since the temperature sensor 604 is submerged in a large volume of the beverage.

Alternatively, or in addition, a tube can extend from a proximate tube end at the carbonator inlet 132, through the container outlet 124, to a distal tube end within the bottle container 108. The tube may extend a sufficient length so that a temperature sensor 604 disposed at the distal tube end makes contact with (or is submerged in) the beverage in beverage container 108, thereby allowing the temperature sensor 604 to detect the beverage temperature.

Referring to FIGS. 29A-29B, a temperature sensor 604 is shown located at carbonator outlet 128. Compared to the locations discussed above, this location of temperature sensor 604 may be less complex and easier to manufacture. With a location on beverage carbonator 104, temperature sensor 604 can be communicatively coupled to processor 388 through a wired connection. A wired connection between temperature sensor 604 and processor 388 may be simpler, more reliable, and less expensive to design and manufacture than a wireless connection, all else being equal.

Another advantage to locating temperature sensor 604 on beverage carbonator 104 is that the same temperature sensor 604 can be used for a number of beverage containers 108. A user may have several beverage containers 108 for use with one carbonator 108. This may be not the case when the temperature sensor 604 is located within the beverage container 108. In this case, each beverage container 108 may require its own temperature sensor 604, or alternatively, one temperature sensor 604 may have to be moved from beverage container 108 to beverage container 108 according to which one is being used. An additional advantage to locating temperature sensor 604 at carbonation outlet 128 is discussed below with reference to FIGS. 29A-29B.

FIGS. 29A-29B illustrate steps in a container engagement sequence. FIG. 29A shows carbonation system 100 in a container disengaged position, while FIG. 29B shows carbonation system in a container engaged position. The illustrated container engagement sequence may be directed by (e.g. performed by) a container engagement actuator 176. As shown in FIG. 1, container engagement actuator 176 may include a manually user-operable member 180 to move system 100 through the steps of the container engagement sequence described below. Alternatively or in addition, container engagement actuator 176 may include a powered device(s) (e.g. electro-mechanical device, such as a motor or solenoid) that may be activated to move system 100 through the steps of the engagement sequence. In the example shown, container engagement actuator 176 includes a lever 180 that is movable (e.g. rotatable) to move system 100 through the steps of the disengagement sequence. Although reference is made to "lever" 180, it will be appreciated that other manually user-operable members 180 may substitute the lever.

An advantage of using a manually user-operable member 180 is that it may provide the user with greater control over the operation of system 100, and may be simpler and less expensive to design and manufacture. On the other hand, a container engagement actuator 176 including powered device(s) may be automatically activated (i.e. by controller 388 (FIG. 5), without user intervention) by programmed logic (e.g. a carbonation program stored in memory), which may improve the convenience of system 100 by reducing the user interactions required to operate system 100.

Referring again to FIGS. 29A-29B, container inlet 120 and carbonator outlet 128 may be fluidly connected in any manner that allows container inlet 120 to reclose to seal container inner volume 116. In the example shown, carbonator outlet 128 has a carbonator outlet valve 212. Carbonator outlet valve 212 may be movable between a closed position (FIG. 29A), in which carbonator outlet 128 is sealed and prevents above-atmospheric gas from escaping beverage carbonator 104 through carbonator outlet 128 and an open position (FIG. 29B), in which gas carbon dioxide gas can pass through carbonator outlet 128 to container inner volume 116. In the example shown, temperature sensor 604 is located at a distal end of carbonator outlet valve 212.

Carbonator outlet valve 212 may be opened and closed in any manner. In the example shown, carbonator outlet valve 212 is biased (e.g. by spring 220) to the closed position (FIG. 29A), and held in the open position by beverage container 108 when system 100 is in the container engaged position (FIG. 29B). An advantage of this design is that it allows carbonator outlet valve 212 to reclose automatically when disconnecting beverage container 108 from beverage carbonator 104, and to remain closed until beverage container 108 is reconnected to beverage carbonator 104.

As shown in FIG. 29B, when in the container engaged position, carbonator outlet 128 engages with (e.g. applies force upon) container inlet 120 to hold container inlet 120 open. In other embodiments, beverage container 108 may not hold carbonator outlet valve 212 open. For example, carbonator outlet valve 212 may be manually openable (i.e. by hand) after connecting beverage container 108 to beverage carbonator 104. Similarly, carbonator outlet valve 212 may be manually closeable (i.e. by hand) before disconnecting beverage container 108 from beverage carbonator 104. This may simplify the design of beverage carbonation system 100, which may reduce manufacturing costs.

Referring again to FIGS. 29A-29B, container inlet 120 includes a container inlet valve 184. FIG. 29A shows container inlet valve 184 in a closed position, in which valve 184 closes container inlet 120 thereby sealing container inner volume 116 and preventing any entry or exit of gas (indeed, any fluid) into or out of container inner volume 116. FIG. 29B shows container inlet valve 184 in an open position, in which carbon dioxide gas can pass through container inlet 120 to exchange gas between beverage carbonator 104 and container inner volume 116.

Container inlet valve 184 may be closed in any manner. In the example shown, container inlet valve 184 is biased (e.g. by spring 192) to the closed position (FIG. 29A), and held in the open position by the beverage carbonator 104 when in the container engaged position (FIG. 29B). An advantage of this design is that it allows container inlet valve 184 to reclose automatically when disconnecting beverage container 108 from beverage carbonator 104, and to remain closed until reconnected to beverage carbonator 104.

As shown in FIG. 29B, when in the container engaged position, container inlet 120 engages with (e.g. applies force upon) carbonator outlet valve 212 to hold carbonator outlet valve 212 open. In other embodiments, beverage carbonator 104 may not hold container inlet valve 184 open. For example, container inlet valve 184 may be manually openable (i.e. by hand) after connecting beverage container 108 to beverage carbonator 104. This may simplify the design of beverage carbonation system 100, which may reduce manufacturing costs.

Referring to FIG. 29B, carbonator outlet valve 212 and container inlet valve 184 mutually engage to hold each other open, whereby valve biases 192 and 220 exert opposing forces. As the container inlet valve 184 moves from the closed (FIG. 29A) to open position (FIG. 29B) (e.g. by moving lever 180 from the container disengaged position to the container engaged position), a small volume (e.g. 1 to 5 mL) of the beverage is released into a temperature detection cavity 224. In the example shown, cavity 224 is defined in part by carbonation outlet 128 and a lower end 240 of beverage container 108. As discussed above and illustrated in FIGS. 29A-29B, the temperature sensor 604 is located at the distal end of carbonator outlet valve 212. In the container engaged position, temperature sensor 604 is located proximate to container inlet valve 184. Accordingly, temperature sensor 604 is well positioned to take temperature readings of the small volume of beverage released into temperature detection cavity 224 during the container engagement sequence.

Comparing FIGS. 29A-29B with FIGS. 30A-30B shows alternative positions of temperature sensor 604 at carbonation outlet 128. In FIGS. 29A-29B, temperature sensor 604 is downstream of carbonator outlet valve 212. While in FIGS. 30A-30B, temperature sensor 604 is upstream carbonator outlet valve 212.

Referring again to FIGS. 29A-29B, container inlet 120 may be sealed to carbonator outlet 128. This may provide a gas tight connection between container inlet 120 and carbonator outlet 128, which may mitigate a loss of carbon dioxide gas to the environment when exchanging gas across container inlet 120 and carbonator outlet 128. The seal between container inlet 120 and carbonator outlet 128 may be formed in any manner that reduces or eliminates a loss of gas to the environment. In some embodiments, the seal may be formed by threads or an interference fit. In other embodiments, one or both of container inlet 120 and carbonator outlet 128 includes a sealing member 196 (also referred to as a seal or gasket). In the illustrated example, carbonator outlet 128 includes a seal 196 (e.g. an O-ring) that contacts container inlet 120 when carbonator outlet 128 is sealed to container inlet 120. Similarly, in the illustrated example, container inlet 120 includes a seal 196 contacts carbonator outlet 128 when container inlet 120 is sealed to carbonator outlet 128.

Step 908 includes determining a customized carbonation duration, based at least in part on the detected temperature, to obtain a targeted carbonation level in the beverage. Beverage temperature can impact the rate at which the beverage can absorb carbon dioxide gas. As discussed above, a beverage at a colder temperature generally absorbs carbon dioxide at a faster rate than the same beverage at a warmed temperature, all else being equal. For example, a beverage at a temperature of 12° C. will absorb approximately 20% less carbon dioxide gas than the same beverage at a temperature of 4° C. Accordingly, to obtain the targeted carbonation level, processor 388 and/or processor 624 (FIGS. 5 and 27) may determine a customized carbonation duration that accounts for the temperature detected at step 906.

In determining the customized carbonation duration, processors 388, 624 are effectively determining the length of time carbon dioxide gas has surface-to-surface contact with the beverage being carbonated. By varying the time that the carbon dioxide gas has surface contact with the beverage being carbonated, processors 388, 624 can vary the carbonation level perceived by the drinker. All else being equal, increasing the carbonation duration gives the carbon dioxide gas more time to dissolve into the beverage, while decreasing the carbonation duration gives the carbon dioxide gas less time to dissolve into the beverage.

As an example, to create sparkling water with a target carbonation level of 2.9 vol $CO_2$ per volume of carbonated beverage (moderate carbonation), the determined custom carbonation duration may be 195 seconds when the detected beverage temperature is 15° C. As another example, to create sparkling water with the same target carbonation level of 2.9 vol $CO_2$ per volume of carbonated beverage, the determined custom carbonation duration may be 145 seconds when the detected beverage temperature is 8° C. As yet another example, to create sparkling water with the same target carbonation level of 2.9 vol $CO_2$ per volume of carbonated beverage, the determined custom carbonation duration may be 85 seconds when the detected beverage temperature is 4° C. As illustrated by the examples above, shorter carbonation durations may be determined (at step 908) to obtain the same target carbonation level as beverage temperature decreases (i.e. gets colder).

In some embodiments, step 908 includes determining the customized carbonation duration, based at least in part on the detected temperature and the received carbonation signal, to obtain the targeted carbonation level in the beverage. To determine the customized carbonation duration, processor 388 and processor 624 (FIG. 5) may be configured individually or collectively to determine the customized carbonation duration, based at least in part on the detected temperature and the received carbonation signal, to obtain the targeted carbonation level in the beverage.

The target carbonation level may be associated with the carbonation signal received at step 904. Optionally, step 916 can include identifying the targeted carbonation level based on the received carbonation signal. Processor 388 and processor 624 (FIG. 5) may be configured individually or collectively to identify the targeted carbonation level based on the received carbonation signal. For example, the carbonation signal may contain data that processor 388 may use to identify the target carbonation level.

The target carbonation level may be one or more predetermined carbonation level stored in memory 602 and/or memory 626 (FIGS. 5 and 27). As an example, a user may be able to select a target carbonation level (e.g. low, medium, strong, or very strong) by manipulating user inputs 416 (FIGS. 1-2). As another example, a user may be able to select a target carbonation level by accessing a website or running a program on portable electronic device 620 (FIGS. 5 and 27).

In other embodiments, the target carbonation level may be based on a user carbonation preference stored in memory 602 and/or memory 626. As an example, the user carbonation preference may be set at "low carbonation", "medium carbonation", "strong carbonation", or a specific carbonation level (e.g. 2.5, 2.6, 2.7, 2.8, etc.). By specifying a preferred carbonation level, the user can be assured that each carbonated beverage has a carbonation level to their satisfaction. For example, the user may be able to store their user carbonation preference in memory 602, 626 by manipulating user inputs 416 (FIGS. 1-2) and/or by accessing a website or running a program on portable electronic device 620 (FIGS. 5 and 27).

Memory 602 and/or memory 626 may store lookup tables retrievable by processor 388 and/or processor 624 at step 908. One such lookup table may include an array of carbonation durations for value pairs of beverage temperatures and target carbonation levels. Processor 388 and processor 624 (FIG. 5) may be configured individually or collectively to identify a carbonation duration for a given target carbonation level and received beverage temperature by identifying the nearest entry in the lookup table, by interpolating between the closest entries in the lookup table, or by extrapolating from the closest entry in the lookup table.

Step 910 includes directing carbon dioxide gas into contact with the beverage until expiry of the customized carbonation duration. Contacting may involve bubbling the carbon dioxide gas through the beverage in beverage container 108 (e.g. see FIG. 27). At the end of the customized carbonation duration, carbon dioxide gas may cease being directed into contact with the beverage. As discussed above with reference to FIGS. 1-4, beverage carbonator 104 includes a pump 148 fluidly coupled to a carbonation chamber 140 and the beverage container 108. In this embodiment, step 910 may include operating pump 148 during the customized carbonation duration. As discussed above, when activated, pump 148 can move carbon dioxide generated in carbonation chamber 140 into contact with the beverage in the beverage container 108.

At the expiry of the customized carbonation duration, processor 388 may be configured to close carbonator outlet 128 and/or deactivate pump 148. This can prevent additional carbon dioxide from being brought into contact with the beverage after the carbonation duration has ended. In other embodiments, step 910 may include processor 388 executing an automated carbonation program that includes sending control signals to pump 148 during the customized carbonation duration. These control singles may specify pumping speed and/or times when the pump is to activate/deactivate.

In some embodiments, step 910 may include recirculating carbon dioxide gas exiting the beverage container 108 back into the beverage container 108 until the expiry of the customized carbonation duration. As discussed above with reference to FIG. 11, pump 148 may act to recirculate carbon dioxide gas exiting container outlet 124 back into beverage container 108 through carbonator outlet 128 and container inlet 120. This allows a volume of carbon dioxide gas generated by beverage carbonator 104 to make repeated contact with the beverage inside beverage container 108 during the carbonation duration and thereby accelerate absorption into the beverage.

Referring again to FIG. 26, optional step 912 can include moving water into carbonation chamber 140 (FIG. 3) at a start of the customized carbonation duration. For example, at the start of the customized carbonation duration processor 388 may be configured to activate pump 148 to begin moving water 146 from water reservoir 144 into carbonation chamber 140 (FIG. 10). In other embodiments, processor 388 may be configured to open fluid inlet 204 at a start of the customized carbonation duration so that water may be gravity fed from water reservoir 144 into carbonation chamber 140.

Optionally, step 914 can include generating the carbon dioxide gas in a carbonation chamber 140 of the beverage carbonator 104. As discussed above with reference to FIGS. 16-21, a reaction that generates carbon dioxide gas may take place within carbonation chamber 140 when carbon dioxide generating material is mixed (i.e. catalyzed) with the water delivered at step 912. However, as demonstrated in FIG. 28, steps 912 and 914 may be omitted when method 900 is practiced with a carbonation system 100 that includes a carbon dioxide tank 164 with premade carbon dioxide gas.

Beverage composition can influence perceived carbonation levels. As an example, in order to be perceived as strongly carbonated, commercial colas are generally carbonated to 4.0 vol $CO_2$ per volume of carbonate beverage as the sugars and acids within the cola have a dampening effect on the tongue's ability to perceive of carbonation. As another example, sparkling wines are often perceived as only moderately carbonated despite having about 3.5 vol of $CO_2$ per volume of carbonate beverage (i.e. a carbonation level typically associated with strong carbonation). As a comparison, sparkling wine at a carbonation level of 3.5 vol of $CO_2$ per volume of carbonated beverage has about the same perceived carbonation as sparkling water at a carbonation level of 2.9 vol of $CO_2$ per volume of carbonated beverage (measured at the same beverage temperature). Unlike water, wine contains sugars, acids and flavors that dampen the tongue's ability to perceive carbonation.

Beverage composition can also have an impact on the rate at which the beverage can absorb carbon dioxide gas. As else being equal, water absorbs carbon dioxide gas at the fastest rate. There is a decline in the rate of carbon dioxide gas absorption based on the beverage's proportion of constituents that inhibit or do not absorb carbon dioxide gas as readily (e.g. sugar, alcohol, solids like a fruit or pulp, etc.).

Therefore, all else being equal, the same carbonation duration for beverages of different composition can produce different perceived carbonation levels in those beverages. To further improve user satisfaction, processor 388 and processor 624 (FIG. 5) may be configured individually or collectively to take both the beverage temperature and the beverage composition into account when determining the customized carbonation duration at step 908.

The beverage composition may be associated with the carbonation signal received at step 904. Optionally, step 918 can include identifying the beverage composition based on the received carbonation signal. Processor 388 and processor 624 (FIG. 5) may be configured individually or collectively to identify the beverage composition based on the received carbonation signal. For example, the carbonation signal may contain data that processor 388 or processor 624 may use to identify the beverage composition.

The beverage composition may be one or more predetermined beverage compositions stored in memory 602 (FIGS. 5 and 27), such as, for example, water, orange juice, apple juice, and wine. A user may be able to communicate the beverage composition to processor 388 by manipulating user inputs 416 (FIGS. 1-2). In this context, beverage compositions stored in memory 602 may be referred to as "local" beverage compositions. Alternatively, or in addition, the beverage composition may be one of a plurality of predetermined beverage compositions stored in remote memory 626 (FIGS. 5 and 27). A user may be able to select one of the plurality of predetermined beverage compositions by accessing a website or running a program on portable electronic device 620 (FIGS. 5 and 27). In this context, beverage compositions stored in memory 602 may be referred to as "remote" beverage compositions.

It will be appreciated that increasing the number of beverage compositions there are for a user to choose from can increase the likelihood that the user can closely match the beverage they are carbonating. Ultimately, this may lead to better carbonation results. In some embodiments, memory 626 may store several hundred remote beverage compositions for a user to select from. Using orange juice as an example, these beverage compositions may include orange juice with pulp, orange juice without pulp, or even specify the brand of orange juice. The remote beverage compositions may even include common mixtures of two or more different drink types (e.g. orange juice mixed with wine, or a variety of cocktails).

In some embodiments, a user may be able to create a customized beverage composition by accessing a website or running a program on portable electronic device 620. This may be advantageous in cases where the user is unable to identify a local or remote beverage composition that closely matches the beverage they are carbonating. For example, a user may wish to carbonate a beverage that is 75% white wine and 25% orange juice. Using an algorithm, processor 388 and/or processor 624 may be able to determine a customized carbonation duration based on the detected beverage temperature and the customized beverage composition specified by the user via portable electronic device 620.

As discussed above, memory 602 and/or memory 626 may store lookup tables retrievable by processor 388 and/or processor 624 at step 908. For example, memory 602 and/or memory 626 may store a plurality of lookup tables. Each of the stored lookup tables may correspond to a specific beverage composition (e.g. apple juice, wine, etc.) and include an array of carbonation durations for value pairs of beverage temperatures and target carbonation levels. Where the beverage composition includes a combination of two or more beverages (e.g. 75% white wine and 25% orange juice), processor(s) 388, 624 may reference the lookup table associated with each beverage (e.g. the white wine and the orange juice lookup tables) and weight the determined carbonation durations according to their proportions in the beverage (e.g. 0.75× white wine duration+0.25× orange juice duration).

In some embodiments, the carbonation signal received at step 904 is associated with a baseline carbonation duration. Optionally, step 920 can include identifying the baseline carbonation duration based on the received carbonation signal. Processor 388 and processor 624 (FIG. 5) may be configured individually or collectively to identify the baseline carbonation duration based on the received carbonation signal. For example, the carbonation signal may contain data that processor 388 or processor 624 may use to identify the baseline carbonation duration.

In some embodiments, the baseline carbonation duration may be one or more predetermined baseline carbonation durations stored in memory 602 or memory 626 (FIGS. 5 and 27). Baseline carbonation durations may be associated with a particular beverage temperature (e.g. 12° C.). That is, memory 602 and/or memory 626 may store "standardized" carbonation durations for a number of different beverage compositions at one temperature. In these embodiments, processor 388 and processor 624 may be configured individually or collectively to determine a carbonation duration adjustment to apply to the baseline carbonation duration. The carbonation duration adjustment is based at least in part on a difference between the baseline beverage temperature and the detected temperature of the beverage. In this context, the carbonation duration adjustment may be characterized as a "temperature correction factor".

In other embodiments, the baseline carbonation duration may be selected by a user. For example, the user may be able to communicate the baseline carbonation duration to processor 388 by manipulating user inputs 416 (FIGS. 1-2). Alternatively, or in addition, the user may be able to communicate the baseline carbonation duration to processor 388 or processor 624 by accessing a website or running a program on portable electronic device 620 (FIGS. 5 and 27). In these embodiments, processor 388 and processor 624 may be configured individually or collectively to determine a carbonation duration adjustment to apply to the baseline carbonation duration selected by the user. Effectively, processor 388 and/or processor 624 is able to modify the carbonation duration provided by the user based on the beverage temperature detected at step 906. For example, a user may request a carbonation duration of 90 seconds. However, the user may not be aware that the temperature of the beverage they are carbonating is 20° C. and not 12° C. like it was the day before. By applying the carbonation duration adjustment at step 908, processor 388 and/or processor 624 can determine a customized carbonation duration that harmonizes carbonation levels across beverage temperatures.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

Items

Item 1: A carbonation pod for depositing carbon dioxide generating material into a carbonation chamber of a beverage carbonator, the carbonation pod comprising:
a dissolvable pod shell that is flexible and rapidly water-dissolvable, the dissolvable pod shell defining separate first and second compartments, the first compartment being sealed from the second compartment;
a granular carbonate material sealed within the first compartment, the granular carbonate material being water-dissolvable;
a granular acid material sealed within the second compartment, the granular acid material being water-dissolvable;
the granular carbonate material being reactive with the granular acid material at least when mixed together in water to generate carbon dioxide gas.

Item 2: The carbonation pod of any preceding item, wherein:
the first and second compartments are adjacent.

Item 3: The carbonation pod of any preceding item, wherein:
the dissolvable shell is dissolvable in water to expose the granular carbonate material to the granular acid material.

Item 4: The carbonation pod of any preceding item, wherein:
the granular acid material comprises a carboxylic acid.

Item 5: The carbonation pod of any preceding item, wherein:
the carboxylic acid is citric acid.

Item 6: The carbonation pod of any preceding item, wherein:
the granular carbonate material comprises sodium bicarbonate.

Item 7: The carbonation pod of any preceding item, wherein:
the dissolvable pod shell comprises a water-soluble synthetic polymer.

Item 8: The carbonation pod of any preceding item, wherein:
the dissolvable pod shell is at least 50% dissolved when exposed to water for 15 minutes.

Item 9: The carbonation pod of any preceding item, wherein:
between 5 g and 25 g of granular carbonate material is sealed within the first compartment, and between 5 g and 25 g of granular acid material is sealed within the second compartment.

Item 10: The carbonation pod of any preceding item, wherein:
the granular carbonate material reacts with the granular acid material when mixed together in water to generate between 2 L and 5 L of carbon dioxide gas measured at a pressure of 1 atm and a temperature of 25° C.

Item 11: The carbonation pod of any preceding item, wherein:
a ratio of granular carbonate material to granular acid material is between 1:1 and 1.5:1.

Item 12: The carbonation pod of any preceding item, wherein:
the first and second compartments have a collective internal volume between 15 mL and 50 mL.

Item 13: A retail package comprising a plurality of the carbonation pods of any preceding item, wherein:
each carbonation pod of the plurality of carbonation pods comprises a quantity of granular carbonate material and a quantity of granular acid material, the quantity of granular carbonate material being equal for each carbonation pod of the plurality of carbonation pods, and the quantity of granular acid material being equal for each carbonation pod of the plurality of carbonation pods.

Item 14: A beverage carbonation system comprising:
a carbonation pod comprising:
a dissolvable pod shell that is flexible and rapidly water-dissolvable, the dissolvable pod shell defining separate first and second compartments, the first compartment being sealed from the second compartment;
a granular carbonate material sealed within the first compartment, the granular carbonate material being water-dissolvable; and
a granular acid material sealed within the second compartment, the granular acid material being water-dissolvable, the granular carbonate material being reactive with the granular acid material at least when mixed together in water to generate carbon dioxide gas;

a beverage carbonator comprising:

a carbonation chamber having a carbonation pod insertion inlet, a fluid inlet, a carbon dioxide outlet, and a carbonation pod seat, the carbonation pod seat being positioned to receive the carbonation pod deposited into the carbonation chamber through the carbonation pod insertion inlet, the carbonation pod seat and the fluid inlet being arranged to expose the carbonation pod seated on the carbonation pod seat to water introduced into the carbonation chamber through the fluid inlet.

Item 15: The beverage carbonation system of any preceding item, wherein:

the carbon dioxide outlet provides an exit for carbon dioxide gas generated in the carbonation chamber.

Item 16: The beverage carbonation system of any preceding item, wherein:

the carbonation chamber comprises a shell piercer.

Item 17: The beverage carbonation system of any preceding item, wherein:

the carbonation chamber comprises a byproduct outlet, the byproduct outlet openable to provide an exit for waste byproduct from the carbonation chamber.

Item 18: The beverage carbonation system of any preceding item, wherein:

the dissolvable shell is dissolvable in water to generate the waste byproduct.

Item 19: The beverage carbonation system of any preceding item, wherein:

the first and second compartments are adjacent.

Item 20: The beverage carbonation system of any preceding item, wherein:

the dissolvable shell is dissolvable in water to expose the granular carbonate material to the granular acid material.

Item 21: The beverage carbonation system of any preceding item, wherein:

the granular acid material comprises a carboxylic acid.

Item 22: The beverage carbonation system of any preceding item, wherein:

the carboxylic acid is citric acid.

Item 23: The beverage carbonation system of any preceding item, wherein:

the granular carbonate material comprises sodium bicarbonate.

Item 24: The beverage carbonation system of any preceding item, wherein:

the dissolvable pod shell comprises a water-soluble synthetic polymer.

Item 25: The beverage carbonation system of any preceding item, wherein:

the dissolvable pod shell is at least 50% dissolved when exposed to water for 15 minutes.

Item 26: The beverage carbonation system of any preceding item, wherein:

between 5 g and 25 g of granular carbonate material is sealed within the first compartment and between 5 g and 25 g of granular acid material is sealed within the second compartment.

Item 27: The beverage carbonation system of any preceding item, wherein:

the granular carbonate material and the granular acid material react to generate between 2 L and 5 L of carbon dioxide gas measured at a pressure of 1 atm and a temperature of 25° C.

Item 28: The beverage carbonation system of any preceding item, wherein a ratio of granular carbonate material to granular acid material is between 1:1 and 1.5:1.

Item 29: The beverage carbonation system of any preceding item, wherein the first and second compartments have a collective internal volume between 15 mL and 50 mL.

Item 30: A method of generating carbon dioxide gas for a beverage, the method comprising:

depositing a carbonation pod through a carbonation pod insertion inlet of a carbonation chamber onto a carbonation pod seat within the carbonation chamber, the carbonation pod having a dissolvable pod shell that is flexible and rapidly water-dissolvable, the dissolvable pod shell defining separate first and second compartments, the first compartment sealing a granular carbonate material, the second compartment sealing a granular acid material;

delivering a volume of water through a carbonation chamber fluid inlet into the carbonation chamber, at least partially dissolving the dissolvable shell with the water that was delivered into the carbonation chamber, mixing the granular carbonate material and granular acid material that have been released from their respective compartments in the at least partially dissolved dissolvable shell; and generating carbon dioxide gas from the mixed granular carbonate material and granular acid material.

Item 31: The method of any preceding item, wherein:

said mixing comprises mixing the granular carbonate material and granular acid material with the water that was delivered into the carbonation chamber.

Item 32: The method of any preceding item, wherein:

the delivered volume of water is at least 50 mL of water.

Item 33: The method of any preceding item, wherein:

the delivered volume of water is between 80 mL and 110 mL.

Item 34: The method of any preceding item, wherein:

said delivering comprises pumping the volume of water from a water reservoir to the carbonation chamber.

Item 35: The method of any preceding item, further comprising:

removing byproduct waste from the carbonation chamber through a byproduct outlet of the carbonation chamber, the byproduct waste including the at least partially dissolved dissolvable shell.

Item 36: The method of any preceding item, wherein:

after said depositing, piercing the dissolvable shell of the carbonation pod to release at least one of the granular carbonate material and the granular acid material from their respective compartments.

Item 37: The method of any preceding item wherein:

said generating comprises generating between 2 L to 5 L of carbon dioxide gas measured at a pressure of 1 atm and a temperature of 25° C.

Item 38: The method of any preceding item, further comprising:

directing the generated carbon dioxide gas along a fluid flow path into contact with a beverage in a beverage container.

Item 39: The method of any preceding item, further comprising:

recirculating the generated carbon dioxide gas that exits the beverage container along the fluid flow path and back into the beverage container.

Item 40: The method of any preceding item, wherein:
said at least partially dissolving comprises fully dissolving the dissolvable shell with the water that was delivered into the carbonation chamber.

Item 41: The method of any preceding item, wherein:
the granular acid material comprises a carboxylic acid.

Item 42: The method of any preceding item, wherein:
the carboxylic acid is citric acid.

Item 43: The method of any preceding item, wherein:
the granular carbonate material comprises sodium bicarbonate.

Item 44: The method of any preceding item, wherein:
the dissolvable pod shell comprises a water-soluble synthetic polymer.

Item 45: A method of carbonating a beverage, the method comprising:
connecting a beverage container to a beverage carbonator, the beverage container containing the beverage;
receiving a carbonation signal associated with a user request to carbonate the beverage in the beverage container;
detecting a temperature of the beverage;
determining a customized carbonation duration, based at least in part on the detected temperature, to obtain a targeted carbonation level in the beverage; and
directing carbon dioxide gas into contact with the beverage until expiry of the customized carbonation duration.

Item 46: The method of any preceding item, wherein:
said determining comprises determining the customized carbonation duration, based at least in part on the detected temperature and the received carbonation signal, to obtain the targeted carbonation level in the beverage.

Item 47: The method of any preceding item, wherein:
the received carbonation signal is associated with a beverage composition of the beverage in the beverage container, and said determining comprises determining the customized carbonation duration, based at least in part on the detected temperature and the beverage composition, to obtain the targeted carbonation level in the beverage.

Item 48: The method of any preceding item, further comprising:
identifying the beverage composition based on the received carbonation signal.

Item 49: The method of any preceding item, wherein:
the received carbonation signal is associated with a baseline carbonation duration, and said determining comprises determining the customized carbonation duration, based at least in part on the detected temperature and the baseline carbonation duration, to obtain the targeted carbonation level in the beverage.

Item 50: The method of any preceding item, wherein:
the baseline carbonation duration is associated with a baseline beverage temperature, and said determining the customized carbonation duration comprises determining a carbonation duration adjustment to apply to the baseline carbonation duration, the carbonation duration adjustment being based at least in part on a difference between the baseline beverage temperature and the detected temperature of the beverage.

Item 51: The method of any preceding item, further comprising:
identifying the baseline carbonation duration based on the received carbonation signal.

Item 52: The method of any preceding item, wherein:
the target carbonation level is based on a user carbonation preference stored in memory.

Item 53: The method of any preceding item, wherein:
the received carbonation signal is associated with the target carbonation level.

Item 54: The method of any preceding item, further comprising:
identifying the targeted carbonation level based on the received carbonation signal.

Item 55: The method of any preceding item, wherein:
said contacting comprises bubbling the carbon dioxide gas through the beverage in the beverage container.

Item 56: The method of any preceding item, wherein:
said directing comprises operating a pump during the customized carbonation duration.

Item 57: The method of any preceding item, wherein:
said directing comprises a controller executing an automated carbonation program that includes sending control signals to a pump during the customized carbonation duration.

Item 58: The method of any preceding item, further comprising:
generating the carbon dioxide gas in a carbonation chamber of the beverage carbonator.

Item 59: The method of any preceding item, further comprising:
moving water into the carbonation chamber at a start of the customized carbonation duration.

Item 60: The method of any preceding item, wherein:
said directing comprises recirculating carbon dioxide gas exiting the beverage container back into the beverage container until the expiry of the customized carbonation duration.

Item 61: The method of any preceding item, wherein:
the carbonation signal is received from one or more user operable controls located on the beverage carbonator.

Item 62: The method of any preceding item, wherein:
the carbonation signal is received from a portable user device communicatively coupled to the beverage carbonator.

Item 63: The method of any preceding item, wherein:
said detecting comprises detecting the temperature of the beverage with one or more beverage temperature sensors.

Item 64: A beverage carbonation system comprising:
a beverage carbonator;
a beverage container connectable to the beverage carbonator, the beverage container containing the beverage;
a server computer communicatively coupled to the beverage carbonator, each of the beverage carbonator and the server computer having one or more processors; and
a beverage temperature sensor communicatively coupled to the one or more processors of the beverage carbonator and the server computer,
the one or more processors of the beverage carbonator and the server computer configured to collectively:
receive a carbonation signal associated with a user request to carbonate the beverage in the beverage container;

receive, from the beverage temperature sensor, a temperature signal associated with a detected temperature of the beverage;

determine a customized carbonation duration, based at least in part on the detected temperature, to obtain a targeted carbonation level in the beverage; and direct carbon dioxide gas into contact with the beverage until expiry of the customized carbonation duration.

Item 65: The beverage carbonation system of any preceding item, wherein:

the one or more processors of the beverage carbonator and the server computer are configured to collectively:

identify the detected temperature based on the received temperature signal.

Item 66: The beverage carbonation system of any preceding item, wherein:

to determine the customized carbonation duration, the one or more processors of the beverage carbonator and the server computer are configured to collectively:

determine the customized carbonation duration, based at least in part on the detected temperature and the received carbonation signal, to obtain the targeted carbonation level in the beverage.

Item 67: The beverage carbonation system of any preceding item, wherein:

the received carbonation signal is associated with a beverage composition of the beverage in the beverage container, and to determine the customized carbonation duration, the one or more processors of the beverage carbonator and the server computer are configured to collectively:

determine the customized carbonation duration, based at least in part on the detected temperature and the beverage composition, to obtain the targeted carbonation level in the beverage.

Item 68: The beverage carbonation system of any preceding item, wherein:

the one or more processors of the beverage carbonator and the server computer are configured to collectively:

identify the beverage composition based on the received carbonation signal.

Item 69: The beverage carbonation system of any preceding item, wherein:

the received carbonation signal is associated with a baseline carbonation duration, and to determine the customized carbonation duration, the one or more processors of the beverage carbonator and the server computer are configured to collectively:

determine the customized carbonation duration, based at least in part on the detected temperature and the baseline carbonation duration, to obtain the targeted carbonation level in the beverage.

Item 70: The beverage carbonation system of any preceding item, wherein:

the baseline carbonation duration is associated with a baseline beverage temperature, and to determine the customized carbonation duration, the one or more processors of the beverage carbonator and the server computer are configured to collectively:

determine a carbonation duration adjustment to apply to the baseline carbonation duration, the carbonation duration adjustment being based at least in part on a difference between the baseline beverage temperature and the detected temperature of the beverage.

Item 71: The beverage carbonation system of any preceding item, wherein:

the one or more processors of the beverage carbonator and the server computer are configured to collectively:

identify the baseline carbonation duration based on the received carbonation signal.

Item 72: The beverage carbonation system of any preceding item, wherein:

the received carbonation signal is associated with the target carbonation level.

Item 73: The beverage carbonation system of any preceding item, wherein:

the one or more processors of the beverage carbonator and the server computer are configured to collectively:

identify the targeted carbonation level based on the received carbonation signal.

Item 74: The beverage carbonation system of any preceding item, wherein:

the beverage carbonator comprises a pump fluidly coupled to a carbonation chamber and the beverage container, and the one or more processors of the beverage carbonator and the server computer are configured to collectively:

control operation of the pump during the customized carbonation duration.

Item 75: The beverage carbonation system of any preceding item, wherein:

the beverage carbonator comprises a pump fluidly coupled to a carbonation chamber and the beverage container, and the one or more processors of the beverage carbonator and the server computer are configured to collectively:

execute an automated carbonation program that includes sending control signals to the pump during the customized carbonation duration.

Item 76: The beverage carbonation system of any preceding item, wherein:

the beverage carbonator comprises user operable controls communicatively coupled to at least one of the processors of the beverage carbonator, and the carbonation signal is received from the user operable controls.

Item 77: The beverage carbonation system of any preceding item, wherein:

the carbonation signal is received from a portable user device communicatively coupled to the beverage carbonator.

Item 78: A beverage carbonation system comprising:

a beverage carbonator having one or more processors;

a beverage container connectable to the beverage carbonator, the beverage container containing the beverage; and a beverage temperature sensor communicatively coupled to the one or more processors of the beverage carbonator at least when the beverage container is connected to the beverage carbonator, the one or more processors of the beverage carbonator configured to collectively:

receive a carbonation signal associated with a user request to carbonate the beverage in the beverage container;

41

42 receive, from the beverage temperature sensor, a temperature signal associated with a detected temperature of the beverage;

determine a customized carbonation duration, based at least in part on the detected temperature, to obtain a targeted carbonation level in the beverage; and direct carbon dioxide gas into contact with the beverage until expiry of the customized carbonation duration.

Item 79: The beverage carbonation system of any preceding item, wherein the one or more processors of the beverage carbonator are configured to collectively: identify the detected temperature based on the received temperature signal.

Item 80: The beverage carbonation system of any preceding item, wherein:

to determine the customized carbonation duration, the one or more processors of the beverage carbonator are configured to collectively:

determine the customized carbonation duration, based at least in part on the detected temperature and the received carbonation signal, to obtain the targeted carbonation level in the beverage.

Item 81: The beverage carbonation system of any preceding item, wherein:

the received carbonation signal is associated with a beverage composition of the beverage in the beverage container, and to determine the customized carbonation duration, the one or more processors of the beverage carbonator are configured to collectively:

determine the customized carbonation duration, based at least in part on the detected temperature and the beverage composition, to obtain the targeted carbonation level in the beverage.

Item 82: The beverage carbonation system of any preceding item, wherein:

the one or more processors of the beverage carbonator are configured to collectively:

identify the beverage composition based on the received carbonation signal.

Item 83: The beverage carbonation system of any preceding item, wherein:

the received carbonation signal is associated with a baseline carbonation duration, and to determine the customized carbonation duration, the one or more processors of the beverage carbonator are configured to collectively:

determine the customized carbonation duration, based at least in part on the detected temperature and the baseline carbonation duration, to obtain the targeted carbonation level in the beverage.

Item 84: The beverage carbonation system of any preceding item, wherein:

the baseline carbonation duration is associated with a baseline beverage temperature, and to determine the customized carbonation duration, the one or more processors of the beverage carbonator and the server computer are configured to collectively:

determine a carbonation duration adjustment to apply to the baseline carbonation duration, the carbonation duration adjustment being based at least in part on a difference between the baseline beverage temperature and the detected temperature of the beverage.

Item 85: The beverage carbonation system of any preceding item, wherein:

the one or more processors of the beverage carbonator are configured to collectively:

identify the baseline carbonation duration based on the received carbonation signal.

Item 86: The beverage carbonation system of any preceding item, wherein:

the received carbonation signal is associated with the target carbonation level.

Item 87: The beverage carbonation system of any preceding item, wherein:

the one or more processors of the beverage carbonator are configured to collectively:

identify the targeted carbonation level based on the received carbonation signal.

Item 88: The beverage carbonation system of any preceding item, wherein:

the beverage carbonator comprises a pump fluidly coupled to a carbonation chamber and the beverage container, and the one or more processors of the beverage carbonator are configured to collectively:

control operation of the pump during the customized carbonation duration.

Item 89: The beverage carbonation system of any preceding item, wherein:

the beverage carbonator comprises a pump fluidly coupled to a carbonation chamber and the beverage container, and the one or more processors of the beverage carbonator are configured to collectively:

execute an automated carbonation program that includes sending control signals to the pump during the customized carbonation duration.

Item 90: The beverage carbonation system of any preceding item, wherein:

the beverage carbonator comprises user operable controls communicatively coupled to at least one of the processors of the beverage carbonator, and the received carbonation signal is received from the user operable controls.

Item 91: The beverage carbonation system of any preceding item, wherein:

the received carbonation signal is received from a portable user device communicatively coupled to the beverage carbonator.

The invention claimed is:

1. A beverage carbonation system comprising:

a beverage carbonator;

a beverage container connectable to the beverage carbonator, the beverage container for containing a beverage;

a server computer communicatively coupled to the beverage carbonator, each of the beverage carbonator and the server computer having one or more processors; and a beverage temperature sensor communicatively coupled to the one or more processors of the beverage carbonator and the server computer, the one or more processors of the beverage carbonator and the server computer configured to collectively:

receive a carbonation signal associated with a user request to carbonate the beverage in the beverage container;

receive, from the beverage temperature sensor, a temperature signal associated with a detected temperature of the beverage;

determine a customized carbonation duration, based at least in part on the detected temperature, to obtain a targeted carbonation level in the beverage; and direct carbon dioxide gas into contact with the beverage until expiry of the customized carbonation duration, wherein the received carbonation signal is associated with a baseline carbonation duration, and to determine the customized carbonation duration, the one or more processors of the beverage carbonator and the server computer are configured to collectively:

determine the customized carbonation duration, based at least in part on the detected temperature and the baseline carbonation duration, to obtain the targeted carbonation level in the beverage, and wherein the baseline carbonation duration is associated with a baseline beverage temperature, and to determine the customized carbonation duration, the one or more processors of the beverage carbonator and the server computer are configured to collectively:

determine a carbonation duration adjustment to apply to the baseline carbonation duration, the carbonation duration adjustment being based at least in part on a difference between the baseline beverage temperature and the detected temperature of the beverage.

2. The beverage carbonation system of claim 1, wherein the one or more processors of the beverage carbonator and the server computer are configured to collectively:

identify the detected temperature based on the received temperature signal.

3. The beverage carbonation system of claim 1, wherein to determine the customized carbonation duration, the one or more processors of the beverage carbonator and the server computer are configured to collectively:

determine the customized carbonation duration, based at least in part on the detected temperature and the received carbonation signal, to obtain the targeted carbonation level in the beverage.

4. The beverage carbonation system of claim 1, wherein the received carbonation signal is associated with a beverage composition of the beverage in the beverage container, and to determine the customized carbonation duration, the one or more processors of the beverage carbonator and the server computer are configured to collectively:

determine the customized carbonation duration, based at least in part on the detected temperature and the beverage composition, to obtain the targeted carbonation level in the beverage.

5. The beverage carbonation system of claim 4, wherein the one or more processors of the beverage carbonator and the server computer are configured to collectively:

identify the beverage composition based on the received carbonation signal.

6. The beverage carbonation system of claim 1, wherein the beverage carbonator comprises a pump fluidly coupled to a carbonation chamber and the beverage container, and the one or more processors of the beverage carbonator and the server computer are configured to collectively:

control operation of the pump during the customized carbonation duration.

7. The beverage carbonation system of claim 1, wherein the beverage carbonator comprises a pump fluidly coupled to a carbonation chamber and the beverage container, and the one or more processors of the beverage carbonator and the server computer are configured to collectively:

execute an automated carbonation program that includes sending control signals to the pump during the customized carbonation duration.

8. The beverage carbonation system of claim 1, wherein the beverage carbonator comprises user operable controls communicatively coupled to at least one of the processors of the beverage carbonator, and the carbonation signal is received from the user operable controls.

9. The beverage carbonation system of claim 1, wherein the carbonation signal is received from a portable user device communicatively coupled to the beverage carbonator.

10. A beverage carbonation system comprising:

a beverage carbonator having one or more processors;

a beverage container connectable to the beverage carbonator, the beverage container for containing a beverage; and a beverage temperature sensor communicatively coupled to the one or more processors of the beverage carbonator at least when the beverage container is connected to the beverage carbonator, the one or more processors of the beverage carbonator configured to collectively:

receive a carbonation signal associated with a user request to carbonate the beverage in the beverage container;

receive, from the beverage temperature sensor, a temperature signal associated with a detected temperature of the beverage;

determine a customized carbonation duration, based at least in part on the detected temperature, to obtain a targeted carbonation level in the beverage; and direct carbon dioxide gas into contact with the beverage until expiry of the customized carbonation duration, wherein the received carbonation signal is associated with a baseline carbonation duration, and to determine the customized carbonation duration, the one or more processors of the beverage carbonator are configured to collectively:

determine the customized carbonation duration, based at least in part on the detected temperature and the baseline carbonation duration, to obtain the targeted carbonation level in the beverage, and wherein the baseline carbonation duration is associated with a baseline beverage temperature, and to determine the customized carbonation duration, the one or more processors of the beverage carbonator are configured to collectively:

determine a carbonation duration adjustment to apply to the baseline carbonation duration, the carbonation duration adjustment being based at least in part on a difference between the baseline beverage temperature and the detected temperature of the beverage.

11. The beverage carbonation system of claim 10, wherein the one or more processors of the beverage carbonator are configured to collectively:

identify the detected temperature based on the received temperature signal.

12. The beverage carbonation system of claim 10, wherein to determine the customized carbonation duration, the one or more processors of the beverage carbonator are configured to collectively:

determine the customized carbonation duration, based at least in part on the detected temperature and the received carbonation signal, to obtain the targeted carbonation level in the beverage.

13. The beverage carbonation system of claim 10, wherein the received carbonation signal is associated with a beverage composition of the beverage in the beverage container, and to determine the customized carbonation duration, the one or more processors of the beverage carbonator are configured to collectively:

determine the customized carbonation duration, based at least in part on the detected temperature and the beverage composition, to obtain the targeted carbonation level in the beverage.

14. The beverage carbonation system of claim 13, wherein the one or more processors of the beverage carbonator are configured to collectively:

identify the beverage composition based on the received carbonation signal.

15. The beverage carbonation system of claim 10, wherein the one or more processors of the beverage carbonator are configured to collectively:

identify the baseline carbonation duration based on the received carbonation signal.

16. The beverage carbonation system of claim 10, wherein the received carbonation signal is associated with the targeted carbonation level.

17. The beverage carbonation system of claim 10, wherein the one or more processors of the beverage carbonator are configured to collectively:

identify the targeted carbonation level based on the received carbonation signal.

* * * * *